(12) United States Patent  
Tenorio et al.

(10) Patent No.: US 11,404,885 B1  
(45) Date of Patent: Aug. 2, 2022

(54) LARGE-FORMAT BATTERY MANAGEMENT SYSTEMS WITH GATEWAY PCBA

(71) Applicant: Inventus Power, Inc., Woodridge, IL (US)

(72) Inventors: William Tenorio, Glenview, IL (US); Anvin Joe Manadan, Woodridge, IL (US)

(73) Assignee: Inventus Power, Inc., Woodridge, IL (US)

( * ) Notice: Subject to any disclaimer, the term of this patent is extended or adjusted under 35 U.S.C. 154(b) by 0 days.

(21) Appl. No.: 17/563,856

(22) Filed: Dec. 28, 2021

Related U.S. Application Data

(63) Continuation-in-part of application No. 17/395,987, filed on Aug. 6, 2021, which is a continuation of (Continued)

(51) Int. Cl.
*H01M 10/44* (2006.01)
*H01M 10/46* (2006.01)
(Continued)

(52) U.S. Cl.
CPC ..... *H02J 7/00032* (2020.01); *H01M 10/0525* (2013.01); *H01M 10/425* (2013.01);
(Continued)

(58) Field of Classification Search
CPC .... H02J 7/00032; H02J 7/0013; H02J 7/0029; H02J 7/0047; H02J 7/0048;
(Continued)

(56) References Cited

U.S. PATENT DOCUMENTS

| 5,504,415 A | 4/1996 | Podrazhansky et al. |
| 6,288,521 B1 | 9/2001 | Meador |

(Continued)

FOREIGN PATENT DOCUMENTS

| CN | 202474131 U | 10/2012 |
| CN | 103390921 A | 11/2013 |

(Continued)

OTHER PUBLICATIONS

Sep. 9, 2020—U.S. Non-Final Office Action—U.S. Appl. No. 16/937,931.

(Continued)

*Primary Examiner* — Edward Tso  
(74) *Attorney, Agent, or Firm* — Banner & Witcoff, Ltd.

(57) ABSTRACT

A battery system with a large-format Li-ion battery pack powers attached equipment by discharging battery cells distributed among a plurality of battery packs. A limp home notification is generated from a smart lithium-ion battery pack to one or more application devices using an analog signal. The battery pack may provide broadcast messages over electronic communication lines, that includes state of charge (SoC), fault status, etc. which can be read by one or more application devices to enter limp home mode. In another example, a "fully charged" notification is generated from the smart lithium-ion battery pack to one or more application devices using an analog signal. The end device powered by the battery pack system receives and reacts to the outputted fully charged signal by modifying the state of the circuitry on the end device.

20 Claims, 45 Drawing Sheets

Related U.S. Application Data application No. 17/183,422, filed on Feb. 24, 2021, now Pat. No. 11,095,140.

(60) Provisional application No. 63/243,968, filed on Sep. 14, 2021.

(51) Int. Cl.

| | |
|---|---|
| H02J 7/00 | (2006.01) |
| H01M 10/42 | (2006.01) |
| H01M 10/48 | (2006.01) |
| H01M 10/0525 | (2010.01) |

(52) U.S. Cl.
CPC ..... *H01M 10/4257* (2013.01); *H01M 10/441* (2013.01); *H01M 10/482* (2013.01); *H02J 7/007* (2013.01); *H02J 7/0013* (2013.01); *H02J 7/0014* (2013.01); *H02J 7/0029* (2013.01); *H02J 7/0047* (2013.01); *H02J 7/0048* (2020.01); *H02J 7/0063* (2013.01); *H02J 7/00712* (2020.01); *H01M 2010/4271* (2013.01); *H01M 2010/4278* (2013.01)

(58) Field of Classification Search
CPC ........... H02J 7/00712; H01M 10/4257; H01M 10/441; H01M 2010/4271; H01M 2010/4278
USPC ........ 414/268, 269, 270, 274; 320/107, 114, 320/116, 118, 122, 134, 136
See application file for complete search history.

(56) References Cited

U.S. PATENT DOCUMENTS

| | | | |
|---|---|---|---|
| 6,586,909 B1 | 7/2003 | Trepka | |
| 6,771,491 B2 | 8/2004 | Tojo et al. | |
| 6,919,707 B2 | 7/2005 | Kawai et al. | |
| 6,931,481 B2 | 8/2005 | Montero | |
| 7,453,236 B2 | 11/2008 | Eguchi et al. | |
| 7,463,008 B2 | 12/2008 | Takahashi | |
| 7,525,285 B2 | 4/2009 | Plett | |
| 7,617,027 B2 | 11/2009 | Jeong | |
| 7,646,167 B2 | 1/2010 | Feng et al. | |
| 7,663,341 B2 | 2/2010 | Lee et al. | |
| 7,759,904 B2 | 7/2010 | Yasuhito et al. | |
| 7,834,595 B2 | 11/2010 | Yasuhito et al. | |
| 8,004,238 B2 | 8/2011 | Kim et al. | |
| 8,018,205 B2 | 9/2011 | Yasuhito et al. | |
| 8,264,201 B2 | 9/2012 | Tae et al. | |
| 8,307,223 B2 | 11/2012 | Tae et al. | |
| 8,344,687 B2 | 1/2013 | Nishikawa et al. | |
| 8,350,529 B2 | 1/2013 | Loncarevic | |
| 8,432,132 B2 | 4/2013 | Nakanishi | |
| 8,502,503 B2 | 8/2013 | Densham | |
| 8,519,670 B2 | 8/2013 | Castelaz et al. | |
| 8,547,065 B2 | 10/2013 | Trigiani | |
| 8,723,482 B2 | 5/2014 | Dao et al. | |
| 8,766,597 B2 | 7/2014 | Nork et al. | |
| 8,816,640 B2 | 8/2014 | Yokoura et al. | |
| 8,860,372 B2 | 10/2014 | Guang et al. | |
| 8,874,298 B2 | 10/2014 | Houchin-Miller et al. | |
| 8,898,341 B2 | 11/2014 | Kim et al. | |
| 8,912,758 B2 | 12/2014 | Kang et al. | |
| 8,963,507 B2 | 2/2015 | Kim et al. | |
| 9,000,935 B2 | 4/2015 | Dao et al. | |
| 9,002,537 B2 | 4/2015 | Duncan et al. | |
| 9,005,788 B2 | 4/2015 | Zhu | |
| 9,071,049 B2 | 6/2015 | Densham | |
| 9,088,052 B2 | 7/2015 | Sim et al. | |
| 9,118,192 B2 | 8/2015 | Zhu et al. | |
| 9,219,366 B2 | 12/2015 | Kim | |
| 9,236,735 B2 | 1/2016 | Yoo | |
| 9,252,464 B2 | 2/2016 | Boehm et al. | |
| 9,293,935 B2 | 3/2016 | Lee et al. | |
| 9,296,306 B2 | 3/2016 | Schygge et al. | |
| 9,300,016 B2 | 3/2016 | Yun | |
| 9,302,595 B2 | 4/2016 | Tabatowski-Bush et al. | |
| 9,306,409 B2 | 4/2016 | Yoo | |
| 9,337,668 B2 | 5/2016 | Yip | |
| 9,431,684 B2 | 8/2016 | Wang et al. | |
| 9,436,261 B2 | 9/2016 | Yun | |
| 9,438,061 B2 | 9/2016 | Takeyama | |
| 9,496,730 B2 | 11/2016 | Gallegos et al. | |
| 9,537,328 B2 | 1/2017 | Kim | |
| 9,559,389 B2 | 1/2017 | Greet et al. | |
| 9,606,187 B2 | 3/2017 | Choi | |
| 9,641,002 B2 | 5/2017 | Lavender | |
| 9,641,013 B2 | 5/2017 | Lee et al. | |
| 9,667,074 B2 | 5/2017 | Farhi et al. | |
| 9,692,242 B2 | 6/2017 | Butzmann | |
| 9,772,666 B1 | 9/2017 | Kam et al. | |
| 9,787,108 B2 | 10/2017 | Huggins | |
| 9,817,467 B2 | 11/2017 | Lee et al. | |
| 9,859,712 B2 | 1/2018 | Nishibayashi et al. | |
| 9,876,367 B2 | 1/2018 | Trigiani | |
| 9,882,401 B2 | 1/2018 | Beaston | |
| 9,912,017 B1 | 3/2018 | Kuo et al. | |
| 9,923,247 B2 | 3/2018 | Beaston et al. | |
| 10,003,214 B2 | 6/2018 | Nasiri et al. | |
| 10,007,507 B2 | 6/2018 | Huang | |
| 10,044,211 B2 | 8/2018 | Seo et al. | |
| 10,097,013 B2 | 10/2018 | Norton | |
| 10,122,186 B2 | 11/2018 | Nystrom et al. | |
| 10,131,042 B2 | 11/2018 | Mergener et al. | |
| 10,131,246 B2 | 11/2018 | Demont | |
| 10,144,304 B2 | 12/2018 | Dai | |
| 10,186,878 B2 | 1/2019 | Pognant-Gros et al. | |
| 10,243,923 B2 | 3/2019 | Jo | |
| 10,259,336 B2 | 4/2019 | McQuillen et al. | |
| 10,270,262 B2 | 4/2019 | Kim et al. | |
| 10,270,266 B2 | 4/2019 | Beaston | |
| 10,347,952 B2 | 7/2019 | Choi et al. | |
| 10,361,571 B2 | 7/2019 | Kim | |
| 10,361,573 B2 | 7/2019 | Do et al. | |
| 10,396,570 B2 | 8/2019 | Loncarevic | |
| 10,414,285 B2 | 9/2019 | Park et al. | |
| 10,439,176 B2 | 10/2019 | Choi et al. | |
| 10,439,430 B2 | 10/2019 | Chan et al. | |
| 10,442,306 B2 | 10/2019 | Sufrin-Disler et al. | |
| 10,491,007 B2 | 11/2019 | Kim | |
| 10,491,012 B2 | 11/2019 | Kang | |
| 10,505,374 B2 | 12/2019 | Kain et al. | |
| 10,505,377 B2 | 12/2019 | Jeon | |
| 10,532,665 B2 | 1/2020 | Brochhaus | |
| 10,536,007 B2 | 1/2020 | Beaston et al. | |
| 10,571,523 B2 | 2/2020 | Kim et al. | |
| 10,608,444 B2 | 3/2020 | Kaneko | |
| 10,627,448 B2 | 4/2020 | Koo et al. | |
| 10,794,957 B2 | 10/2020 | Yoon et al. | |
| 10,938,221 B1 | 3/2021 | Tenorio | |
| 10,944,278 B1 | 3/2021 | Kang et al. | |
| 2009/0052109 A1 | 2/2009 | Stockman | |
| 2012/0194139 A1 | 8/2012 | Sasaki et al. | |
| 2013/0320772 A1 | 12/2013 | Qiao et al. | |
| 2015/0221993 A1 | 8/2015 | Wang et al. | |
| 2015/0222132 A1 | 8/2015 | Shikatani et al. | |
| 2016/0172901 A1 | 6/2016 | Hsieh et al. | |
| 2016/0359329 A1 | 12/2016 | Kim et al. | |
| 2017/0194673 A1 | 7/2017 | Jeon | |
| 2017/0214256 A1 | 7/2017 | Hardy | |
| 2017/0288422 A1 | 10/2017 | Yang et al. | |
| 2017/0345101 A1 | 11/2017 | Beaston | |
| 2018/0198291 A1 | 7/2018 | Kuo et al. | |
| 2018/0233928 A1 | 8/2018 | Li | |
| 2018/0278066 A1 | 9/2018 | Kurahashi et al. | |
| 2018/0323623 A1 | 11/2018 | Nysen | |
| 2018/0342772 A1 | 11/2018 | Wei | |
| 2019/0042228 A1 | 2/2019 | Nolan et al. | |
| 2019/0052109 A1 | 2/2019 | Sturnfield | |
| 2019/0067755 A1 | 2/2019 | Kim et al. | |
| 2019/0129369 A1 | 5/2019 | Song et al. | |
| 2019/0152342 A1 | 5/2019 | Shen et al. | |
| 2019/0160972 A1 | 5/2019 | Zeiler et al. | |

(56) References Cited

U.S. PATENT DOCUMENTS

| | | |
|---|---|---|
| 2019/0227863 A1 | 7/2019 | Cho et al. |
| 2019/0229376 A1 | 7/2019 | Petrakivskyi et al. |
| 2019/0229377 A1 | 7/2019 | Kim |
| 2019/0237816 A1 | 8/2019 | Kim et al. |
| 2019/0252735 A1 | 8/2019 | Sung et al. |
| 2019/0267815 A1 | 8/2019 | Hidaka et al. |
| 2019/0273293 A1 | 9/2019 | Kim et al. |
| 2019/0356025 A1 | 11/2019 | Sung et al. |
| 2019/0356140 A1 | 11/2019 | Sung |
| 2019/0361075 A1 | 11/2019 | Lee et al. |
| 2019/0363552 A1 | 11/2019 | Choi |
| 2019/0379214 A1 | 12/2019 | Loncarevic |
| 2020/0036194 A1 | 1/2020 | Park et al. |
| 2020/0052503 A1 | 2/2020 | Statman |
| 2020/0059106 A1 | 2/2020 | Karlsson et al. |
| 2020/0067323 A1 | 2/2020 | Jeon et al. |
| 2020/0076007 A1 | 3/2020 | Jeon et al. |
| 2020/0083720 A1 | 3/2020 | Kain et al. |
| 2020/0119564 A1 | 4/2020 | Lee |
| 2020/0136197 A1 | 4/2020 | Bossi |
| 2020/0144679 A1 | 5/2020 | Kam et al. |
| 2020/0227925 A1 | 7/2020 | Park |
| 2020/0244075 A1 | 7/2020 | Park et al. |
| 2020/0366103 A1 | 11/2020 | Zhou et al. |
| 2021/0006076 A1 | 1/2021 | Rentel et al. |

FOREIGN PATENT DOCUMENTS

| | | | | |
|---|---|---|---|---|
| CN | 106253363 A | | 12/2016 | |
| CN | 109193050 A | | 1/2019 | |
| CN | 111114380 A | | 5/2020 | |
| CN | 111488160 A | | 8/2020 | |
| DE | 10 2015 004 834 A1 | | 10/2016 | |
| GB | 2346596 A | * | 8/2000 | ............ H02J 7/1446 |
| KR | 10-2015-0066222 A | | 6/2015 | |
| KR | 101561885 B1 | | 10/2015 | |
| KR | 101562015 B1 | | 10/2015 | |
| KR | 20170022162 A | | 3/2017 | |
| KR | 20170062757 A | | 6/2017 | |
| KR | 101788513 B1 | | 10/2017 | |
| WO | 2013125850 A1 | | 8/2013 | |
| WO | 2018075793 A1 | | 4/2018 | |
| WO | 2018225921 A1 | | 12/2018 | |
| WO | 201912128 A1 | | 1/2019 | |
| WO | 2019009531 A1 | | 1/2019 | |
| WO | 2019009535 A1 | | 1/2019 | |
| WO | 2019020531 A1 | | 1/2019 | |
| WO | 2019022377 A1 | | 1/2019 | |
| WO | 2019027190 A1 | | 2/2019 | |
| WO | 2019066214 A1 | | 4/2019 | |
| WO | 2019074217 A1 | | 4/2019 | |
| WO | 2019/138425 A1 | | 7/2019 | |
| WO | 2019/205138 A1 | | 10/2019 | |
| WO | 2019212128 A1 | | 11/2019 | |
| WO | 2019216532 A1 | | 11/2019 | |
| WO | 2020076127 A1 | | 4/2020 | |
| WO | 2020104277 A1 | | 5/2020 | |
| WO | 2021/071655 A1 | | 4/2021 | |

OTHER PUBLICATIONS

Sep. 15, 2020—U.S. Non-Final Office Action—U.S. Appl. No. 16/937,979.

Sep. 16, 2020—(US) Ex Parte Quayle Action—U.S. Appl. No. 16/937,008.

Jan. 27, 2021—(WO) International Search Report & Written Opinion—App. No. PCT/CN2020/093886.

Jul. 7, 2021—U.S. Notice of Allowance—U.S. Appl. No. 17/183,422.

Aug. 2, 2021—U.S. Notice of Allowance—U.S. Appl. No. 17/270,885.

Andrea Reindl, et al., Software Update of a Decentralized, Intelligent Battery Management System Based on Multi-Microcomputers, Proceedings of the 2nd Symposium Electronics and System Integration ESI 2020: "Intelligent Systems and their Components: Research and Industrial Application", 2020, pp. 8-19 [retrieved from <https://opus4.kobv.de/opus4-haw-landshut/frontdoor/index/index/docId/207>].

SUAS News, The Market, BatMon: Smartify your drone battery, Jan. 22, 2020, 8 pages, [retrieved from <https://www.suasnews.com/2020/01/batmon-smartify-your-drone-battery/>].

Phytools, PEAK System, Webpage, printed Aug. 18, 2021, 9 pages [retrieved from <https://phytools.com/collections/peak-system-technik>].

Tracxn Technologies, Webpage, Top Battery Management System Startups, Updated Apr. 13, 2021, 6 pages [retrieved from <https://tracxn.com/d/trending-themes/Startups-in-Battery-Management-System>].

Ng, MF., Zhao, J., Yan, Q. et al. Predicting the state of charge and health of batteries using data-driven machine learning. Nat Mach Intell 2, 161-170 (2020). Abstract only. [<https://doi.org/10.1038/s42256-020-0156-7>].

Nov. 24, 2021—U.S. Non-Final Office Action—U.S. Appl. No. 17/466,800.

Dec. 20, 2021—U.S. Notice of Allowance—U.S. Appl. No. 17/466,800.

Nov. 20, 2021—U.S. Notice of Allowance—U.S. Appl. No. 17/466,800.

Mengarelli, Kevin, et al., "Lithium-ion Battery Pack Charging Interfaces and Challenges," The Battery Show and Electric North America & Hybrid Vehicle Technology Expo North America, Inventus Power, Oct. 19, 2021, pp. 1-12.

Mar. 23, 2022—U.S. Notice of Allowance—U.S. Appl. No. 17/563,916.

* cited by examiner

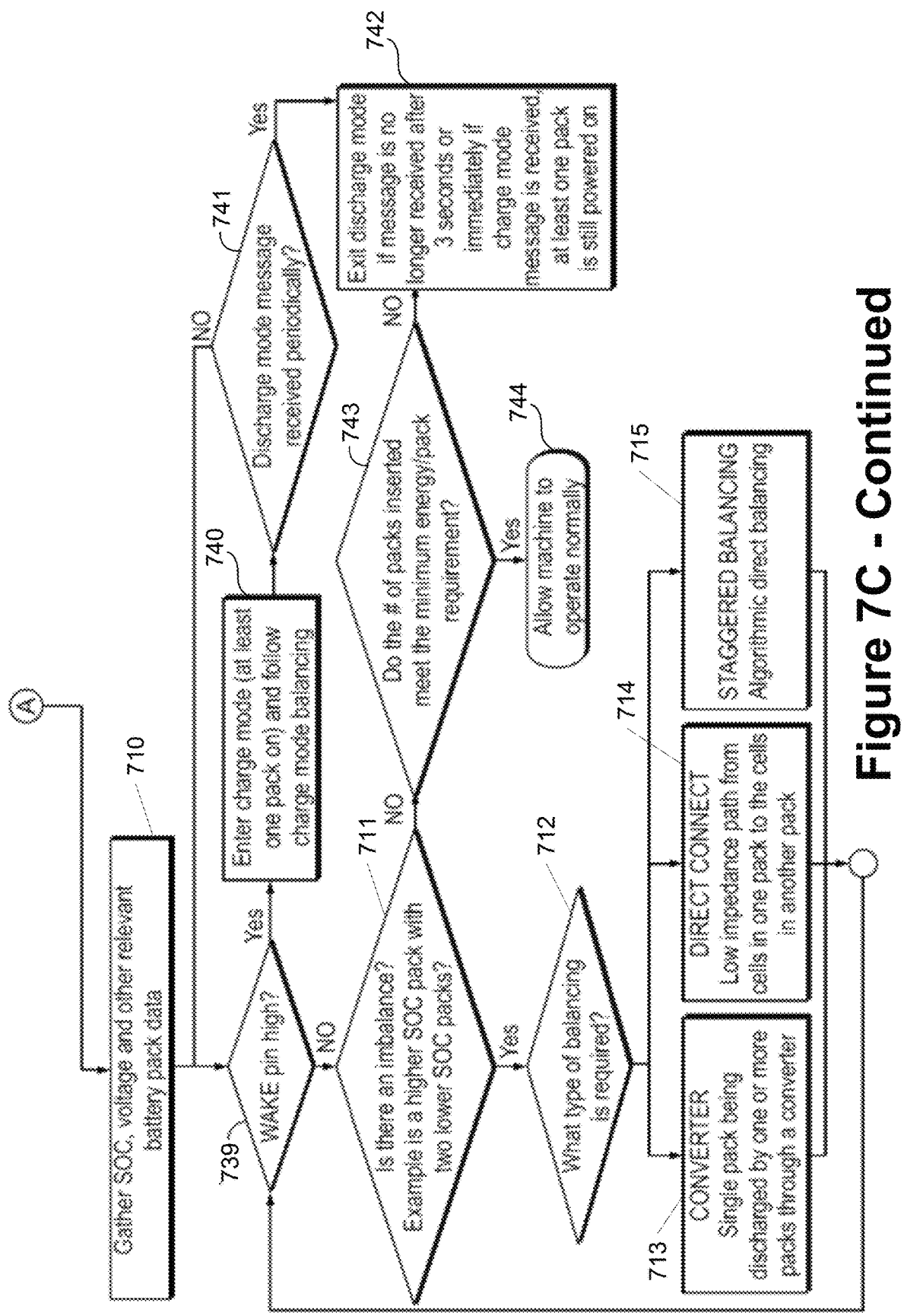
Figure 7C - Continued

LARGE-FORMAT BATTERY MANAGEMENT SYSTEMS WITH GATEWAY PCBA

CROSS-REFERENCE TO RELATED APPLICATIONS

This application is a non-provisional of and claims priority to U.S. Provisional Application Ser. No. 63/243,968 filed Sep. 14, 2021, and this application is a continuation-in-part of U.S. patent application Ser. No. 17/395,987 filed Aug. 6, 2021, which is a continuation of U.S. patent application Ser. No. 17/183,422 filed Feb. 24, 2021; and all of the aforementioned are herein incorporated by reference in their entireties.

TECHNICAL FIELD

A battery system comprises a plurality of battery packs. Each battery pack includes a battery management system in which one of the battery packs is flexibly configured as a master (e.g., primary) battery pack while the other battery packs are configured as slave (e.g., secondary) battery packs.

In one embodiment, a limp home notification is generated from a smart lithium-ion battery pack to one or more application devices using an analog signal. The battery pack may provide broadcast messages over electronic communication lines, that includes state of charge (SoC), fault status, etc. which can be read by one or more application devices to enter limp home mode. This requires the application device to be able to read messages over communication lines; however, traditional application devices using lead acid batteries do not have this capability. The application device can monitor the pack voltage to determine when to enter limp home mode. The pack voltage varies depending on the load and temperature and is often not an accurate estimation for the SoC. In addition, the pack voltage often does not indicate a faulty pack in a multi-battery system.

In another embodiment, a smart battery pack has a battery management system (BMS) that computes the battery pack state of charge (SoC) utilizing complex algorithms, sometimes continuously. In such an embodiment, the battery pack may output a signal (e.g., analog signal) that indicates the battery pack is "fully charged." Similar to the outputted limp home mode signal described in the preceding paragraph, the signal may default to 0V, but be pulled high to 5V (or other voltage) or a PACK+ voltage when the SoC measurement reaches 100% or near 100%. As explained in the preceding paragraph, some traditional application devices using lead acid batteries do not have the ability to receive CAN communications, thus a gateway printed circuit board assembly (PCBA) that can read SoC over electronic communication protocols such as Controller Area Network (CAN), may be interfaced to the battery pack system. The reference voltage for the 'fully charged' signal is the PACK−. The end device uses the outputted 'Fully Charged' signal to drive an LED or connect to the end device's application controller.

The battery management systems and methods described herein may be implemented in industrial and commercial vehicle applications, such as off-road utility vehicles, hybrid electric vehicles, battery-electric powered vehicles, burden carrier/tow tractors, forklift/pallet jacks, lawn and garden/outdoor power equipment, large mining equipment, automated guided vehicles, aerial work platforms, and other such applications. In addition, the systems and methods described herein may be implemented in other applications including, but not limited to cordless power tools (e.g., drills, saws, grinders, nail drivers, welders, and the like), aerospace/defense applications, appliances, and other such applications. Furthermore, the systems and methods described herein may be implemented in other applications including, but not limited to grid energy storage, solar-generated power storage systems, sustainably generated power storage systems, smart grid systems, telecom and data communication backup systems, uniform power supply (UPS) systems, server applications, and other such applications.

For example, in some industrial and commercial vehicle applications, a battery management system such as disclosed herein may desired to output a wide range of current—e.g., a high current when initially turning on an engine of the vehicle, however, less current during normal operation of the vehicle. The battery management system and methods may also, in some embodiments, include a limp home mode feature, as disclosed herein, to accommodate a failed battery in a large-format battery pack, such as in an industrial or commercial vehicle application. The battery management systems, including various battery pack configurations and one or more buses (e.g., a CAN bus), may integrated into the industrial and commercial vehicle application.

In another example, in some telecom and/or data communication backup systems and/or computer server applications, a battery management system such as disclosed herein may provide an alternative to lead acid battery installations that previously dominated these applications because of their low cost, straightforward scalability, accessible recycling infrastructure, and accessible manufacturers. In some embodiments, the battery management systems and methods disclosed herein provide high energy density, high rate of discharge capabilities, and low self-discharge characteristics that make for desirable integration into telecom and/or data communication backup systems, uniform power supply (UPS) systems, and/or computer server applications. For example, the aforementioned applications desire longer operational time frames that are made possible by the battery management system such as disclosed herein, which extend the usable life of batteries in the battery pack by implementing smart algorithms for charge, discharge, and balancing— e.g., smart converter balancing, start direct balancing, start staggered balancing, and others. In addition, the battery management systems and methods disclosed herein may be used in cooperation with, in some examples, technologies such as fuel cells, ultracapacitors, flywheels, and other electrochemical batteries for use in telecom/data communications backup applications.

In yet another example, in some grid energy storage systems, solar-generated power storage systems, sustainably generated power storage systems, smart grid systems, and/or uniform power supply (UPS) systems, a battery management system such as disclosed herein may optimize electricity grids and enable sustainable energy sources, such as wind and solar power, to be more economical. In one example, the system may be used to store solar energy received from photovoltaic panels and a bi-directional three-phase inverter system may be managed, in some embodiments, using the battery management system disclosed herein. The renewable energy storage system may include a plurality of batteries in a battery pack integrated into a rack mount chassis and enclosure. Solar integrators may use the disclosed battery management systems and methods with large-format battery chemistries to fill the needs of growing renewable energy storage requirements. While lead-acid, ultracapacitors, sodium sulfur, vanadium redox, flywheels, compressed air, fuel cells and pumped hydro have been used in solar energy storage applications, with the disclosed battery management systems and methods, solar integrators may conveniently use Lithium ion for large-format applications. In addition, solar integrators may desire ancillary services for the power markets that uses micro-pulses of energy to maintain the proper frequency of the current on the grid—e.g., frequency regulation, and advanced smart grid functionality such as micro grid operation, demand response, time shifting, and power dispatch. Lithium chemistry over previous battery technologies include weight reduction, volume/footprint reduction, longer cycle-life, ability to use a greater percent of capacity of lithium battery without shortening rated cycle life, faster charge times, and lower effective capacity loss at high rates of discharge. In some examples, an inverter and gateway interoperability may be coupled to the disclosed battery management systems to manage, distribute, and store energy within a smart grid. In some examples, the smart grid system may be housed in a mobile shipping container that is expandable.

In addition to grid energy storage systems, the battery management systems and methods disclosed herein may be integrated with off-grid power products suitable in consumer, recreational, automotive, maritime and/or industrial applications. In the automotive sector, auxiliary power units (APU) may be used for transportation, construction, and/or maintaining vital infrastructure. Battery APUs provides commercial vehicles with a rugged and dependable off-grid power source. Other off-grid power applications include maritime power, remote location power, traffic regulation, security surveillance and emergency power generators. Moreover, Battery APUs may be used for short and long-haul trucks, construction equipment, off-road transport (e.g., logging trucks), and buses. For example, commercial trucks may rely on Battery APUs for overnight comfort (e.g., air conditioning/heat/accessory) loads. For several off-grid applications, reliability is a major concern as failure and/or downtime is exceedingly costly.

BACKGROUND

Battery technology has evolved from the nascent era of automation when vehicle batteries were typically large and heavy affairs using lead-acid technology. Battery technology has evolved to provide more electrical energy with less space. For example, Lithium-ion (Li-ion) batteries are quickly replacing regular zinc carbon and lead batteries because they are smaller and lighter than traditional batteries and can hold charge for up to three times longer than big, heavy traditional batteries. Consequently, Li-ion batteries are finding applications for powering tools, appliances, and vehicles including forklifts, cars, trucks, and so forth. Moreover, battery technology is not stagnant. For example, new solid-state batteries use a glass electrolyte and lithium or sodium metal electrodes, providing approximately three times as much energy density as Li-ion batteries. In general, however, new technology batteries may be damaged or degraded if the sensitive chemistry of the battery is disrupted. For example, Li-ion batteries are known to malfunction/degrade if overcharged or charged/overcharged/discharged in inappropriate ways.

A battery management system (BMS) is sometimes included with new technology batteries (for example, nickel metal hydride or Li-ion) to provide battery protection, provide improved efficiency, and provide a better user experience than previous battery technologies. The battery management system may sometimes be implemented to further one or more goals. For example, the BMS may be used to protect a user of the application being powered by the battery. As a further example, the BMS may be used to protect the battery pack itself from damage and abuse because the battery may often an expensive investment. Furthermore, since the battery may be an expensive investment, the BMS may be used to maximize the performance that can be squeezed out of the battery system. Even further, the BMS may be used to maximize the life of the constituent battery cells.

SUMMARY

A battery system may comprise a plurality of battery packs that may have the same or similar electrical and electronic components and/or chemistries. Each battery pack may support battery cells (often Li-ion). Battery packs need not require a specific configuration before the battery pack is installed in the battery system. Rather, the battery pack may assume a role of either a master (e.g., a primary) battery pack or a slave (e.g., a secondary) battery pack after the battery pack is inserted into the system and commences activity on the communication channel without user intervention.

In one aspect, a battery management system is disclosed that enables a smart lithium-ion battery pack to notify one or more application devices, which lack electronic communication means, the need for the application devices to enter limp home mode when certain conditions are satisfied. The conditions include but are not limited to: state of charge (SoC) falling below a safe threshold, one of more battery packs in a multi-battery system becoming faulty, and/or any other condition that require the application device to operate at a low power mode. Application devices that use traditional lead acid battery packs and/or the ones with no electronic communication capabilities are a primary focus of the features disclosed herein. In particular, any smart battery pack that internally calculates SoC is the primary focus of the features disclosed herein. With the addition of limp home signal, these devices can upgrade to Li-ion battery packs and monitor the limp-home signal.

With another aspect, the battery system need not utilize an external battery management system. Rather, each battery pack may include an internal battery management system that can manage a pack's battery cells and may coordinate via messaging with the other battery packs in the battery system via a communication channel.

With another aspect, a master battery pack may gather battery status information from one or more slave battery packs by messaging over a communication channel. Based on this status information, the master battery pack can appropriately initiate the enabling/disabling of the charging or discharging of battery cells located at the slave battery packs.

With another aspect, a configuration list may be sent by a master battery pack to slave battery packs over a communication channel (for example, serial communication channel such as a controller area network (CAN) bus), where the configuration list may include entries for each of the master and slave battery packs. The entry at the top position can serve as the master battery pack while the other battery packs can serve as slave battery packs. When a battery pack is added or removed, the configuration list can be revised to reflect the change.

With another aspect, battery packs in a battery system may be charge-balanced to mitigate and/or prevent in-rush electrical current that may occur for one or more of a plurality of battery packs in the battery system when there is significant variation of state of charge (SoC) among the battery packs. For example, a large SoC variation may occur when a new battery pack is installed in a battery system, such as when a SoC of the new battery pack is much different (e.g., discharged, fully charged) when compared to the existing battery packs in the battery system. In-rush electrical current can be particularly undesirable with Li-ion batteries since its life may be substantially reduced.

With another aspect, different balancing technique of battery packs are supported in a battery system. Based on the SoC characteristics of the battery packs, one of a plurality of balancing techniques may be selected. Balancing techniques may include, for example, a "smart converter balancing," a "start direct balancing," and/or a "start staggered balancing."

With another aspect, a battery system may support a "limp home mode" when a battery pack in a battery system experiences a catastrophic failure, for example, when its battery cells are characterized by a very low voltage output. An internal battery management system may diagnose the failure and may mitigate the failure by configuring an unused battery pack (if available) in the battery system or by initiating a partial shutdown of the battery system, enabling operation of the equipment to "limp home" under at least partial power.

With another aspect, a battery system supports "smart discharge" in order to power equipment (end device). Battery packs with varying SoC's may be connected to an end device to provide electrical power to the device. However, battery packs that have a large SoC variation cannot be immediately connected together to power the end device and may necessitate charge balancing to be performed. Battery packs are then selectively enabled from a plurality of battery packs in the battery system so that the battery packs can properly discharge.

With another aspect, a battery system supports "smart charge" in order to restore charge to its battery cells. A battery system having battery packs with varying SoC's may be connected to a charger in order to restore the SoC's of each battery pack and to reduce the SoC variability among the battery packs. If the battery packs have a large SoC variation, the battery packs cannot be immediately connected to the charger at the same time. Measures are thus supported to circumvent this situation by enabling charging of selected battery packs at the appropriate time based on dynamic SoC characteristics.

With another aspect, a battery system supports stackable charging, where multiple chargers are connected in parallel to charge battery packs. Typically, if one pack enters charge protection, the total current is supplied to the remaining battery packs, which could result in an over current charge protection in the remaining battery packs, and charging may eventually stop. A battery feature is provided that identifies the number of connected battery packs. The master battery pack consolidates data from the battery packs and communicates with a master charger from the charger system and adjusts the current accordingly.

BRIEF DESCRIPTION OF THE DRAWINGS

The foregoing summary, as well as the following detailed description of exemplary embodiments, is better understood when read in conjunction with the accompanying drawings, which are included by way of example, and not by way of limitation with regard to the claimed invention.

FIG. 25A is an embodiment where the logic to decide when to activate the signal resides in a gateway PCBA. FIG. 25B is an embodiment where the logic resides in a battery pack system and a gateway PCBA reads/receives this signal from a master battery pack in the battery pack system and sets a hardware pin accordingly. FIG. 25C is an embodiment where the hardware signal resides in the battery pack system and no gateway PCBA is used.

FIG. 29A is an embodiment where the hardware signal resides in a gateway PCBA. FIG. 29B is an embodiment where the hardware signal resides in a battery pack system and no gateway PCBA is used.

DETAILED DESCRIPTION

Figure 1:
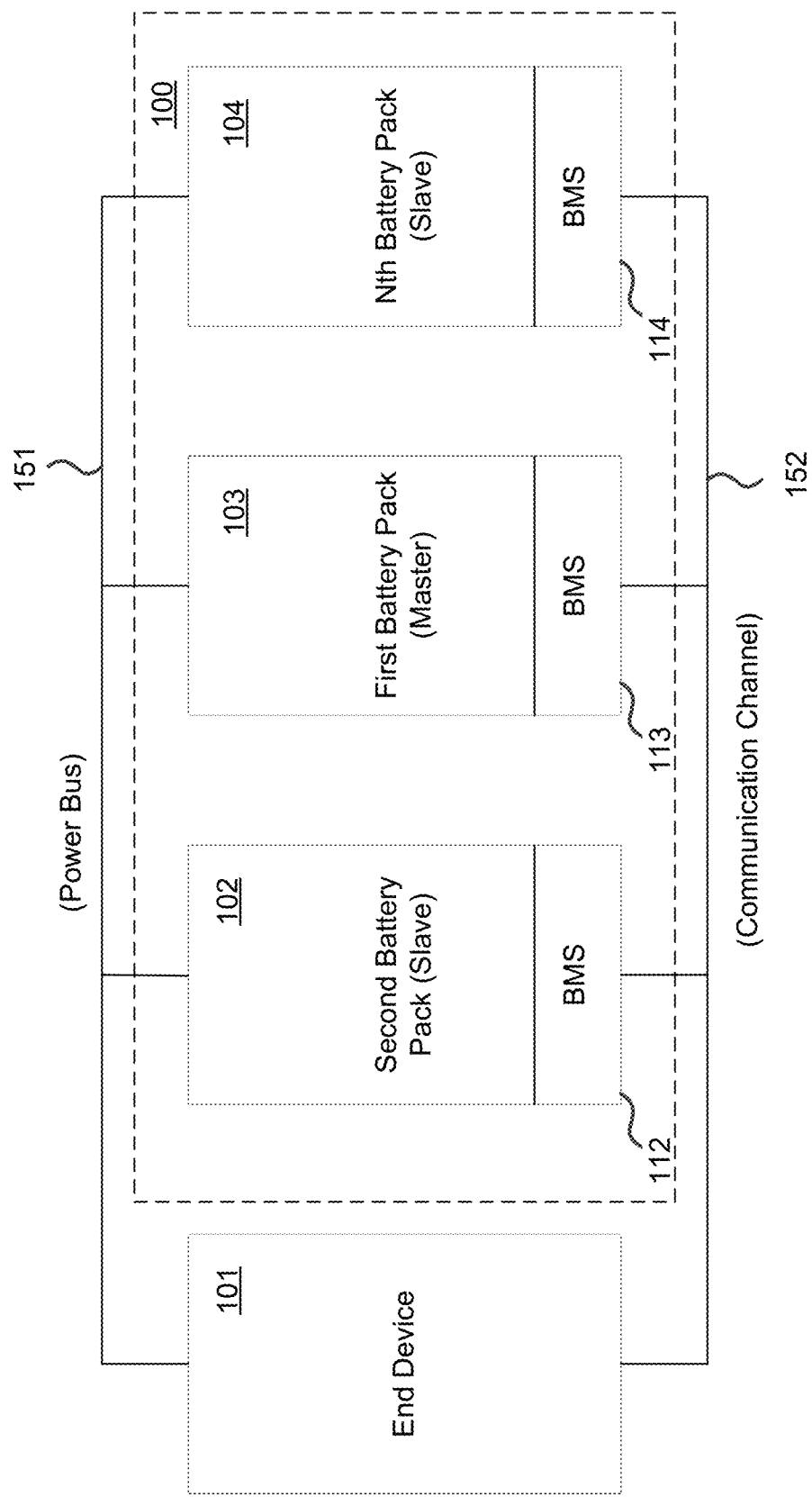
FIG. 1 shows an end device electrically powered by a plurality of battery packs in accordance with an embodiment.

According to an aspect of the embodiments, a battery system with a large-format battery (e.g., a Li-ion battery) powers attached equipment (an end device) by discharging battery cells distributed among a plurality of battery packs. The discharging of the battery cells is controlled in an efficient manner while preserving the expected life of the Li-ion battery cells. Some advantages in using Li-ion batteries over the traditional lead acid batteries include longer run time, zero maintenance, faster charging, reduced weight, longer lifespan, and better insight into battery parameters such as state of charge (SoC), state of health (SoH), etc. However, there are charger considerations to be made when making the switch from lead acid to Li-ion batteries. Charger types may include standalone chargers for lead acid replacement or intelligent chargers for smart batteries. Some Li-ion charging concerns include charging compatibility, charger unable to charge battery, charger failing to stop charging, stackable chargers and charging beyond limits, and communication issues.

According to another aspect of the embodiments, a battery system may support different advanced technology batteries of different chemistries and/or structures including, but not limited to, Li-ion batteries and solid state batteries.

Each battery pack internally supports a battery management system (BMS), thus circumventing the need of an external battery management in contrast to traditional approaches. Moreover, each of the battery packs may have identical electrical and electronics components, thus supporting an architecture that easily scales to higher power/energy output as needed by an end device. Battery packs may be individually added or removed, where one of the battery packs serves as a master battery pack and the remaining battery packs serve as slave battery packs. Moreover, configuration of the battery packs may be automatically performed without user interaction. When the master battery pack is removed, one of the slave battery packs is automatically reconfigured to become the master battery pack. Charging and discharging of the battery cells is coordinated by the master (e.g., primary) battery pack with the slave (e.g., secondary) battery packs over a communication channel such as a controller area controller (CAN) bus.

In addition, the battery system may be efficiently charged in order to restore charge to the battery cells while preserving the life expectancy of the battery cells.

Rechargeable medium-to-large format battery packs with battery management systems are providing power for small, portable devices and are also extending to larger mobile and stationary uses. Moreover, transportation applications spanning smaller uses such as scooters to larger ones such as full-size autos are contemplated with rechargeable batteries. Industrial applications are also contemplated as battery-based designs are replacing small internal combustion engines for lawn mowers and yard equipment in both commercial and consumer products. Enabling electrification has several advantages, including but not limited to, elimination of polluting emissions, reduced noise, and lower maintenance needs. Furthermore, self-contained backup power systems for residential and commercial sites are benefiting from battery-based designs which eliminate the issues associated with on-site hydrocarbon-based fuel storage.

FIG. 1 shows end device 101 electrically powered by a plurality of battery packs 100 (battery system) in accordance with an embodiment. Each battery pack 102, 103, and 104 includes its own internal battery management system (BMS) 112, 113, and 114, respectively. Battery packs 102, 103, and 104 are electrically connected to a direct current (DC) power bus 151 (comprising positive and negative connections) so that the voltage presented to end device 101 is essentially the same as the voltage provided by each battery pack 102, 103, and 104 while the electrical current supplied to end device 101 is the sum of individual electrical currents provided by each battery pack. Battery packs 100 may be housed within end device 101, mounted to end device 101, or externally situated with respect to end device 101.

End device 101 may assume different types of devices including, but not limited to, power tools, lawn mowers, garden tools, appliances, and vehicles including forklifts, cars, trucks, and so forth.

Figure 16:
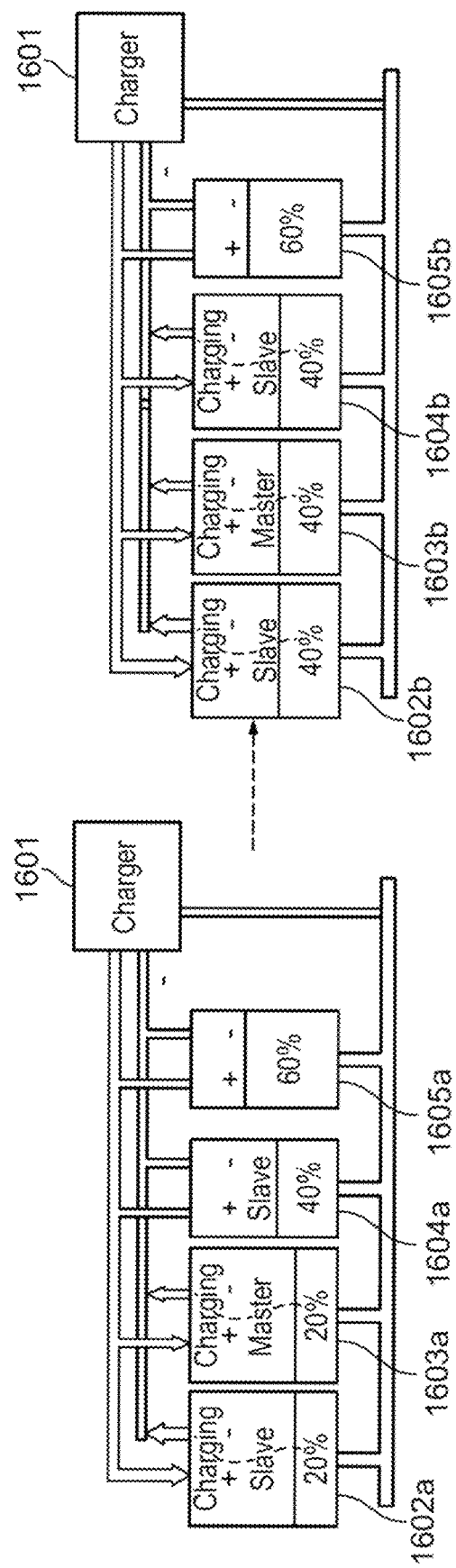
FIG. 16 shows an example of charging a plurality of battery packs in accordance with an embodiment.

Battery management systems 112, 113, and 114 communicate with all of the battery packs as well as end device 101 and/or charger 1601 (as shown in FIG. 16) over communication channel 152. For example, communication channel 152 may comprise a serial communication channel (e.g., a controller area network (CAN) bus) or a parallel communication bus. However, embodiments may support other types of communication channels such as Ethernet, Industrial Ethernet, I$^2$C, Microwire, or Bluetooth Low Energy (BLE). In some cases, the communication channel may support synchronous communication (e.g., CAN) or asynchronous communication (e.g., RS-232, RS-422, RS-485, etc.)

The CAN and Ethernet protocols support the lower two layers of the OSI model while the BLE protocol spans the lower layers as well as the higher layers including the application layer. Consequently, embodiments utilizing protocols such as CAN and Ethernet must support the equivalent higher layers by software applications built on top of the two lower layers.

Embodiments may support different messaging protocols. For example, a protocol may support node to node communication by supporting both a source address and a destination address. The destination address may specify a particular node address or may be a global address so that a message may be broadcast to more than one node. In some cases, a protocol (such as the CAN protocol, the Modbus protocol, etc.) may support only a single source address (e.g., a master address) so that all nodes may process a message broadcast over a communication channel.

Battery packs 102, 103, and 104 may each connect to communication channel 152 in a parallel fashion. However, embodiments may support different arrangements such as pack-to-pack communication on separate busses or a daisy chain connection through each battery pack.

Battery packs 102, 103, and 104 may have similar or identical electrical and electronic components. After being inserted into a battery system, one of the battery packs 102, 103, or 104 may be configured as a master battery pack or a slave battery pack. Moreover, if a battery pack initially serves as a slave battery pack, it may subsequently serve as a new master battery pack if the current master battery pack is removed.

Figure 2A:
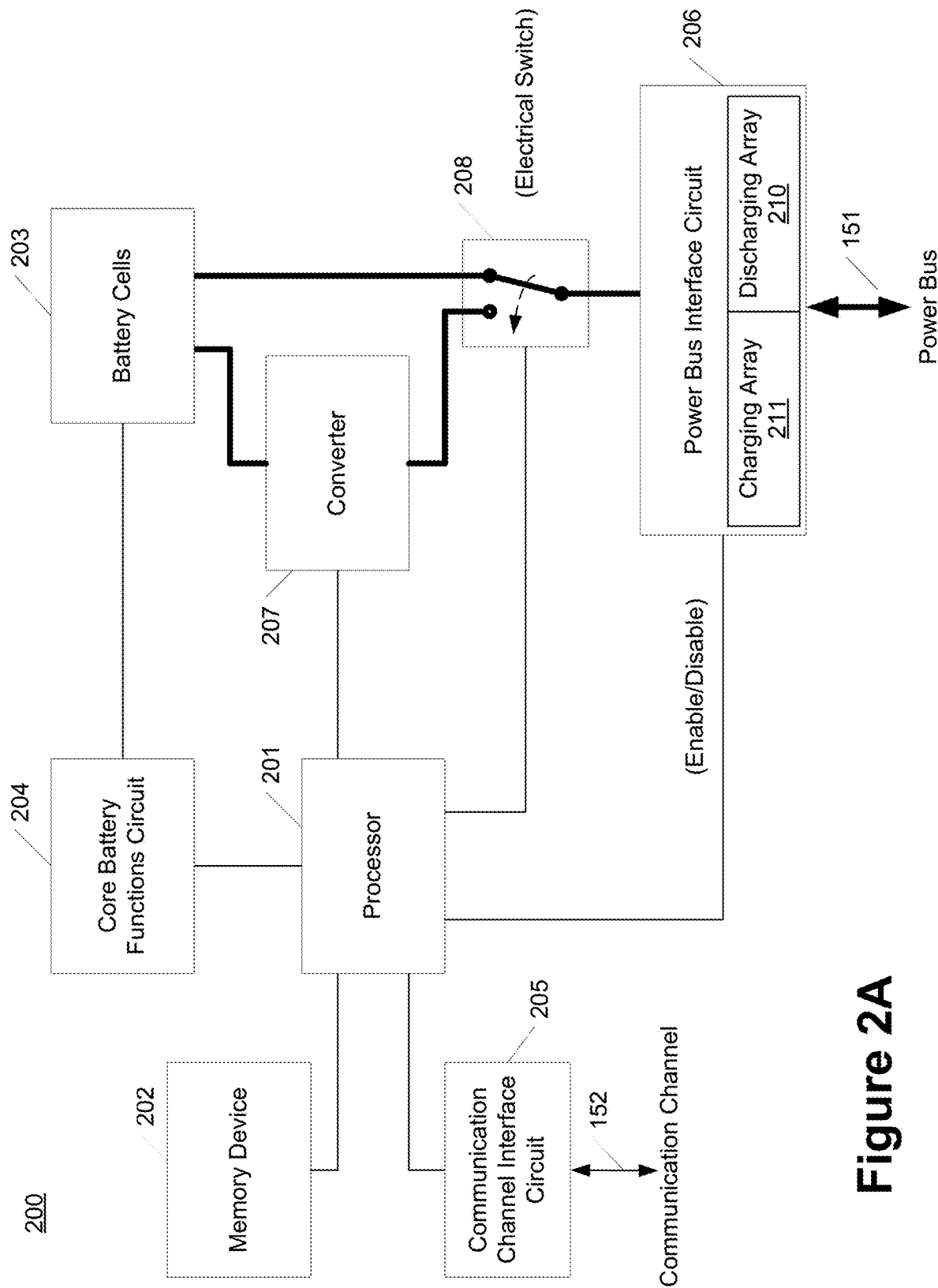
FIG. 2A shows a battery pack with an internal battery management system (BMS) in accordance with an embodiment.

FIG. 2A shows battery pack 200 with an internal battery management system (BMS) in accordance with an embodiment. The battery management system may be implemented by processor 201, which may comprise one or more microprocessors, controllers, microcontrollers, computing devices, and/or the like, executing computer-executable instructions stored at memory device 202.

As will be discussed, battery pack 200 may be configured as either a master battery pack or a slave battery pack without any change to the electrical or electronic components.

The power circuitry (including battery cells 203) of battery pack 200 interacts with power bus 151 through power bus interface circuit 206 when battery pack 200 is discharging, charging, and/or being balanced with respect to the other battery packs as will be discussed.

Battery pack 200 also interacts with communication channel 152 via communication channel interface circuit 205. For example, battery pack 200 may support messaging with other configured battery packs, with the end device being powered by the battery packs, or with a charger charging battery cells 203. Exemplary message flows are shown in FIGS. 6A-B, 8, 10, 12, 14-15, 18A-B, 21, and 23A-B as will be discussed in further detail.

Battery pack 200 supports core battery monitoring and/or management functionality via core battery functions circuit 204. For example, core battery functions may include battery cell status, battery cell balancing, short circuit protection, high temperature cut-off, over-current cut-off, and over-charge protection.

Referring to FIG. 2A, battery cells 203 may include a plurality of battery cells that are connected in series to obtain a desired voltage level. For example, with Li-ion technology, each battery cell may have a nominal voltage of approximately 3.6 volts. With four battery cells connected in series, the total nominal voltage provided by battery pack 200 is approximately 14.4 volts. When battery cells 203 comprises a plurality of battery cells, core battery functions circuit 204 may internally balance the charge among the different battery cells. In addition, battery pack 200 may be charge balanced with respect to the other battery packs in a battery system. The battery packs are often configured in a parallel fashion so that the resultant electrical current offered to an end device is the sum of electrical currents of the battery packs at an approximate voltage level of an individual battery pack.

Status information may include the state of charge (SoC) information, state of health (SoH) information, temperature information, charging time information, discharge time information, and/or capacity information of the battery cells and/or of the battery pack.

As one with skill in the art would appreciate, the SoC is understood to be the level of charge of an electric battery relative to its capacity. The units of SoC are typically percentage points (0%=empty; 100%=full).

The SoH typically does not correspond to a particular physical quality since generally there is no consensus in the industry on how SoH should be determined. However, the SoH is indicative of internal resistance, battery storage capacity, battery output voltage, number of charge-discharge cycles, temperature of the battery cells during previous uses, total energy charged or discharged, and/or age of the battery cells to derive a value of the SoH. Knowing the SoH of the battery cells of battery pack 200 and the SoH threshold of a given end device (application) may provide a determination whether the present battery conditions are suitable for an application and an estimate about the battery pack's useful lifetime for that application.

When performing processes associated with battery management, battery pack 200 may receive or send values of at least the SoC and/or SoH from/to other battery packs as will discussed in further detail.

Power bus interface circuit 206 may comprise a switch circuit such as a semiconductor array 210 (for example, a MOSFET array or other power semiconductor switch device, such as an insulated gate bipolar transistor (IGBT) array, a thyristor array, etc.) that allows electrical current flow from battery pack 200 when battery pack 200 is discharging, and semiconductor array 211 that allows electrical current flow to battery pack 200 when battery pack 200 is charging. Arrays 210, 211 are appropriately enabled by processor 201 in response to messaging from the master battery pack controller. (In a situation when battery pack is the master battery pack, messaging is internal to battery pack 200 rather via communication channel 152.) The power MOSFET arrays (e.g., N-Channel MOSFETs) may be used as switches to control power flow to and from the battery cells. The gates of the MOSFET arrays may be controlled by signals generated by a microcontroller and/or a battery management IC.

Power bus interface circuit 206 may be configured to prevent battery pack 200 from being charged or discharged through power bus 206 based on the status of battery cells 203 (for example, SoC, SoH, and/or voltage). Typically, arrays 210 and 211 are disabled when a battery pack is inserted into a battery system so that the battery pack does not charge or discharge until instructed and/or controlled by the master battery pack.

Battery pack 200 interacts with power bus 151 via electrical switch 208 (which may comprise one or more semiconductor devices). As shown in FIG. 2, direct exposure to power bus 151 bypasses converter 207. However, if battery cells are charged when the battery cells have a small SoC, the battery cells may incur an electrical current in-rush, often resulting in damage or degradation. Consequently, when the battery management system detects such a condition, electrical switch 208 may be configured so that charging of the battery pack 200 is controlled to minimize inrush current from the power bus 151 via the converter 207.

Figure 9:
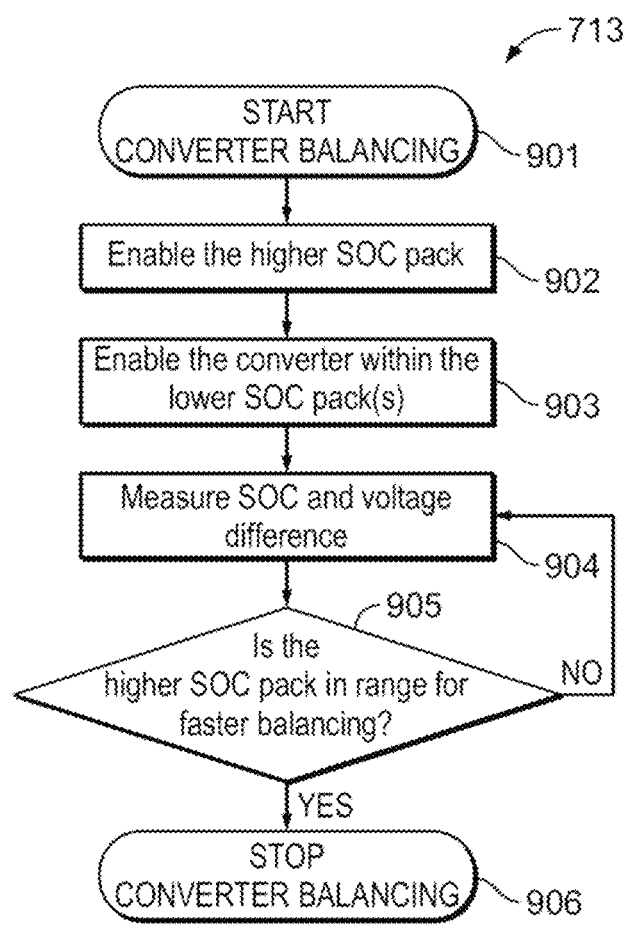
FIG. 9 shows a flowchart for converter balancing with a plurality of battery packs in accordance with an embodiment.
Figure 11:
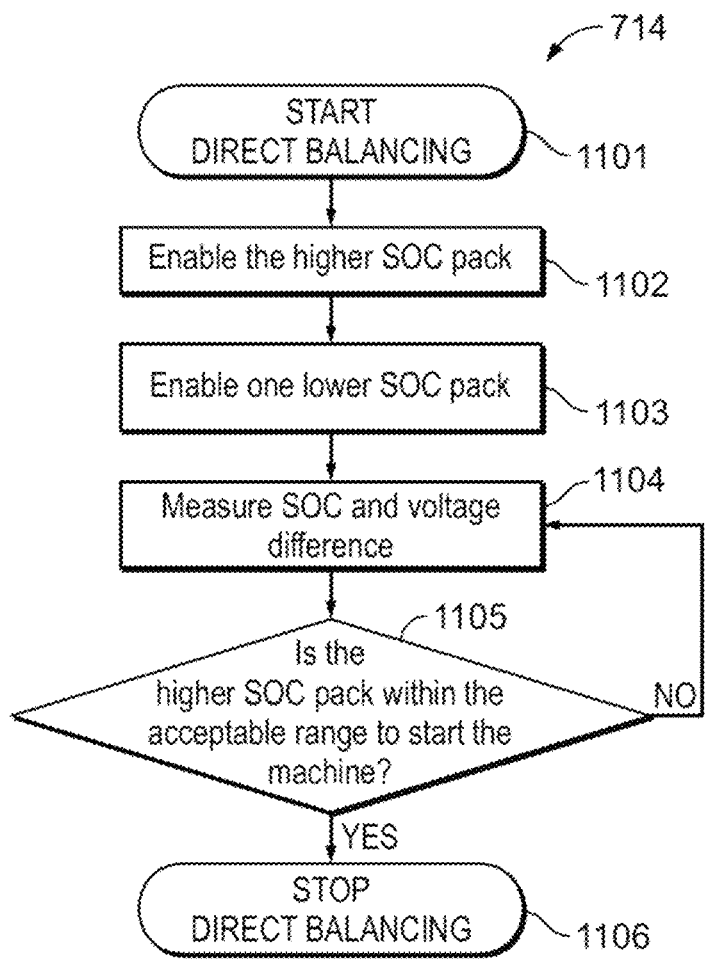
FIG. 11 shows a flowchart for direct balancing with a plurality of battery packs in accordance with an embodiment.

Converter 207 may assume different forms capable of controlling power transfer between the power bus and the cells of the battery pack such as by providing a stepped-down output voltage with respect to the input voltage (e.g., a buck converter, a Ćuk converter, a buck-boost converter, a single-ended primary-inductor converter (SEPIC) converter, etc.) to protect battery cells 203 from an electrical current in-rush and enable battery cells 203 to slowly charge (for example, corresponding to converter balancing flowchart 713 as shown in FIG. 9). However, when converter 207 is bypassed, battery cells 203 may charge at a quicker rate (for example, corresponding to direct balancing flowchart 714 as shown in FIG. 11).

Processor 201 may support battery management processes (for example, processes 500, 700, 713, 714, 715, 1700, 2000, and 2200 as shown in FIGS. 5, 7A, 9, 11, 13, 17, 20, and 22, respectively) discussed herein. Processor 201 may control the overall operation of battery pack 200 and its associated components. Processor 201 may access and execute computer readable instructions from memory device 202, which may assume a variety of computer readable media. For example, computer readable media may be any available media that may be accessed by processor 201 and may include both volatile and nonvolatile media and removable and non-removable media. By way of example, and not limitation, computer readable media may comprise a combination of computer storage media and communication media.

Computer storage media may include volatile and nonvolatile and removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media may include computer readable instructions, data structures, program modules or other data in a modulated data signal such as a carrier wave or other transport mechanism and includes any information delivery media. Modulated data signal can be a signal that has one or more of its characteristics set or changed in such a manner as to encode information in the signal. By way of example, and not limitation, communication media may include wired media, such as a wired network or direct-wired connection, and wireless media such as acoustic, RF, infrared and other wireless media.

While processor 201 and communication channel interface circuit 205 may be powered by battery cells 203, embodiments may have a separate power source for processor 201 and interface circuit 205. Consequently, battery pack 200 may continue to interact with the other battery packs over the communication channel regardless of the status of battery cells 203.

Figure 2B:
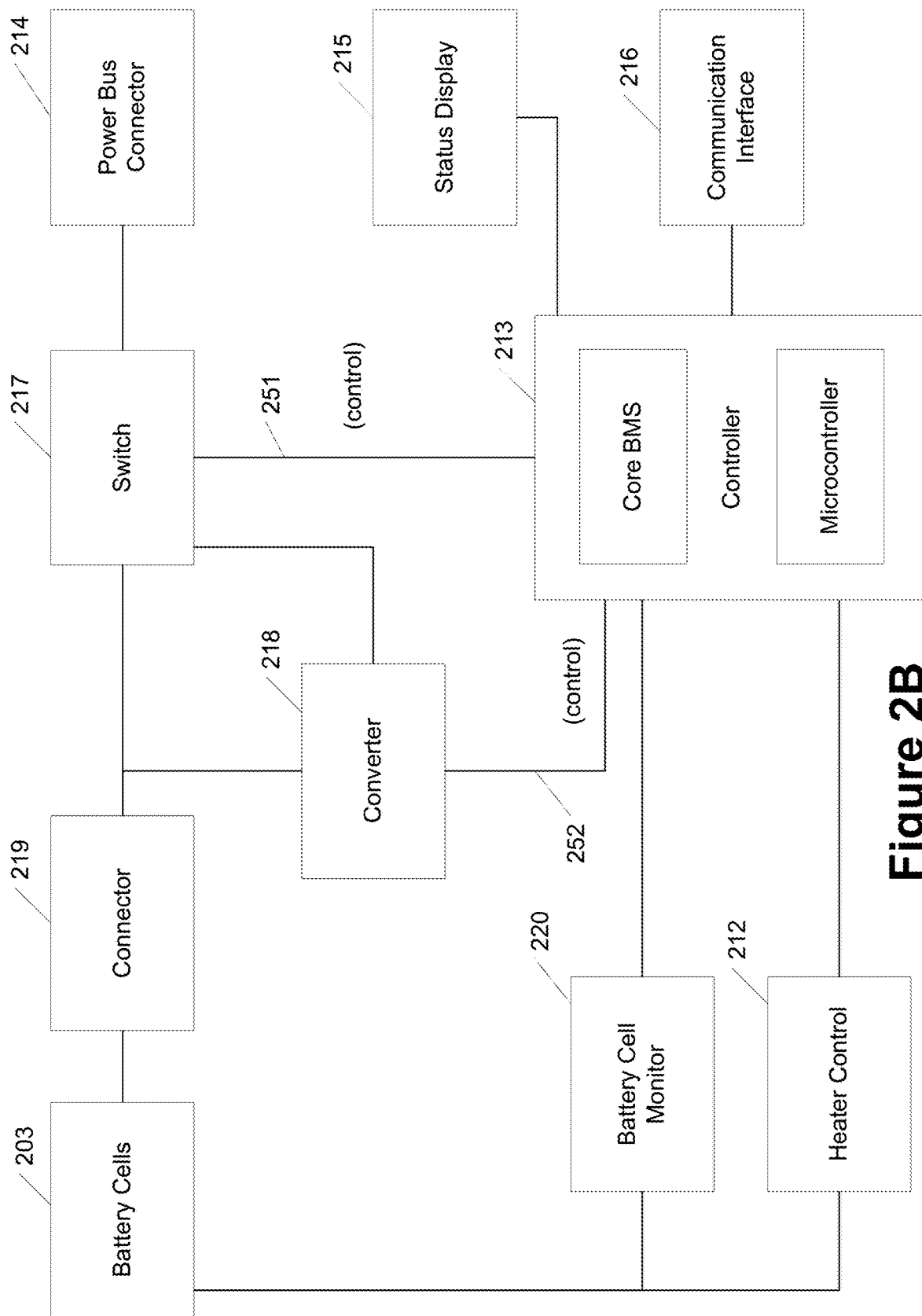
FIG. 2B shows a battery pack with an internal battery management system (BMS) in accordance with an embodiment.

FIG. 2B shows a variation of battery pack 200 shown in FIG. 2A. Battery cells 203 interact with the power bus through power bus connector 214, switch 217, converter 218, and connector 219. Switch 217 may include two sets (arrays) of semiconductor devices (for example, MOSFET's, insulated-gate bipolar transistors (IGBTs), thyristors, and so forth) for allowing electrical current flow in either direction (into the battery pack for charging and out of the battery pack for discharging). Both arrays may be disabled to isolate the battery pack from the power bus. Typically, both arrays are disabled when a battery pack is inserted into a battery system. In addition, enabled converter 218 may be used to reduce an input voltage level to control charging of the battery cells to prevent an electrical current in-rush that may occur in some situations as will be discussed.

Controller 213 executes computer-executable instructions to perform processes discussed herein. For example, controller 213 obtains status information (for example, the SoC value) from battery cells 203 via battery monitor 220, provides battery pack status information via status display 215, and interacts with a communication channel (for example, a CAN bus) via communication bus interface 216.

In addition, a heater control circuit 212 may be used to ensure that the temperature of battery cells 203 does not drop below a minimum value so that battery cells 203 can properly operate as expected.

Figure 3:
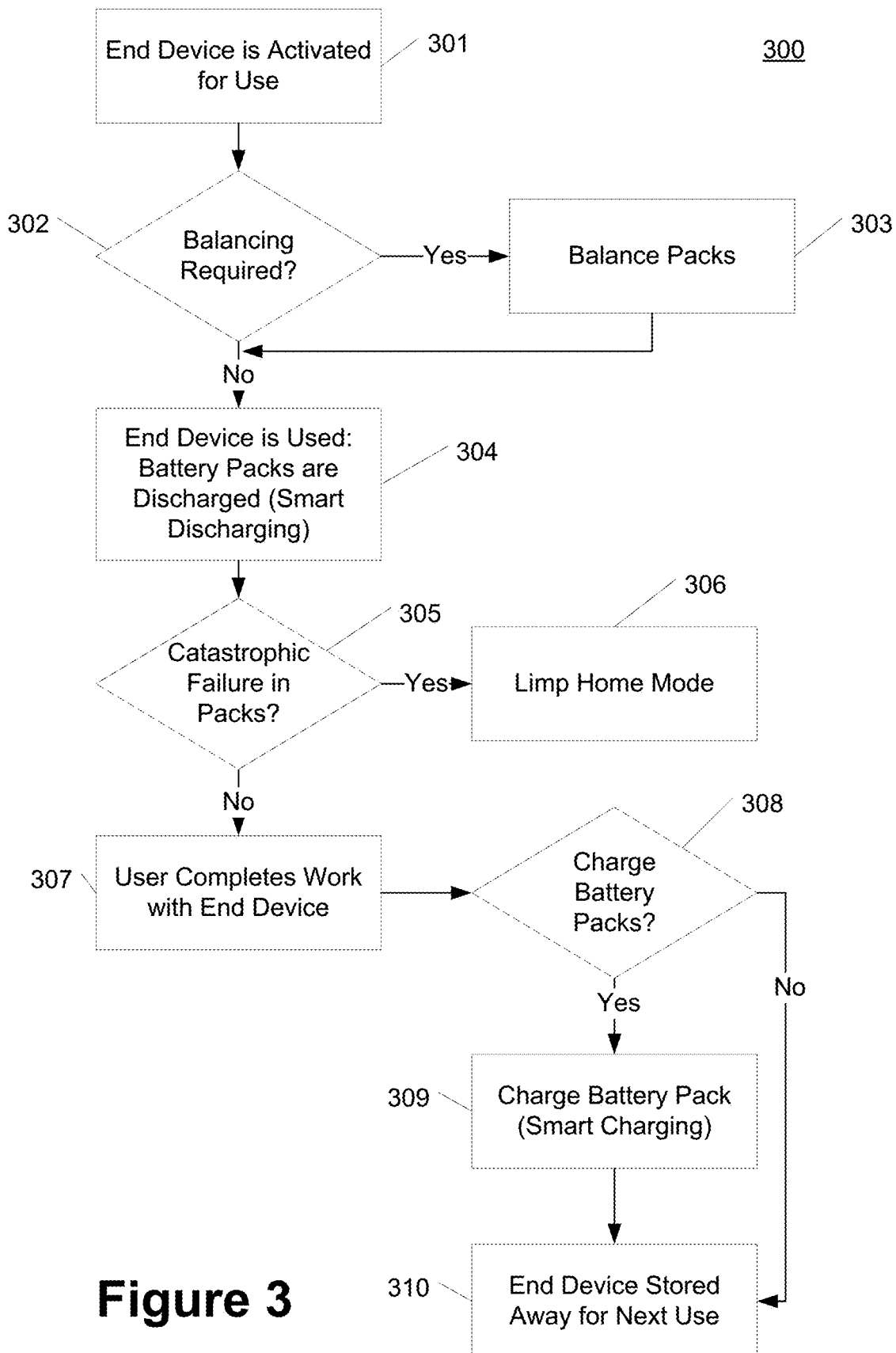
FIG. 3 shows a flowchart for an overall process of electrically powering an end device by a plurality of battery packs in accordance with an embodiment.

FIG. 3 shows flowchart 300 for an overall process of electrically powering an end device (for example, end device 101 as shown in FIG. 1) by a plurality of battery packs (for example, battery packs 100) in accordance with an embodiment.

At block 301, end device 101 is activated. For example, a user may close a battery compartment of end device 101, turn a key, and/or flip a switch to generate an interlock signal.

At block 302, the battery management system of the master battery pack determines whether to balance the battery packs when the battery compartment has more than two battery packs. If so, the difference of charge of the battery packs may be reduced by one or more battery packs discharging to charge one or more of the other battery packs at block 303 as will be discussed in further detail.

After balancing (if needed), the end device is powered by discharging one or more of the battery packs at block 304. For example, based on the power requirements of the end device and the SoC values of the battery packs, the battery management system of the master battery pack may enable the appropriate battery packs.

If a catastrophic failure is detected at block 305 for one of the enabled battery packs while powering the end device, limp home mode operation at block 306 may be initiated in order to continue powering the end device as will be discussed in further detail.

When the user completes using the end device at block 307, block 308 determines whether charging is needed. If so, a charger may be connected to the battery system to restore the battery cells, where charging may be initiated at block 309.

While not explicitly shown, balancing of the battery packs may be performed before charging the battery packs at block 308 when the SoC values of the battery packs are sufficiently different.

With the embodiments, all of the plurality of battery packs may have the same electrical and electronic components. No configuration is typically needed to a battery pack when the battery pack is installed in the battery system. Rather, the battery pack assumes the role of either a master battery pack or a slave battery pack based on processes discussed herein after the battery pack is inserted into the system and the battery pack commences activity on the communication channel. As will be discussed in further detail, a configuration list may be conveyed over the communication channel, where the configuration includes entries for each of the master and slave battery packs.

The processes discussed herein are shown from the perspective of the master battery pack and are typically executed by the master battery pack in the battery system. The other installed battery packs in the battery system serve as slave battery packs. However, the slave battery packs interact with the master battery pack over the communication channel. For example, a slave battery pack provides its battery cell status information and activates/deactivates power switches to interact with the power bus (for example, allowing electrical current (charge) to flow into or from the battery pack) responsive to messaging from the master battery pack. Consequently, while not explicitly shown, there are corresponding processes executed by each of the slave battery packs.

Figure 4:
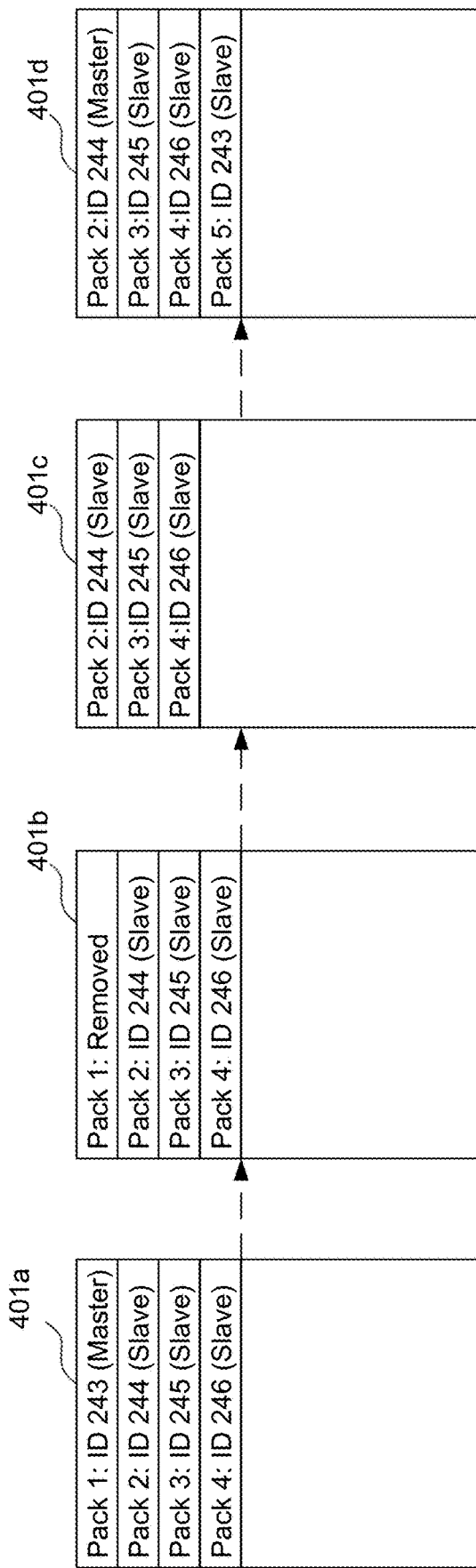
FIG. 4 shows an updating of a configuration list of a plurality of battery packs in accordance with an embodiment.

FIG. 4 shows an updating of configuration list 401a,401b, 401c,401d of a plurality of battery packs as different battery packs are inserted into and removed from the battery system. Each battery pack is assigned an identification (ID) in accordance with a standardized process, such as the SAE J1939 Address Claim Procedure and/or the like. For example, configuration list 401a contains four entries: pack 1 (which is configured as the master battery pack) and three slave battery packs (packs 2-4).

As will be discussed in greater detail, the master battery pack gather status information about the other battery packs (the slave battery packs) and consequently instructs the slave battery packs, as well as itself, to discharge or charge in response to the operation situation.

With the embodiment shown in FIG. 4, the first (top) member of configuration list 401a,401b,401c,401d is configured as the master battery pack. When a battery pack is added to the battery system, an entry is created at the bottom of the configuration list for that battery pack. Consequently, the oldest member of configuration list 401a,401b,401c, 401d is configured as the master battery pack.

Selecting the oldest (top) member of configuration list 401c may be advantageous to traditional approaches. For example, the number of changes of the master battery packs may be reduced with respect to determining the master battery pack based on the ID value. With the latter approach, a second change would occur from configuration list 401d, where pack 5 would become the master battery pack.

In the installation scenario shown in FIG. 4, pack 1 (which serves as the master battery pack) is removed as shown in configuration list 401b. Consequently, pack 2 (the oldest slave battery pack) becomes the new master battery pack as shown in configuration list 401c. In order to complete the transition, pack 2 may request pack information from the other battery packs to be able to properly instruct the other battery packs.

Subsequently, pack 5 is inserted into the battery system resulting in a new entry being added to configuration list 401d, where ID 243 is the same ID for previously removed pack 1. With embodiment shown in FIG. 4, pack 5 may be an old master battery pack that is reinserted or a new battery pack that is inserted into the battery system.

With some embodiments, when a battery pack is removed from a battery system, battery pack information may be lost. When the battery pack is reinserted, the reinserted battery pack may obtain battery information from the configured battery packs. However, some embodiments may support memory persistence (e.g., flash memory) so that battery pack information is retained at the battery pack even when the battery pack is removed and reinserted.

Figure 5:
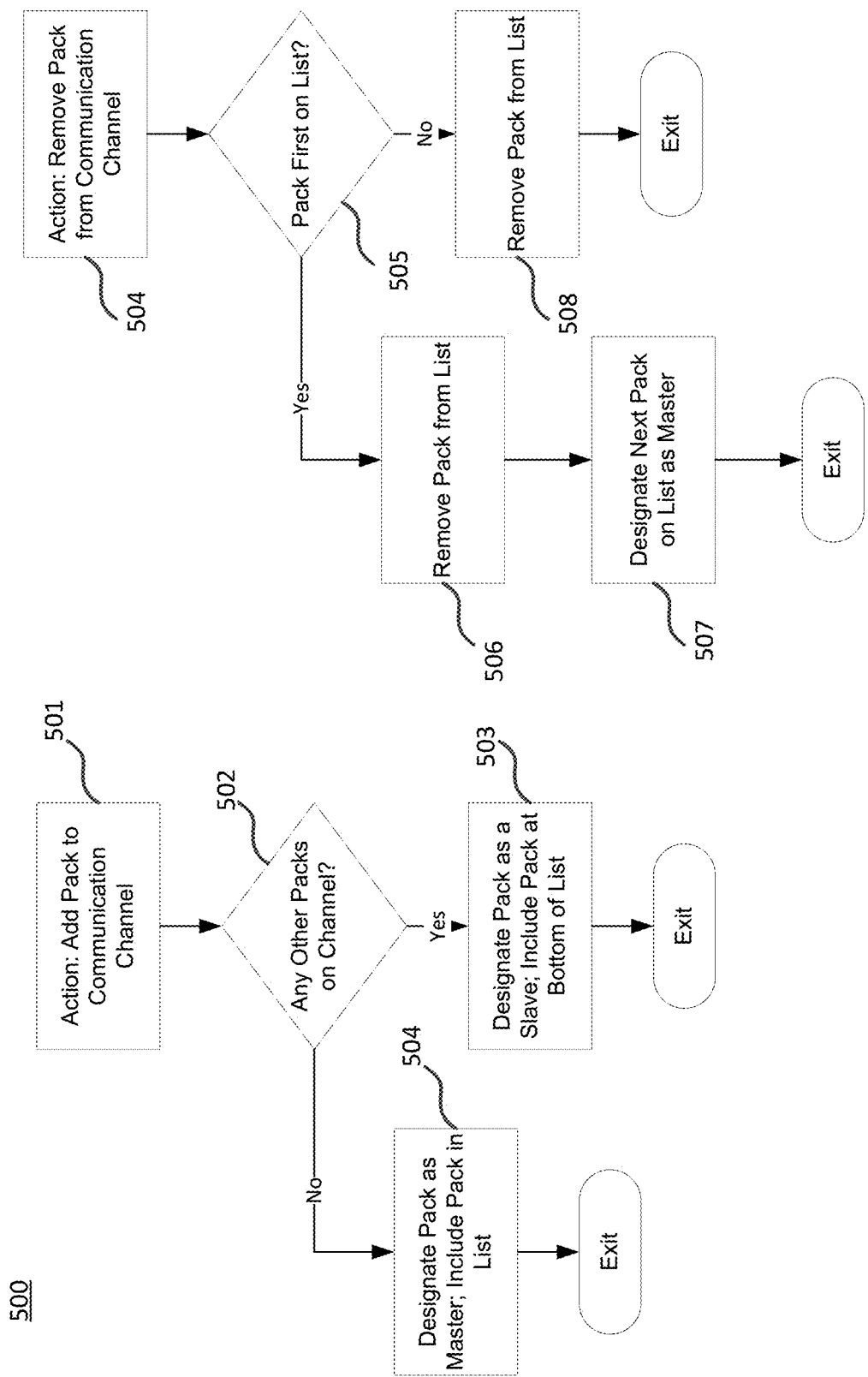
FIG. 5 shows a flowchart for configuring a plurality of battery packs in accordance with an embodiment.

FIG. 5 shows flowchart 500 for configuring a plurality of battery packs in accordance with an embodiment. At block 501, a battery pack is added to the battery system. If no other battery packs are connected to the communication channel, as determined at block 502, an entry is added to the top of the configuration list, and the battery pack becomes the master battery pack at block 504. Otherwise, the added battery pack is added to the bottom of the configuration list and becomes a slave battery pack at block 503.

At block 504, a battery pack is removed from the battery system. If the battery pack is the first member of the configuration list, as determined at block 505, the entry is removed at block 506 and the battery pack corresponding to the next entry is designated as the master battery pack at block 507. Otherwise, the entry for the removed battery pack is deleted at block 508.

Figure 6A:
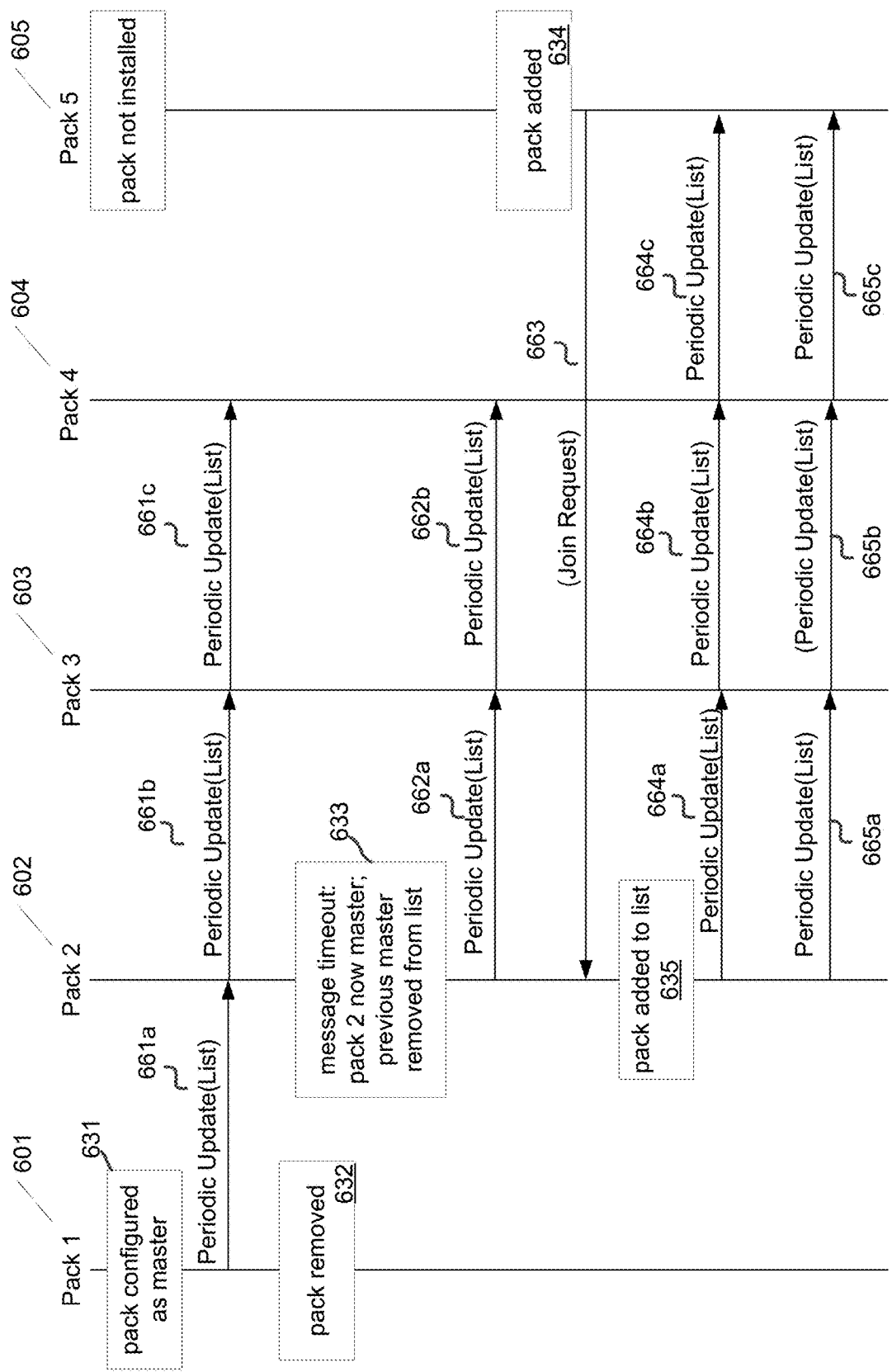
FIG. 6A shows a generic message flow scenario for configuring a plurality of battery packs in accordance with an embodiment.

FIG. 6A shows a generic message flow scenario for configuring a plurality of battery packs in accordance with flowchart as shown in FIG. 5. The generic messages represent messages supported by different communication channels, for example via a controller area network (CAN) bus, Ethernet, Industrial Ethernet, MODBUS, or Bluetooth Low Energy (BLE) and/or the like.

The message flow in FIG. 6A is based on a centralized approach, in which the master battery pack maintains the configuration list and repetitively sends it (for example, periodically) to the other battery packs over a communication channel. However, embodiments (for example, as shown in FIG. 6D) may support a distributed approach, in which each battery pack locally maintains its own configuration list and repetitively broadcasts it over the communication channel. Since a battery pack receives all broadcasts from the other battery packs, the battery pack is able to modify its own configuration list to be consistent with the configuration lists broadcast by the other battery packs.

When pack 601 (pack 1) becomes the master battery pack at event 631, pack 601 sends periodic update messages 661a,661b,661c to packs 602, 603, and 604, respectively. If the message protocol supports a single broadcast message (for example, with a global destination address) that is received and processed by all battery packs connected to the communication channel, then only one message is sent by pack 601. Otherwise, pack 601 sends separate messages to packs 602, 603, and 604 (which are configured as slave battery packs).

With some embodiments, messages 661a, 661b, 661c may be sent repetitively but not periodically.

Periodic update message 661a, 661b, 661c may contain configuration information (for example configuration list 401a, 401b, 401c, 401d as shown in FIG. 4). With some embodiments, pack 601 sends broadcast messages periodically. However, if pack 601 were removed (for example, corresponding to event 632), periodic transmission of the update messages would be disrupted.

When the disruption is detected by the oldest slave battery pack (pack 602) at event 633, pack 602 assumes the role of the master battery pack. Consequently, pack 602 removes the top entry of the configuration list (corresponding to pack 601) and periodically sends the revised configuration list via update message 662a, 662b.

When pack 605 (pack 5) is added at event 634, pack 605 sends join request 663 in accordance with the SAE J1939 address claim procedure. Consequently, pack 605 is added by pack 602 (currently the master battery pack) at event 635, and pack 602 periodically sends update messages 664a, 664b, 664c and 665a, 665b, 665c.

Figure 6B:
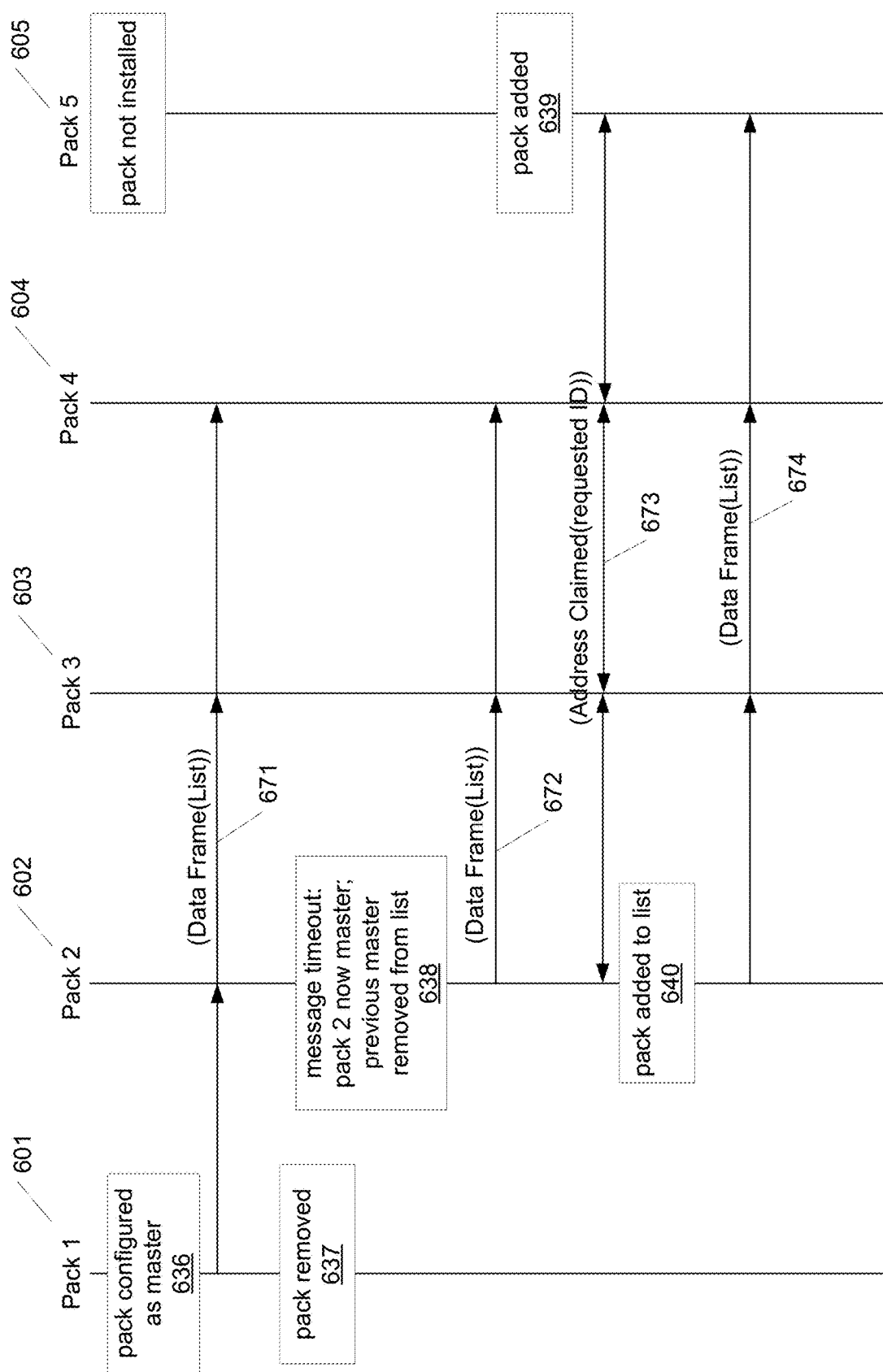
FIG. 6B shows a message flow scenario over a controller area network (CAN) bus for configuring a plurality of battery packs in accordance with an embodiment.

FIG. 6B shows a message flow scenario over a CAN bus for configuring a plurality of battery packs in accordance with an embodiment.

The CAN communications protocol (ISO-11898: 2003) describes how information is passed between devices on a network and conforms to the Open Systems Interconnection (OSI) model that is defined in terms of layers. Actual communication between devices connected by the physical medium is defined by the physical layer of the model. The ISO 11898 architecture defines the lowest two layers of the seven-layer OS/ISO model referred as the data-link layer and physical layer.

The CAN communication protocol supports both a standard version (11-bit identifier field) and an extended version (29-bit identifier field). However, embodiments typically use the standard version because the supported identifier space is typically more than enough.

The CAN bus is often referred to as a broadcast type of bus, where each message contains a source address (for example, a device ID) but not a destination address. Consequently, all battery packs (corresponding to nodes) can "hear" all transmissions. A battery pack may selectively ignore a message or may process the message by providing local filtering so that each battery pack may respond to pertinent messages.

Embodiments may use the data frame message specified in the CAN protocol. This message type carries a 0-8 byte payload, where the data field is interpreted at a higher protocol layer (typically by a software application executing at the battery packs). For example, the data field may convey SoC and/or SoH information when a slave battery pack sends status information back to the master battery pack.

In order to assign an identification value (address) to a battery pack, end device, or charger, embodiments may utilize an industry standard, such as the SAE J1939 address claim procedure. The SAE J1939 protocol is a higher protocol layer built on top the CAN data-link and physical layers.

Referring to FIG. 6B, when pack 601 (pack 1) becomes the master battery pack at event 636, pack 601 sends periodic data frame message 671 to packs 602, 603, and 604, respectively. (Because the CAN protocol supports only a source address, all battery packs may receive and process a single broadcast message sent via the CAN bus.) Data frame message 671 corresponds to periodic update message 661a, 661b, 661c shown in FIG. 6A. Data frame message 671 contains at least the configuration list in the payload.

When pack 601 is removed (for example, corresponding to event 637), periodic transmission of the periodic data frame messages is disrupted.

When the disruption is detected by the oldest slave battery pack (pack 602) at event 638, pack 602 assumes the role of the master battery pack. Consequently, pack 602 removes the top entry of the configuration list (corresponding to pack 601) and periodically sends the revised configuration list via data frame message 672.

When pack 605 (pack 5) is added at event 639, pack 605 initiates the address claimed procedure 673 claiming its identification (ID) value. When successfully completed, an entry with the identification of pack 605 is added to the bottom of the configuration list by master battery pack 602 at event 640.

Subsequently, pack 602 (now the master battery pack) periodically sends broadcast data frame message 674.

Figure 6C:
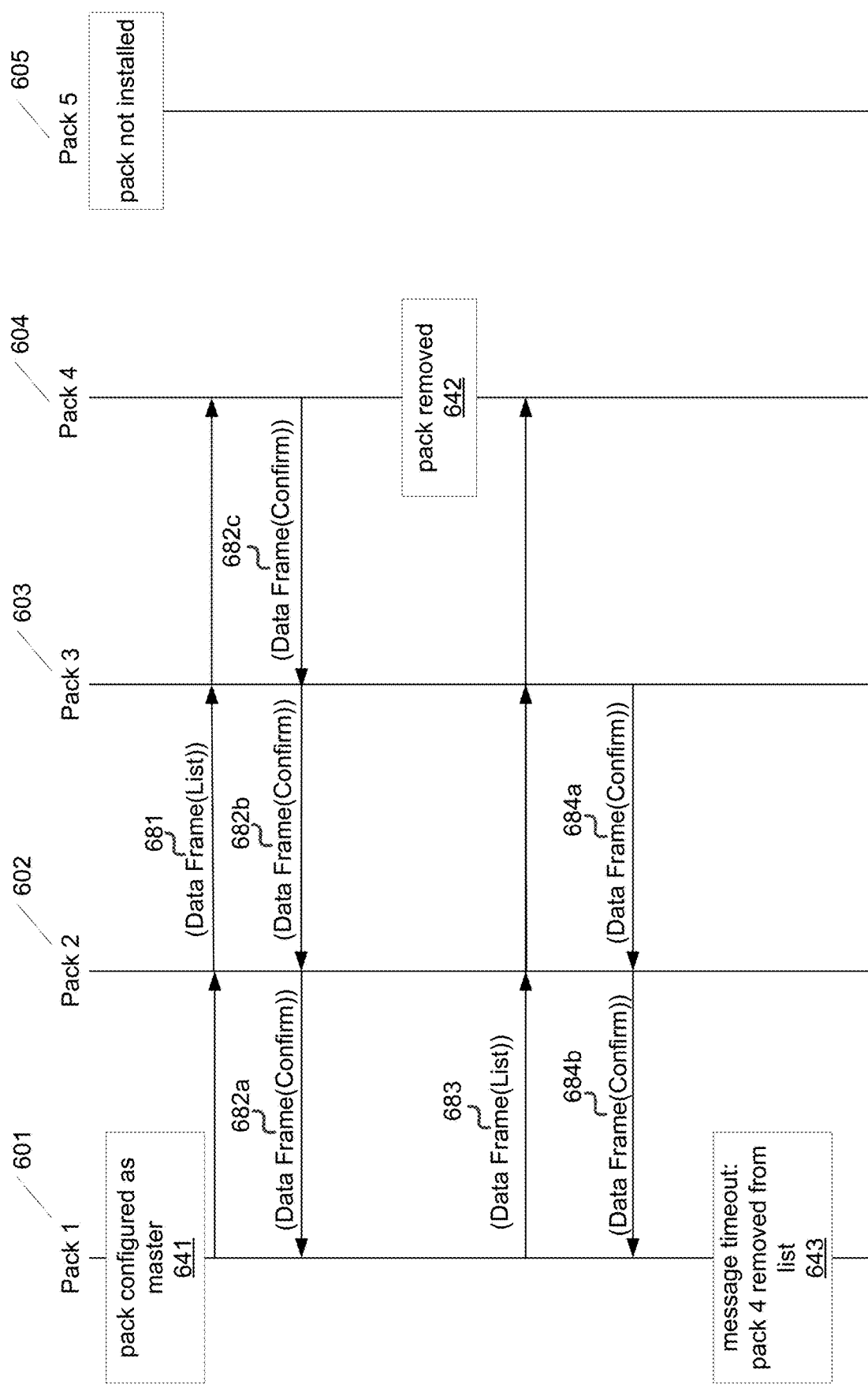
FIG. 6C shows another message flow scenario over a controller area network (CAN) bus for configuring a plurality of battery packs in accordance with an embodiment.
Figure 6D:
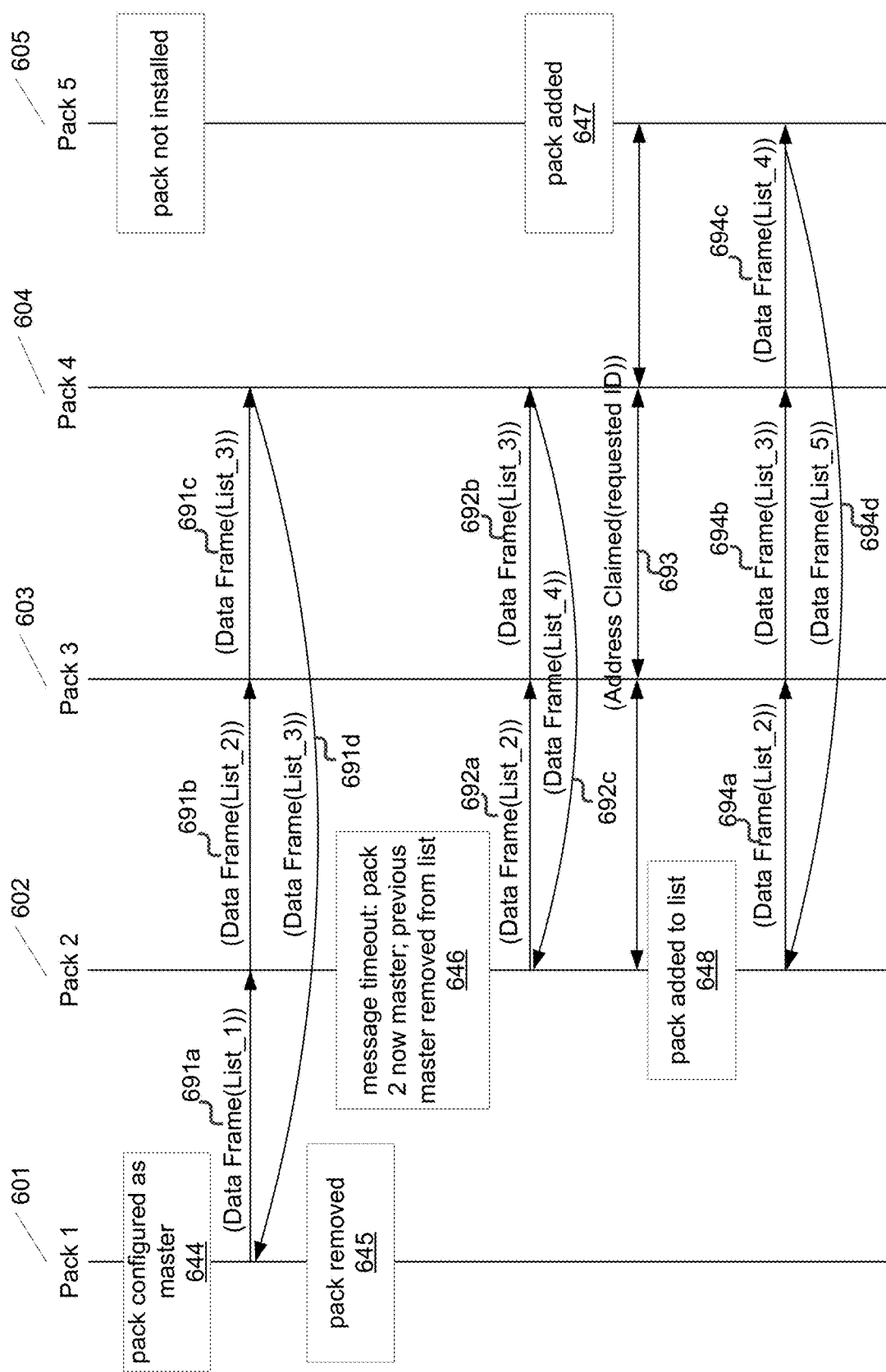
FIG. 6D shows another message flow scenario over a controller area network (CAN) bus for configuring a plurality of battery packs in accordance with an embodiment.

FIG. 6C shows a variation of the message flow scenario shown in FIG. 6B for configuring a plurality of battery packs in accordance with an embodiment. As with FIG. 6B, pack 601 (designated as the master battery pack at event 641) periodically sends the configuration list via message 681. However, slave battery packs 602, 603, and 604 return confirmation messages 682a-c to confirm reception.

At event 642, battery pack 604 is removed from the battery system. When battery pack 601 periodically sends message 683, only messages 684a-b are returned. Consequently, a message timeout occurs at event 643, and master battery pack 601 detects that battery pack 604 has been removed and removes the entry for battery pack 604 from the configuration list. The modified configuration list is included in the next periodic broadcast.

FIG. 6D shows a variation of the message flow scenario shown in FIG. 6B, where the configuration list is maintained in a distributed rather than a centralized fashion.

Battery pack 601 is distributed as the master battery pack at event 644. Rather than the master battery pack maintaining and sending the configuration list to the other battery packs, each of the active battery packs 601-604 maintains its own configuration list and broadcasts it via messages 691a-d to the other battery packs via the CAN bus, where list_1, list_2, list_3, and list_4 correspond to the configuration messages maintained at battery packs 601-604, respectively. As necessary, battery packs 601-604 may modify its own configuration list to be consistent with the configuration lists broadcast by the other battery packs. For example, a battery pack may have been recently inserted into a battery system and may need to revise its configuration list to be consistent with the current configuration.

When pack 601 is removed (for example, corresponding to event 645), periodic transmission of the periodic data frame messages from battery pack 601 terminates.

When the termination is detected by battery packs 602-604 at event 646, pack 602 assumes the role of the master battery pack. Consequently, packs 602-604 remove the top entry of the configuration list (corresponding to pack 601) that is locally maintained at the battery packs 602-604 and periodically send the revised configuration list via data frame messages 692a-c.

When pack 605 (pack 5) is added at event 647, pack 605 initiates the address claimed procedure 693 claiming its identification (ID) value. When successfully completed, battery packs 602-604 adds pack 5 to the bottom of the local copy of the configuration list. 605 at event 648, and subsequently the revised configuration list is broadcast via data frame messages 694a-d. With an aspect of the embodiments related to balancing, as will be discussed, the in-rush of electrical current among multiple Li-ion battery packs in a large-format battery pack system is an undesirable phenomenon arising with Li-ion battery cells since a large in-rush electrical current may reduce the life of Li-ion battery cells. This phenomenon may occur due to a large variation of SoC values among the battery packs in the battery system. For example, when a brand new Li-ion battery pack is added to a battery pack system, its capacity (e.g., energy level) at the beginning of its new life may be notably different than capacities of the battery cells of older battery packs already present in the battery pack system. This energy level differential between the cells of the new battery pack and the cells of the older battery packs can potentially damage the other Li-ion battery cells in the battery pack system. The aspect involves a balancing technique that leverages the internal (not external) battery management system and the master-slave topology.

As previously discussed, some embodiments order a configuration list based on the time that battery packs are connected to the communication channel (for example, CAN bus). With this approach, the oldest battery pack is designated as the master battery pack. However, other embodiments may use different approaches. For example, the members of the configuration list may be ordered from top to bottom by decreasing values of the open circuit voltages of the battery packs. The open circuit voltage of a battery pack may be measured when the battery pack's discharging array is disabled (in other words, the battery pack is not discharging onto the power bus of the battery system).

Each battery pack can share its measured open circuit voltage with the other battery packs that are connected to the communication channel. Based on the measured open circuit voltages, a configuration list is maintained, where entries for each battery pack are listed by decreasing order. The battery pack corresponding to the top entry has the largest open circuit voltage and serves as the master battery pack for battery system. With an exemplary embodiment, a battery system comprises first, second, and third battery packs having open circuit voltages $V_{open1}$, $V_{open2}$, and $V_{open3}$, respectively, where $V_{open2} > V_{open3} > V_{open1}$. The top entry of the configuration list is associated with the second battery pack (the master battery pack) followed by an entry for the third battery pack followed by an entry for the first battery pack. Consequently, if the second battery were to fail, the third battery pack would assume the role of the master battery pack.

With some embodiments, the battery packs in a battery system are assigned an ID and at the same time the open circuit voltage may be measured and stored in the configuration list. In the infrequent situation where the open circuit voltages of two battery packs are equal, one battery pack may be chosen randomly or may be chosen by the highest number ID.

The configuration list may be updated as battery packs are installed into the battery system. For example, a battery pack that is installed after discharging begins would initially enter in a standby mode (where the discharging array is disabled) so that an open circuit voltage can be measured by the battery pack. The newly installed battery pack could then share the measured open circuit voltage with the other battery packs via the communication channel. With some embodiments, the configuration list can then be updated with an entry for the newly installed battery pack based on the measured open circuit voltage. However, with some embodiments, the current configuration list may remain unchanged until the battery packs being discharged are disconnected from the battery system.

With some embodiments, the configuration list may be centrally maintained by the master battery pack. However, with some embodiments, each battery pack in the battery system may maintain its own copy of the configuration list based on information shared via the communication channel.

With an aspect of the embodiments related to balancing, as will be discussed, the in-rush of electrical current among multiple Li-ion battery packs in a large-format battery pack system is an undesirable phenomenon arising with Li-ion battery cells since a large in-rush electrical current may reduce the life of Li-ion battery cells. This phenomenon may occur due to a large variation of SoC values among the battery packs in the battery system. For example, when a brand new Li-ion battery pack is added to a battery pack system, its capacity (e.g., energy level) at the beginning of its new life may be notably different than capacities of the battery cells of older battery packs already present in the battery pack system. This energy level differential between the cells of the new battery pack and the cells of the older battery packs can potentially damage the other Li-ion battery cells in the battery pack system. The aspect involves a balancing technique that leverages the internal (not external) battery management system and the master-slave topology.

With an aspect of the embodiment, different balance techniques for Li-ion battery cells may be supported in a large-format battery pack system. For example, the aspect includes three balancing techniques: "smart converter balancing," "start direct balancing," and "start staggered balancing" that may be used in a medium-large battery pack implementation to ensure the safe use and longevity of the Li-ion battery cells. The aspect may utilize a converter (with a cell pre-charge circuit) for charge balancing each battery pack to prevent and/or limit in-rush electrical current, overcurrent faults, and/or short-circuit faults.

Figure 7A:
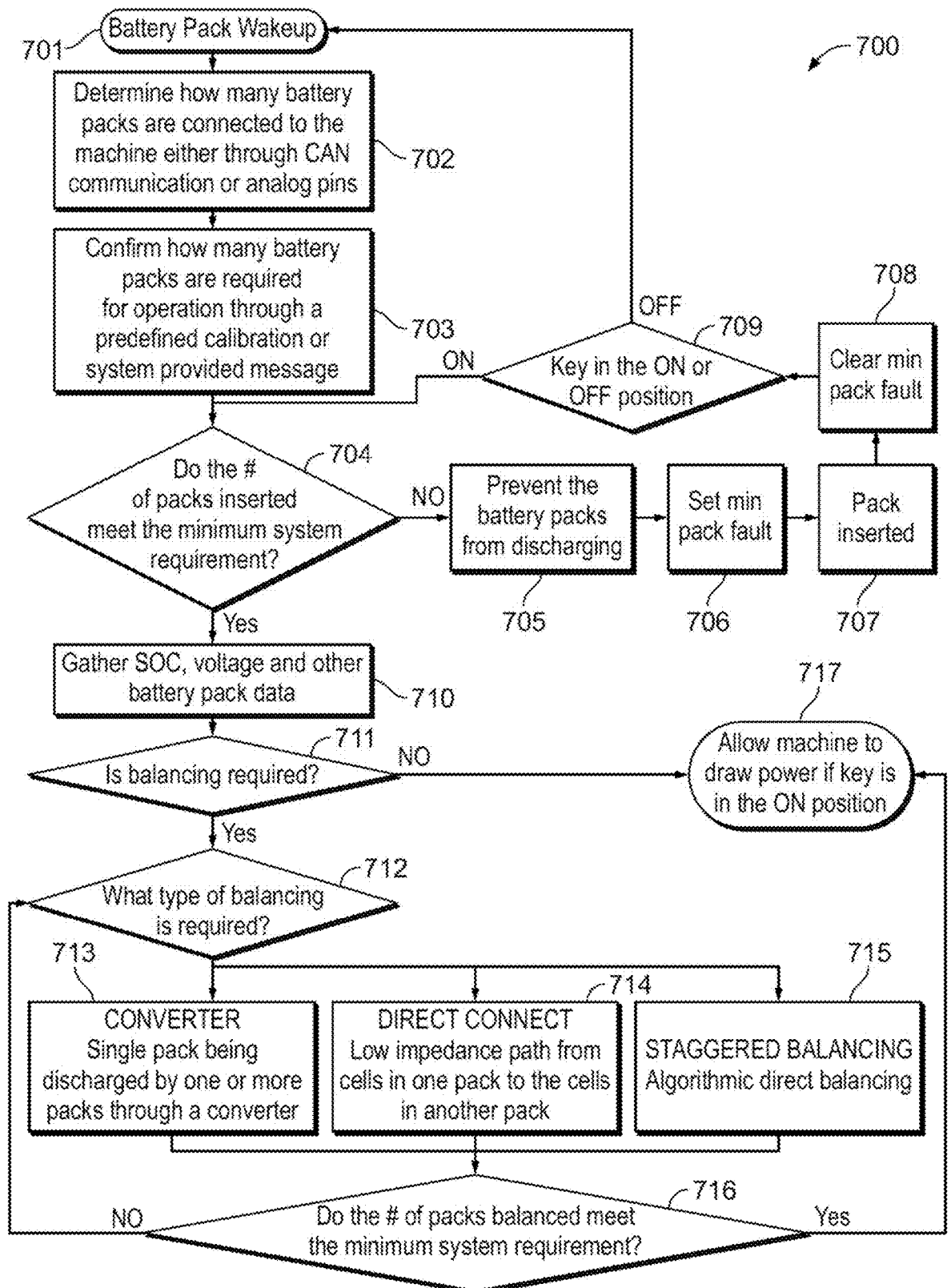
FIG. 7A shows a flowchart for determining a balancing type for a plurality of battery packs in accordance with an embodiment.

FIG. 7A shows flowchart 700 for determining a balancing type for a plurality of battery packs in accordance with an embodiment.

At block 701, the master battery pack transitions from a sleep state. For example, when an end device is not being used, the master battery pack may periodically wake up to determine whether there is a change in the operational state.

At block 702, the master battery pack determines the number of battery packs that are installed in the battery system. For example, the master battery pack may verify that all battery packs on the confirmation list are active on the communications channel.

At block 703, the master battery pack confirms how many battery packs are required for operation of a device. For example, the master battery pack may confirm the number of battery packs required through a predefined calibration or system provided message.

At block 704, the master battery pack determines whether a minimum number of battery packs (including itself) are installed based on power requirements of a device (for example, obtained from the end device via the communication channel).

If there are not a minimum number of battery packs available to properly power the end device, then the configured battery packs are prevented from discharging at block 705 by the master battery pack instructing the slave battery packs (as well as itself) to open corresponding discharge arrays. A fault indicator is activated at block 706 that is indicative that not enough battery packs are installed to power the end device. If an additional battery pack is installed at block 707, the fault indicator is cleared at block 708. If the end device is activated or otherwise enabled at block 709 (for example, the key is in the "on" position), process 700 returns to block 704. Otherwise, process 700 returns to block 701.

Returning back to block 704, when the master battery pack determines that there are a sufficient number of battery packs, the master battery pack gathers battery pack information (for example, SoC, SoH, and voltage information) from each of the slave battery packs as well as for itself at block 710. For example, as will be discussed in further detail, the master battery pack may send a "Request for Pack Info" message to each of the configured slave battery packs and receive a "Pack Info" message from each slave battery pack in response with the requested information.

From the gathered SoC data, the master battery pack determines whether balancing is required at block 711. For example, some of the battery packs may have a high SoC while some may have a low SoC. By balancing the battery packs, a sufficient number of battery packs may be available to properly discharge in order to power the end device.

If balancing is not required, the battery system may discharge to power the end device at block 717.

If balancing is required, the type of balancing is determined at block 712. As will discussed in greater detail, embodiments may support three different types of balancing: converter balancing (block 713), direct balancing (block 714), and staggered balancing (block 715).

Tables 1 and 2 present examples of balancing in accordance with embodiments.

TABLE 1

Example of Balancing

| Time | Pack 1 | Pack 2 | Pack 3 | Pack 4 | Type |
|------|--------|--------|--------|--------|------|
| T0 | 100% | 15% | 15% | 15% | Converter |
| T1 | 85% | 20% | 20% | 20% | Converter |
| T2 | 65% | 32%* | 32% | 32% | Staggered |
| T3 | 60% | 38% | 33%* | 33% | Staggered |
| T4 | 54% | 39% | 39% | 34%* | Staggered |
| T5 | 49% | 40%* | 40% | 40% | Staggered |
| T6 | 45% | 43% | 41%* | 41% | Staggered |

Continue staggered balancing until completed
Note: "*" denotes that the battery pack is being direct charged by Pack 1

TABLE 2

Example of Balancing

| Time | Pack 1 | Pack 2 | Type |
|------|--------|--------|------|
| T0 | 100% | 15% | Converter |
| T1 | 85% | 20% | Converter |
| T2 | 65% | 32% | Direct |
| T3 | 60% | 37% | Direct |
| T4 | 55% | 42% | Direct |
| T5 | 48% | 48% | (Balancing Completed) |

The above to examples illustrate that the type of balancing may change while the battery packs are being balanced. For example, with Table 1 the balancing type changes from converter balancing to staggered balancing while with Table 2 the balancing type changes from converter balancing to direct balancing.

After balancing, if the number of battery packs are available for discharging, as determined at block 716, the end device may be powered at block 717. Otherwise, the battery packs may be rebalanced based on the revised SoC values obtained from the previous balancing.

When rebalancing occurs, as determined at block 716, the rebalancing may utilize a different type of balancing than previously used. For example, converter balancing may be first applied while subsequent rebalancing may utilize staggered balancing.

Figure 7B:
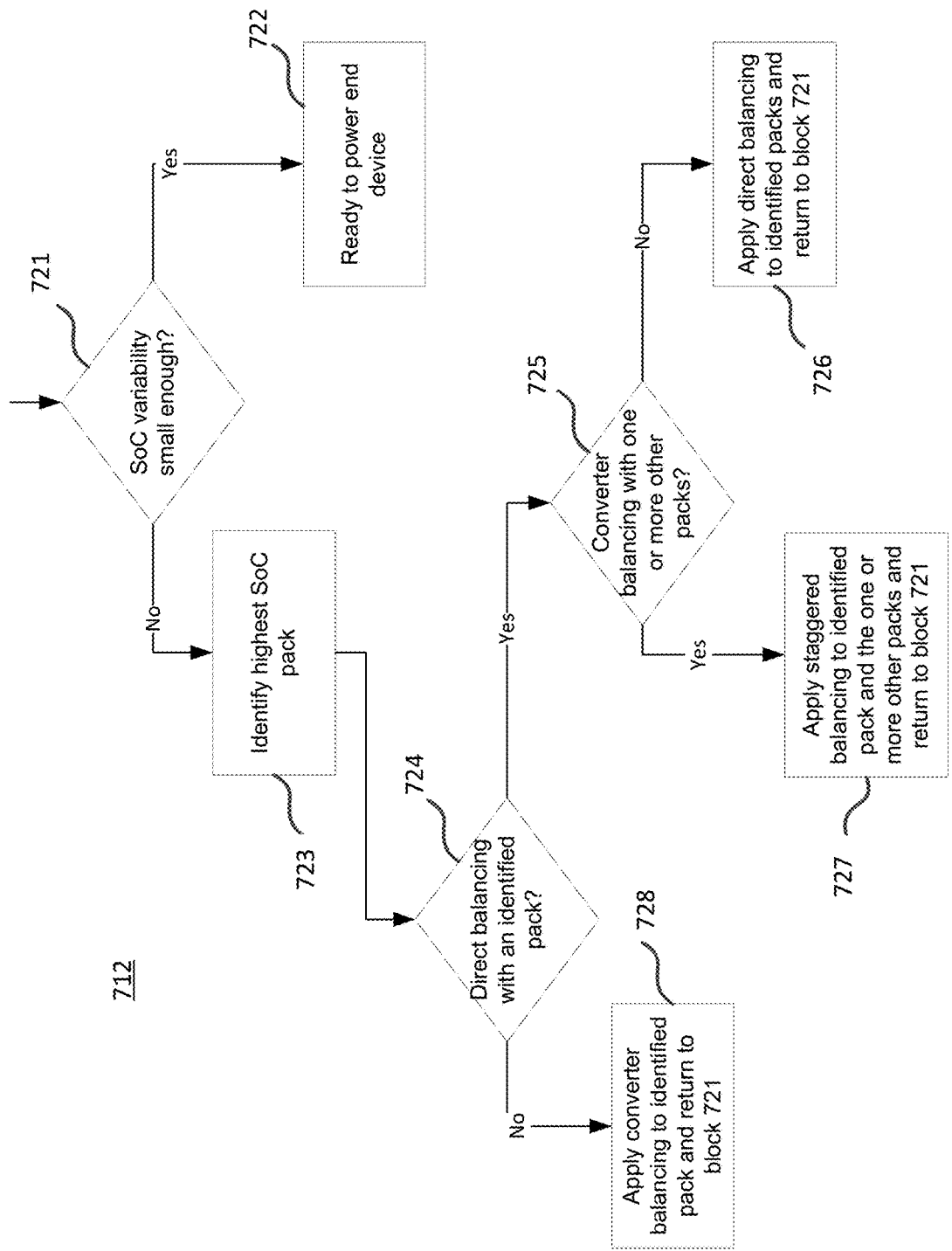
FIG. 7B shows a flowchart for selecting one of three balancing types for a plurality of battery packs in accordance with an embodiment.

FIG. 7B expands on block 712 shown in FIG. 7A for determining the type of charge balancing. For example, an embodiment may support a plurality of balancing types such as direct balancing, converter balancing, and staggered balancing as previously discussed.

At block 721, if the variability of the SoC values among the battery packs is sufficiently small, the battery system is able to power the end device at block 722. (For example, the SoC differences between all pairs of battery packs is less than a predetermined threshold.) Otherwise, process 712 proceeds with balancing the battery packs.

Block 723 identifies the battery pack with the highest SoC value so that the identified battery pack can discharge, thus providing charge to the other battery packs during balancing.

At block 724 process 712 determines whether direct balancing cannot be applied (for example, when the SoC difference between the highest SoC pack and an identified battery pack is above a predetermined SoC threshold). If so, converter balancing is applied to the identified battery pack (where the highest SoC battery pack discharges onto the power bus and the identified battery pack charges through the power bus via its converter) at block 728. When converter balancing is completed, process 712 may revert back to block 721 and determine whether balancing can be applied to a different combination of battery packs, where the balancing type may be the same or may be different (for example, direct balancing or staggered balancing).

Referring back to block 724, if direct balancing can be applied (for example, when the SoC difference between the highest SoC pack and the identified battery pack is below the predetermined SoC threshold), process 712 determines whether converter balancing can be applied to one or more other battery packs at block 725. If so, staggered balancing is applied with the highest SoC pack, the identified pack, and the one or more other packs at block 727. Otherwise, direct balancing is applied between the highest SoC pack and the identified battery pack at block 726.

Figure 7C:
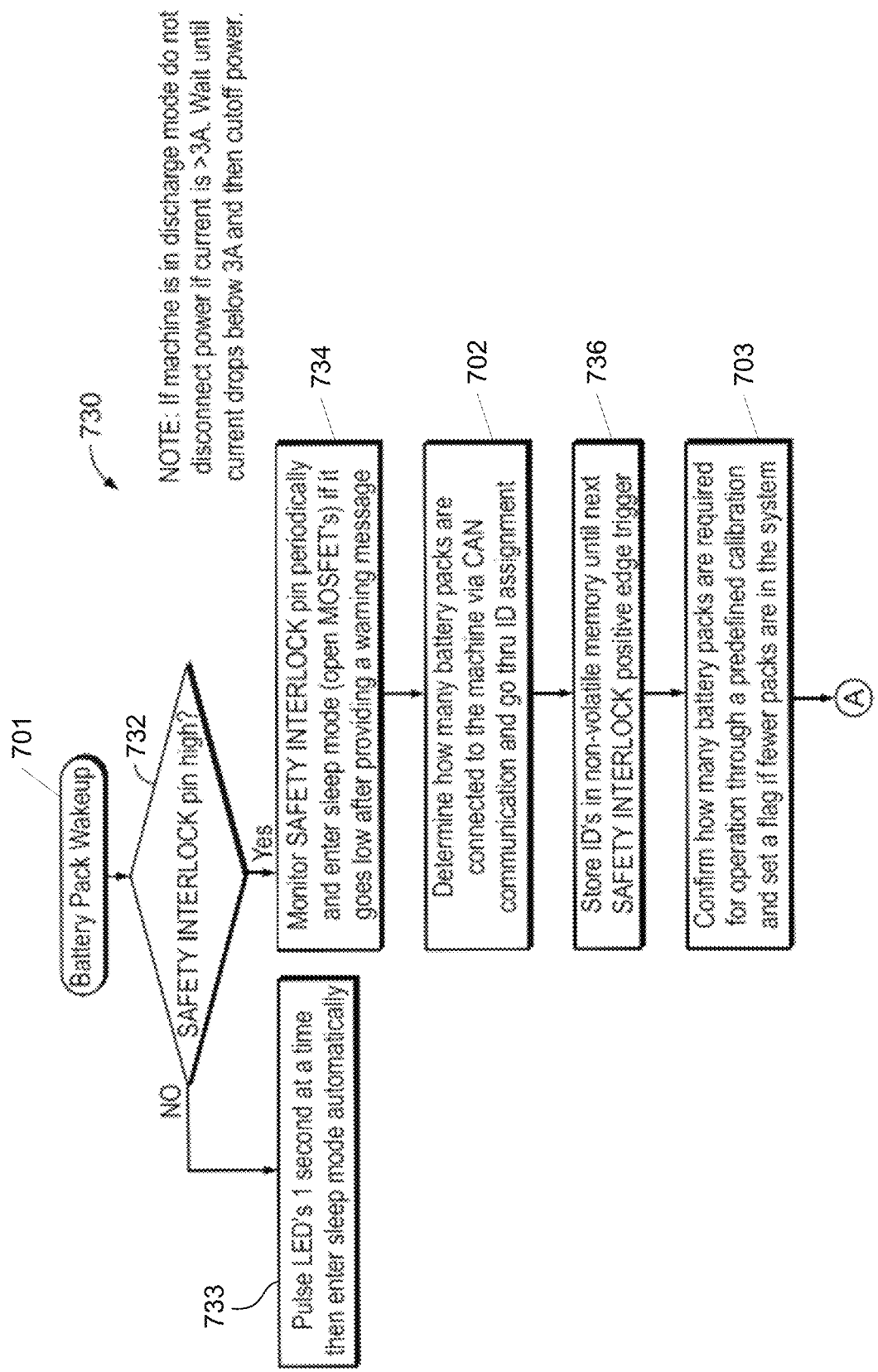
FIG. 7C shows a flowchart for determining a balancing type for a plurality of battery packs in accordance with an embodiment.

FIG. 7C shows flowchart 730 for determining a balancing type for a plurality of battery packs in accordance with an embodiment.

Table 3 shows a relationship between an operational mode of a battery system and a safety interlock lock pin (indicator) and a wake pin (indicator). For example, the safety interlock pin is "On" when the battery packs are properly inserted into the battery system (as sensed by an interlocking connection through the battery pack connectors), and the wake pin is "On" when a user turns a key to activate a powered appliance (end device).

TABLE 3

Mode of Operation

| Wake Pin | Safety Interlock Pin | Mode |
|----------|---------------------|------|
| Off | Off | Off (Sleep) |
| Off | On | Balancing |
| On | On | Charging/Discharging |
| On | Off | Off (Sleep) |

When in the off (sleep) mode, the discharging and charging arrays of the battery packs are disabled, and the battery packs consume only enough electrical power so that the battery pack may transition to another state (for example, balancing mode) when the battery pack detects an appropriate signal (for example, a wake indicator).

With some of the embodiments, as shown in Table 3, a battery system may support a plurality of operational modes: Off (Sleep), Balancing, and Charging/Discharging. While a single mode is shown for charging/discharging, charging and discharging are separate operations based on the interaction of the battery system with its external environment. For example, when the wake and safety interlock indicators are on and if charger (typically external to the battery system) is sensed via a CAN bus, the battery system enters the charging state. However, if the battery system senses an end device (for example, an appliance), the battery system enters the discharging state. As will be discussed in further detail, a battery system may support "smart charging" when in the charging mode and "smart discharging" when in the discharging mode.

FIG. 7C is similar to 7A; however, process 730 includes an interaction with sleep, balancing, and charging/discharging modes in accordance with the relationship shown in Table 3. At block 731, when the safety interlock indicator is not detected, the battery system enters the sleep mode. Otherwise, the battery system (typically by the master battery pack) gathers configuration information (for example, SoC information about the different battery packs). At block 732, the battery system determines whether the wake indicator is detected. If not, the battery system enters the balancing mode. Otherwise, the battery system enters the charging/discharging mode.

Figure 8:
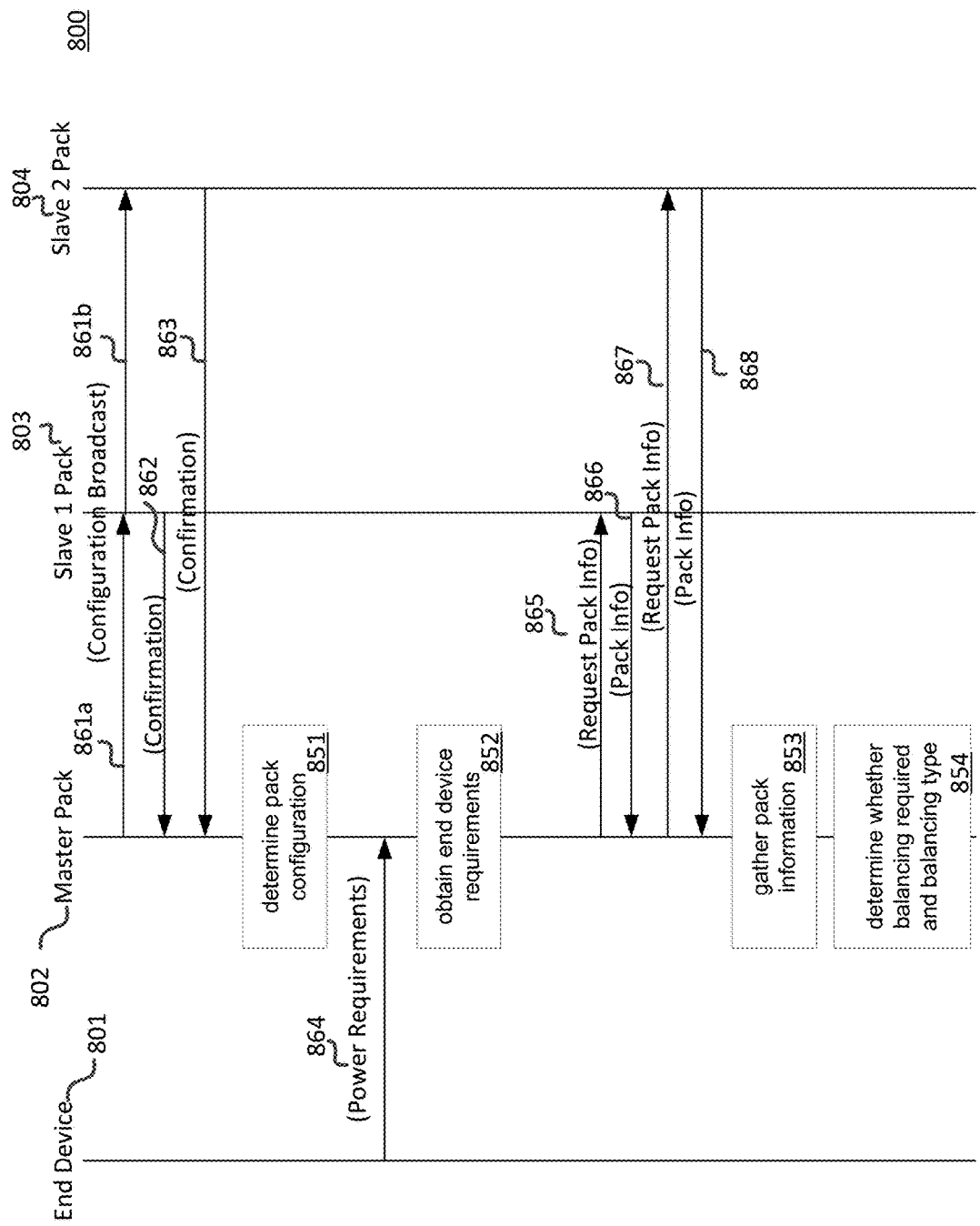
FIG. 8 shows a message flow scenario for determining a balancing type for plurality of battery packs in accordance with an embodiment.

FIG. 8 shows message flow scenario 800 for determining a balancing type for a plurality of battery packs based on flowchart 700 and in accordance with an embodiment. Master battery pack 802, based on the entries of the current confirmation list, confirms the availability of battery packs 803 and 804 at event 851 corresponding to messages 861a, 861b, 862, and 863. As previously discussed, embodiments may support different messaging protocols. For example, with the CAN protocol a data frame message may contain data in the data field that is indicative of a confirmation request or a confirmation response. As previously discussed, the interpretation of the data is in accordance with the application software executing at end device 801 and battery packs 802-804.

End device 801 provides its power requirements in message 864 so that master battery pack 801 can determine the number of battery packs needed for end device 801 at event 852.

At event 853, master battery pack 802 gathers SoC data about the other battery packs via messages 865-868. (Master battery pack 802 may use internal messaging within the battery pack to obtain SoC about itself.) For example, in accordance with the CAN protocol, data contained in Request Pack Info message 865 may be interpreted as a request from the destination battery pack while the data in Pack Info message 866 may be interpreted as the requested data (for example, SoC data) from the destination battery pack.

Figure 13:
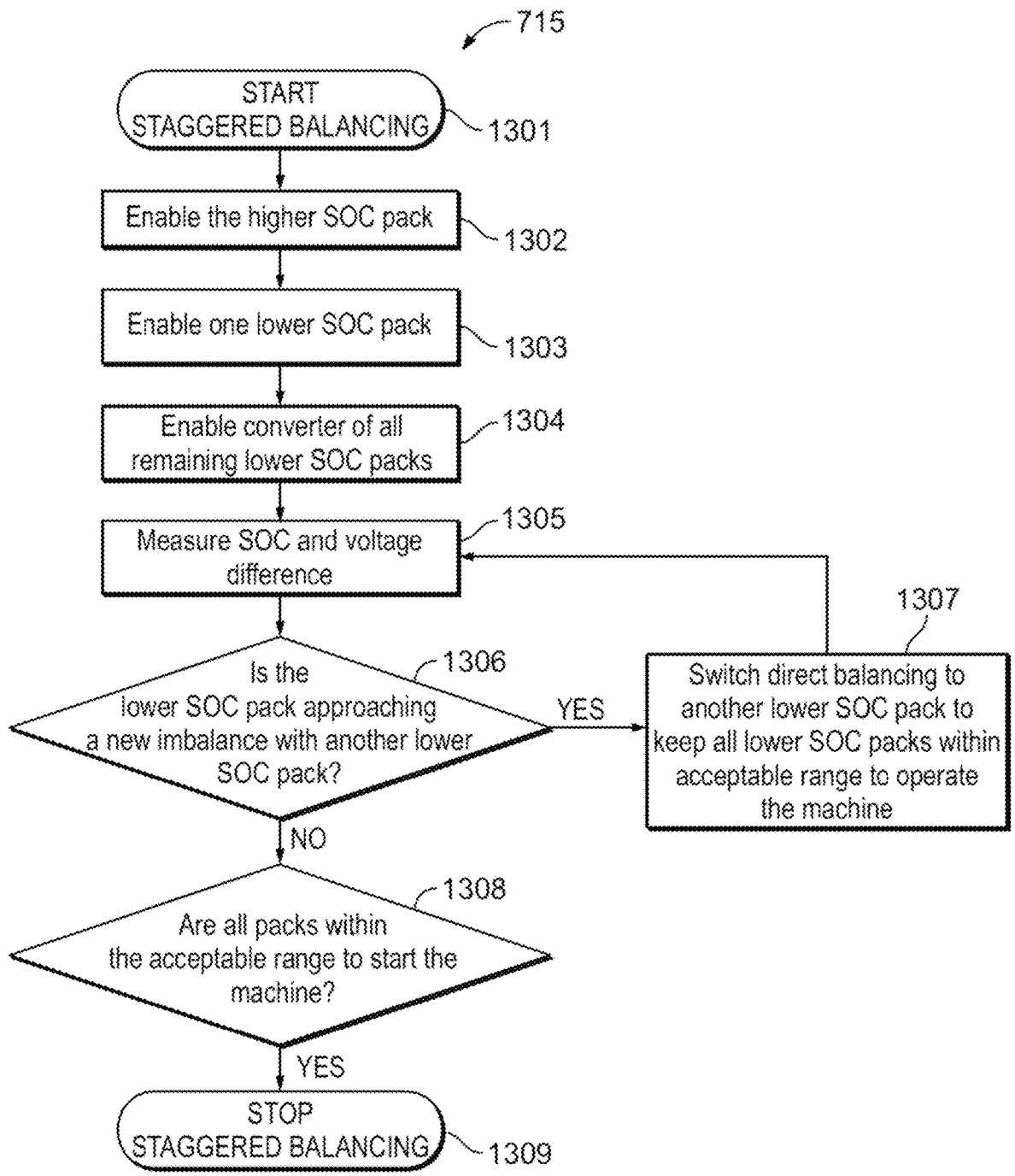
FIG. 13 shows a flowchart for staggered balancing with a plurality of battery packs in accordance with an embodiment.

Based on the gathered SoC data, master battery pack 801 determines the type of balancing required (if needed) and initiates the appropriate balancing process (for example, processes shown in FIGS. 9, 11, and 13).

As previously discussed, embodiments may support different types of balancing, for example): converter balancing, direct balancing, and staggered balancing. Converter balancing typically requires a longer time period than direct balancing, While the processes shown in FIGS. 9, 11, and 13 are typically performed at the master battery pack, the master battery need not be changing or discharging during balancing. This determination is based on the SoC values of battery cells 203 and 210 (shown in FIGS. 2A and 2B, respectively) and not on whether a battery pack is a master battery pack or a slave battery pack.

FIG. 9 shows flowchart 713 (referenced in FIG. 7A) for converter balancing with a plurality of battery packs in accordance with an embodiment. Block 901 starts converter balancing, where one of the battery packs (either the master battery pack or one of the slave packs) charges one or more of the other battery packs.

With converter balancing, charge of a single battery pack is transferred to one or more battery packs via converters on each of the charged battery packs. Consequently, two or more battery packs are involved with this type of balancing.

While not explicitly shown, the master battery pack gathers SoC data about all of the battery packs, including itself. For example, the master battery pack may request battery status information from the other battery packs via the CAN bus and internally obtain its own SoC data.

At block 902, the master battery pack enables the battery pack with the highest SoC for discharging by enabling the discharging array. The master battery pack also enables one or more of the battery packs with the lowest SoC to accept the charge from the discharging battery pack by enabling the charging array and the on-board converter.

The master battery pack obtains SoC values from the above battery packs at block 904 and continues the balancing process at block 905 until a desired charge balance is obtained at block 905. If the charge balance is sufficient, the battery pack may be used to power the end device. However, a faster mode of balancing (for example, direct balancing as will be discussed) may be subsequently applied.

Figure 10:
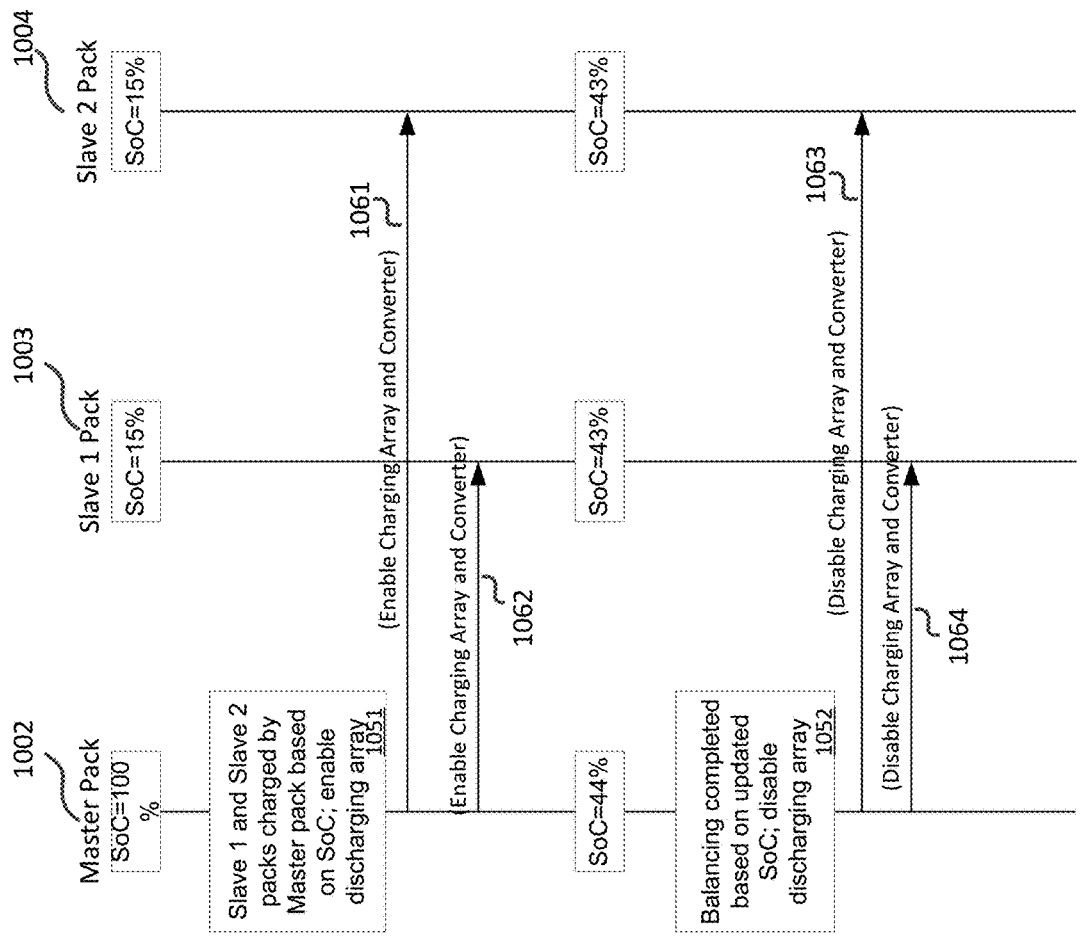
FIG. 10 shows a message flow scenario for converter balancing with a plurality of battery packs in accordance with an embodiment.

FIG. 10 shows a message flow scenario for converter balancing with a plurality of battery packs in accordance with an embodiment. Battery packs 1002, 1003, and 1004 initially have SoC values of 100%, 65%, and 65%, respectively. As previously discussed, master battery pack 1002 may obtain the SoC values by requesting battery status information and receiving the status information via data frame messages over a CAN bus.

At event 1051, master battery pack 1002 determines that packs 1003 and 1004 are to be charged by itself (pack 1002). To do so, master battery pack enables its own discharging array and enables the charging arrays and converters via messages 1061 and 1062. Balancing continues until a desired balancing charge obtained (80%, 75%, and 75%) at event 1052. At that time, the balancing ends so that master battery pack disables its charging array and disables the charging arrays and converters of battery packs 1003 and 1004 via messages 1063 and 1064.

FIG. 11 shows flowchart 714 for direct balancing with a plurality of battery packs in accordance with an embodiment. When process 700, as shown in FIG. 7A, determines that direct balancing should be performed, the master battery pack initiates direct balancing at block 1101.

With direct balancing, one of the battery packs is charging another battery pack through a low impedance electrical path. Consequently, only two battery packs are involved with type of balancing.

While not explicitly shown, the master battery pack obtains SoC values for all installed battery packs in the battery system. In order to do so, the master battery pack sends status requests to the slave battery packs and receives status information (for example, SoC values) from the slave battery packs via messaging on the communication channel. However, because the master battery knows about its own battery cell status, only internal messaging for the master battery is needed.

At block 1102 the master battery pack instructs the battery pack with the higher SoC to start discharging by enabling its discharging array and at block 1103 instructs one of the battery pack with the lower SoC to start charging by enabling its charging array.

At block 1104, the master battery pack gathers SoC data from the battery packs being charge balanced. When an acceptable SoC is reached at block 1105, direct balancing is terminated at block 1106.

Figure 12:
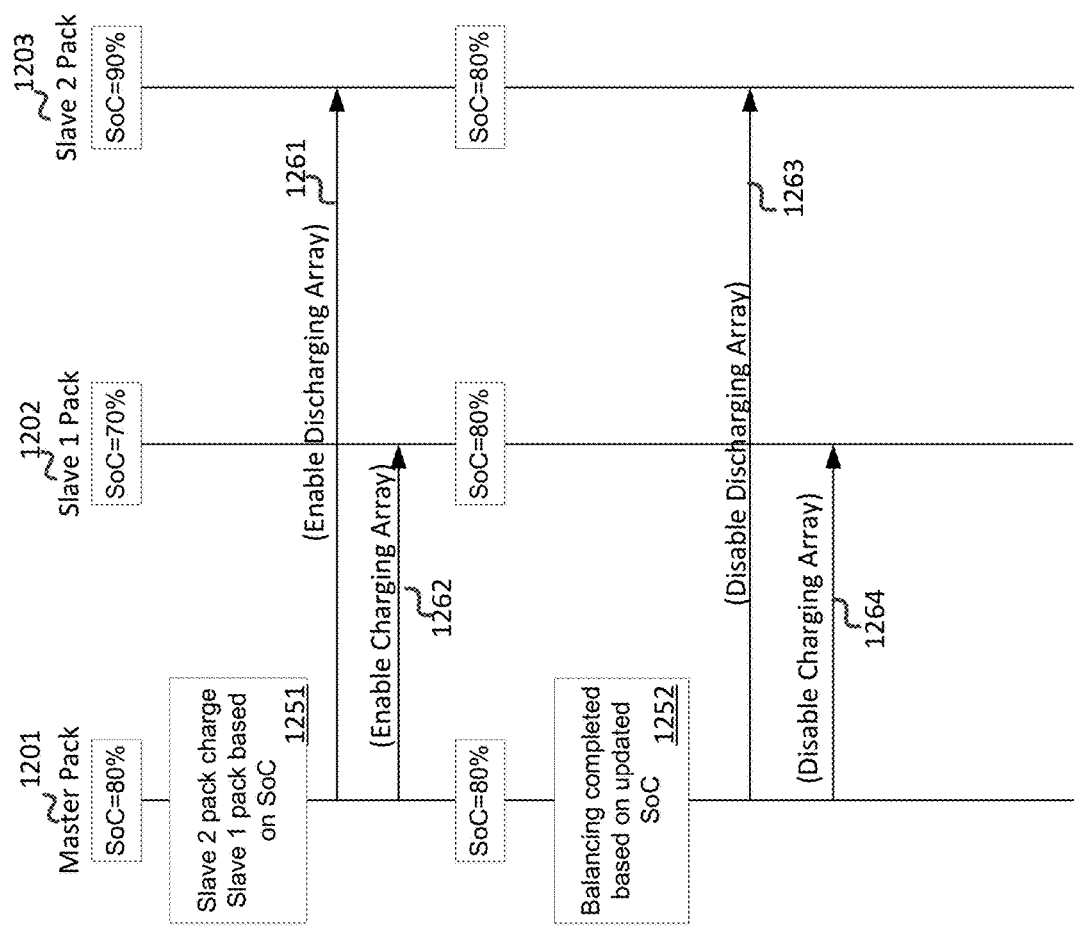
FIG. 12 shows a message flow scenario for direct balancing with a plurality of battery packs in accordance with an embodiment.

FIG. 12 shows a message flow scenario for direct balancing with a plurality of battery packs in accordance with an embodiment. The master battery pack (pack 1201) gathers initial SoC values 80%, 70%, and 90% for battery packs 1201, and 1202, and 1203, respectively.

Because pack 1202 has the lowest SoC and pack 1203 has the highest SoC, the master battery pack instructs battery pack 1202 to enable its charging array and battery pack 1203 to enable its discharging array via messages 1261 and 1262, respectively.

When the SoC values of battery packs 1202 and 1203 reach 80%, the master battery pack (pack 1202) determines that direct balancing is competed at event 1251 and consequently disables the charging array and the discharging array via messages 1263 and 1264, respectively.

FIG. 13 shows flowchart 715 for staggered balancing with a plurality of battery packs in accordance with an embodiment. When process 700, as shown in FIG. 7A, determines that staggered balancing should be performed, the master battery pack initiates staggered balancing at block 1301.

Staggered balancing utilizes algorithmic direct balancing. With staggered balancing, one of the battery packs (typically the highest SoC value) direct charges another battery pack with a lower SoC while charges one or more other lower SoC battery packs through converter balancing (where the converter located on the charged battery pack is enabled). In order to keep the other lower SoC battery packs within an acceptable range, direct balancing may switch to a different lower SoC battery pack while the previous lower SoC battery pack is now converter balanced.

At blocks 1301 and 1302, direct balancing is established with a battery pack with the highest SoC with another battery pack in the group with a low SoC similar to blocks 1101 and 1102 as shown in FIG. 11. However, converter balancing is established with some or all of the battery packs in the low SoC group at block 1304.

At block 1305, the master battery pack gathers the updated SoC values of the participating battery packs. When the battery pack being directed charge reaches a determined SoC threshold (for example, when an imbalance occurs one of the battery packs in the low SoC group), direct balancing is established with another battery pack in the low SoC group at block 1307.

When all of the battery packs are within an acceptable SoC range, as determined at block 1308, staggered balancing is terminated at block 1309.

Figure 14:
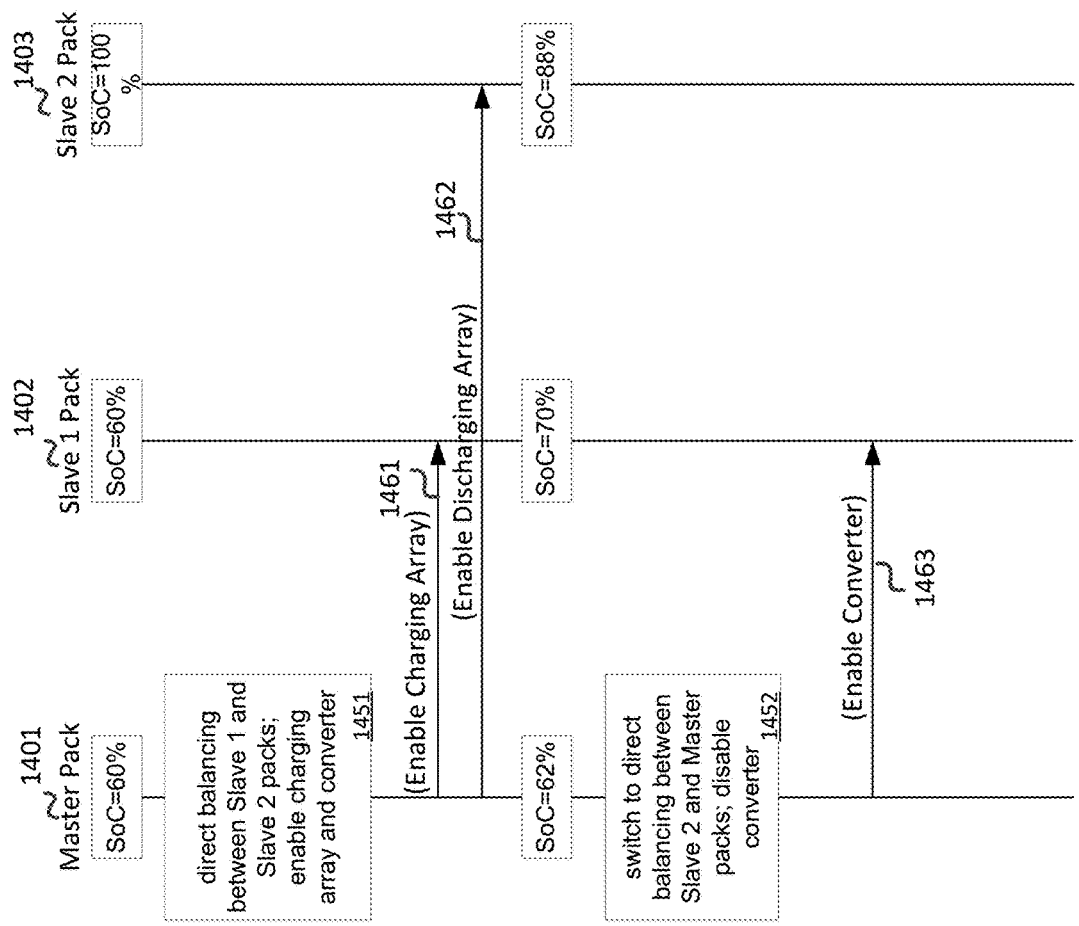
FIGS. 14-15 show a message flow scenario for staggered balancing with a plurality of battery packs in accordance with an embodiment.
Figure 15:
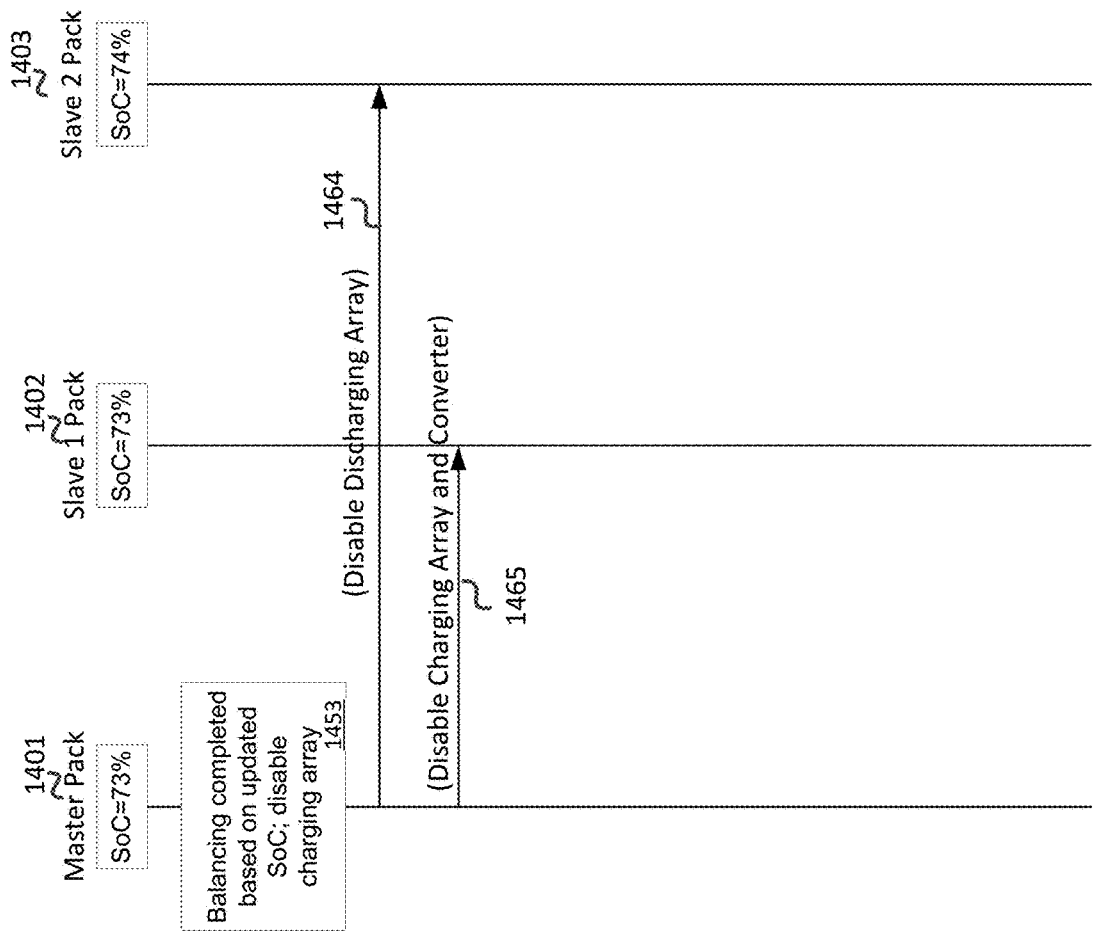

FIGS. 14-15 show a message flow scenario for staggered balancing with a plurality of battery packs in accordance with an embodiment. The master battery pack (pack 1401) gathers initial SoC values 60%, 60%, and 100% at battery packs 1401, and 1402, and 1403, respectively.

At event 1451, master battery pack 1401 initiates direct balancing between battery packs 1402 (in the low SoC group) and 1403 (the highest SoC) and to establish converter balancing between battery 1403 and itself (also in the low SoC group). Consequently, master battery pack 1401 sends messages 1461 and 1462, corresponding to battery packs 1461 and 1462, respectively, over the communication channel and to generate any internal messaging, as necessary, to enable its charging array and converter.

As a result of the balancing, the SoC values of battery packs 1401, 1402, and 1403 change to 62%, 70%, and 88%, respectively. Because of the charge imbalance between battery packs 1401 and 1402, master battery pack 1401 establishes direct balancing between battery pack 1403 and itself and establishes converter balancing for pack 1402. Consequently, at event 1452, master battery pack 1401 instructs battery pack 1402 to enable its converter (so that charging occurs now via the converter rather than directly) via message 1463 and to disable its own converter so that its battery cells are directly exposed to charging.

Referring to FIG. 15, as a result of the balancing, the SoC values of battery packs 1401, 1402, and 1403 change to 72%, 72%, and 76%, respectively. At event 1453, master battery pack 1401 determines that balancing has completed and terminates the staggered balancing by sending messages 1464 and 1465 to battery packs 1403 and 1402, respectively, and internally disables its charging array.

Referring to FIG. 15, as a result of the balancing, the SoC values of battery packs 1401, 1402, and 1403 change to 72%, 72%, and 76%, respectively. At event 1453, master battery pack 1401 determines that balancing has completed and terminates the staggered balancing by sending messages 1464 and 1465 to battery packs 1403 and 1402, respectively, and internally disables its charging array.

Figure 17:
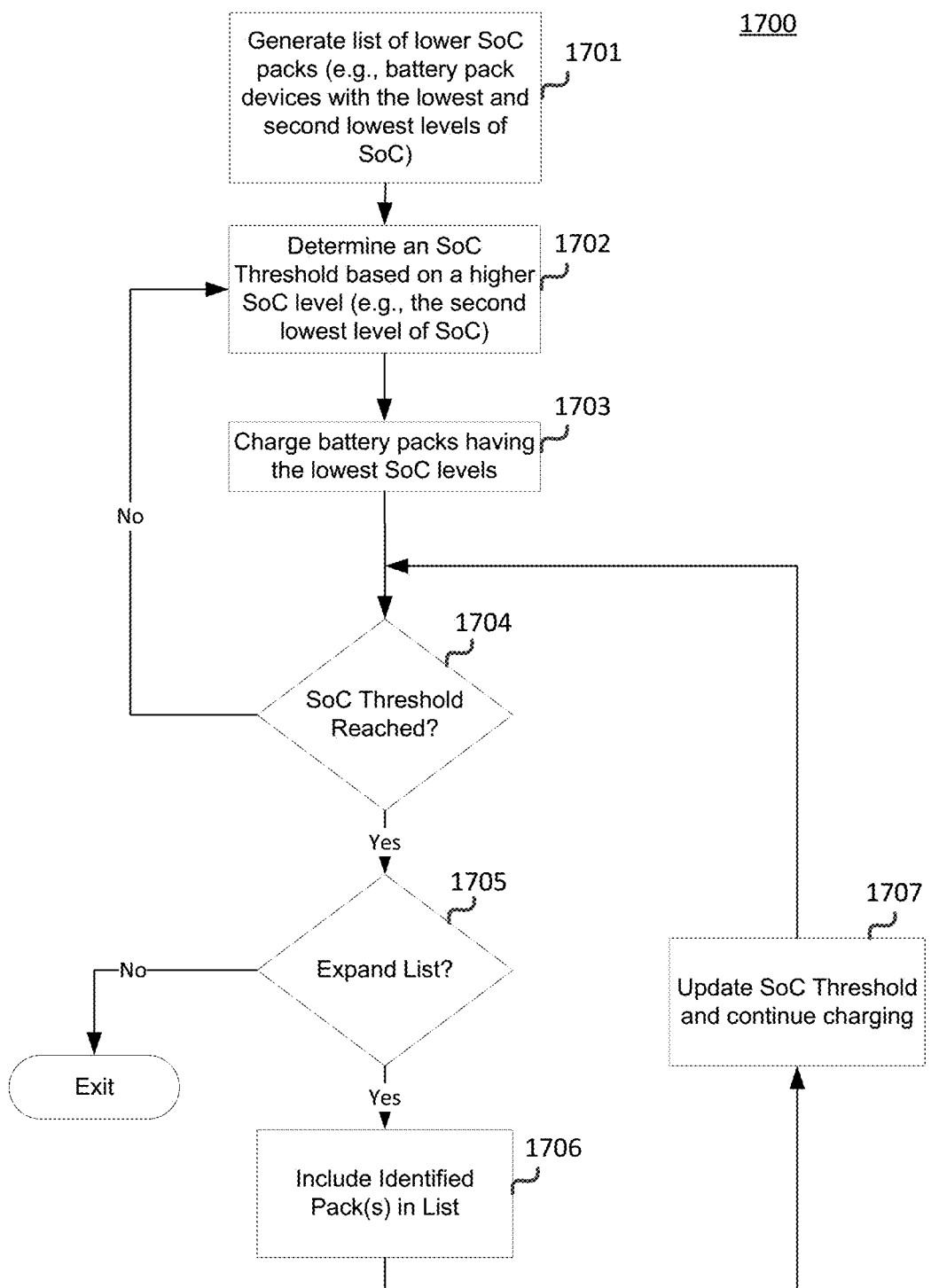
FIG. 17 shows a flowchart for charging a plurality of battery packs in accordance with an embodiment.

Intelligent systems and algorithmic methods (for example, process 1700 as shown in FIG. 17) may ensure that SoC's corresponding to the plurality of battery packs may become more balanced, e.g., to ensure that the plurality of battery packs can be charged together. In various embodiments, a battery pack may include one or more batteries and/or may comprise a device that may include one or more batteries. The one or more batteries of a battery pack may share various characteristics (e.g., a state of charge, a state of health, etc.). Furthermore, each battery pack can be enabled or disabled, e.g., in their ability to charge or discharge other battery packs or end devices.

Still referring to FIG. 16, battery packs that have a large SoC variation may not be immediately connected with charger 1601. For example, as shown in FIG. 16, battery packs 1602a and 1603a, which each have lower SoC's (e.g., 20% and 20%, respectively) than other battery packs, may be charged earlier (e.g., before the other battery packs) until a set threshold can be reached at which a batter pack with a higher SoC (e.g., battery pack 1604b) can be charged. Prioritizing the charging of battery packs with lower SoC's before the charging of battery packs with higher SoC's may be necessary, e.g., because otherwise, charging the higher battery pack with the higher SoC first may cause a fast in-rush electrical current to the lower SoC pack. In some aspects, systems and devices presented herein may cause the charging of the various battery packs by enabling the flow of electric discharge arrays between a charger and the respective battery packs.

As shown in FIG. 16, initially charging battery packs 1602a and 1603a causes their SoC's to increase from 20% to 40% (e.g., as shown in 1602b and 1603b). Charging may continue for battery packs 1602b-1604b until the SoC level of battery pack 1605*b* is reached. At that point, battery pack 1605*b* may be enabled so that charging can continue for battery packs 1602*b*-1605*b*.

FIG. 17 shows an example flowchart of a method 1700 for charging a plurality of battery packs in accordance with an embodiment. Method 1700 may be performed by a computing device having one or more processors, which may be communicatively linked to one or more of the plurality of battery packs and/or to the charger. Also or alternatively, the computing device performing method 1700 may comprise a battery pack (e.g., a "master battery pack" or a "master battery pack") that has a capability of managing one or more functions of other battery packs of the plurality of battery packs. After obtaining the SoC values of the battery packs in a battery system, a subset of the battery packs may be grouped into a lower SoC group at block 1701. For example, the obtained SoC values (e.g., SoC readings) may be sorted into various levels, e.g., based on predetermined ranges. Those battery packs having the lowest SoC values may be grouped into the lowest level. Battery packs within a specified level may have SoC values that are within a specified or predetermined range of one another. Those battery packs having the second lowest of SoC values (e.g., SoC values that are higher than those of the lowest level but lower than the rest of the battery packs) may be placed into the second lowest level. As used herein, a "Lower SoC Packs" may refer to the battery packs of a list comprising (1) the group of battery packs of the lowest level of SoC values and (2) the group of battery packs of the second lowest level of SoC values.

At block 1702, an SoC threshold may be determined. The SoC threshold may be approximately equal to the SoC value of the group of one or more battery packs having SoC values just above the group of battery packs with the lowest SoC values. For example, the SoC threshold may be based on the SoC values of the second lowest level (e.g., an average of the SoC values of the battery packs of the second lowest level).

The battery packs of the group with the lowest levels of SoC can be enabled for charging at block 1703, e.g., facilitating the charging of the battery packs having the lowest level of SoC. In some aspects, the charging may be enabled if one or both of the safety interlock pin or the wake pin is set to "on," as discussed previously.

When the SoC values of the charged battery packs reach the SoC threshold, as determined at block 1704, process 1700 may include determining whether to enlarge the list (e.g., the "Lower SoC Packs" list of step 1701) for subsequent charging at block 1705. The determination of whether to enlarge the list may be based on whether there is significant variability in the SoC of the battery packs (e.g., whether the SoC variability of the battery packs satisfies an SoC variability threshold), as will be described further in relation to FIG. 18C. If the list is to be enlarged, the SoC threshold may be updated (e.g., based on determining the second lowest level of SoC's in the updated list), the selected battery packs may be enabled, and charging may continue at blocks 1706 and 1707.

Figure 18A:
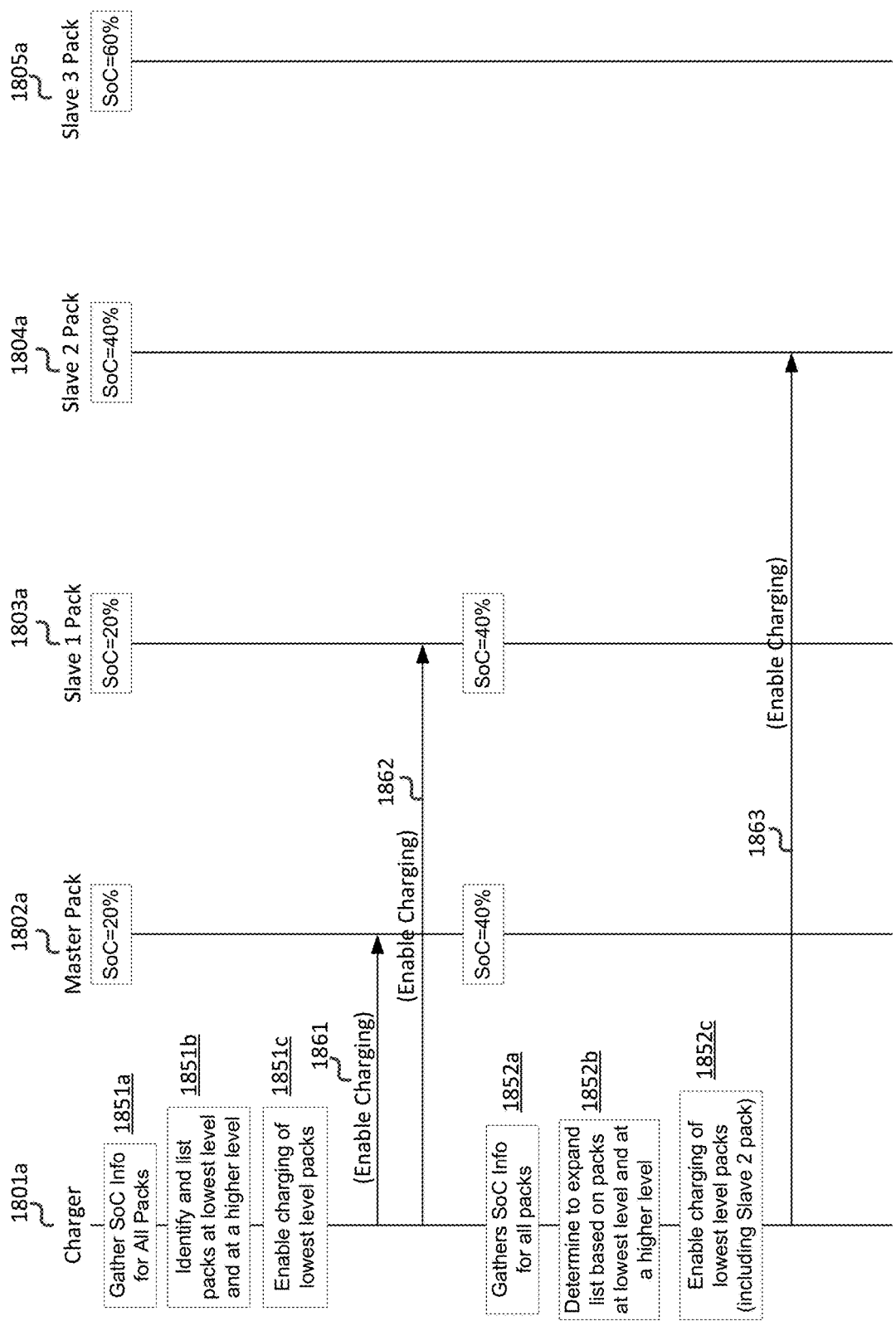
FIG. 18A shows a message flow scenario for charging a plurality of battery packs in accordance with an embodiment.

FIG. 18A shows a message flow scenario for charging a plurality of battery packs for the example shown in FIG. 16. In this scenario, charger 1801*a* may perform one or more iterations of gathering SoC data (e.g., receive SoC readings) from a plurality of battery packs (e.g., battery packs 1802*a*-1805*a*), identifying SoC levels to form lists based on the SoC levels, and enabling the charging of selected battery packs to SoC thresholds via the communication channel (for example, a CAN bus). For example, at event 1851*a*, charger 1801*a* may gather initial SoC values 20%, 20%, 40%, and 60% from battery packs 1802*a*, 1803*a*, 1804*a*, and 1805*a*, respectively.

At event 1851*b*, charger 1801*a* may determine that the group of battery packs with the lowest level of SoC values includes battery packs 1802*a* and 1803*a*, and that the group of battery packs with a higher (e.g., second lowest) level of SoC values includes battery pack 1804*a*. A list of battery packs may be formed and may include the battery packs at the lowest levels of SoC and the battery pack at the higher (e.g., second lowest level).

At event 1851*c*, the charger 1801*a* may enable the charging of group of the battery packs with the lowest level of SoC values (e.g., battery packs 1802*a* and 1803*a*) via messages 1861 and 1862. Charging may continue until the SoC values for these battery packs satisfy an SoC threshold based on a group of one or more battery packs having higher SoC values (e.g., the battery pack having the second lowest level of SoC values (e.g., battery pack 1804*a* at 40%)).

At event 1852*a*, the charger 1801*a* may gather SoC values for all packs. As shown in FIG. 18A, the SoC values for battery packs 1802*a* and 1803*a* will have increased to 40% as a result of the aforementioned charging at event 1851*c*. At event 1852*b*, charger 1801*a* may determine to expand the list of battery packs determined at event 1851*a*. For example, an SoC variability may be determined for battery packs 1802*a*-1805*a*, and the list may be expanded based on the SoC variability being significant enough to satisfy a SoC variability threshold. In the scenario depicted in FIG. 18A, battery pack 1806*a* has an SoC value of 60%, which is different from the updated SoC value if 40% for battery packs 1802*a*, 1803*a*, and 1804*a*. Thus, battery packs 1802*a*, 1803*a*, 1804*a*, and 1805*a* exhibit SoC variability, which may cause the charger 1801*a* to enlarge the list. The enlarged list may include an updated group of one or more battery packs with the lowest level of SoC values (e.g., battery packs 1802*a*, 1803*a*, 18004*a*) and an updated group of one or more battery packs with a higher level of SoC values (e.g., battery pack 1805*a*). The former group (e.g., the group of battery packs with the lowest level of SoC values) may thus include battery pack 1804*a*. At event 1852*c*, the charger 1852*c* may thus enable the charging of battery packs 1802*a*, 1803*a*, and 1804*a* via message 1863.

Figure 18B:
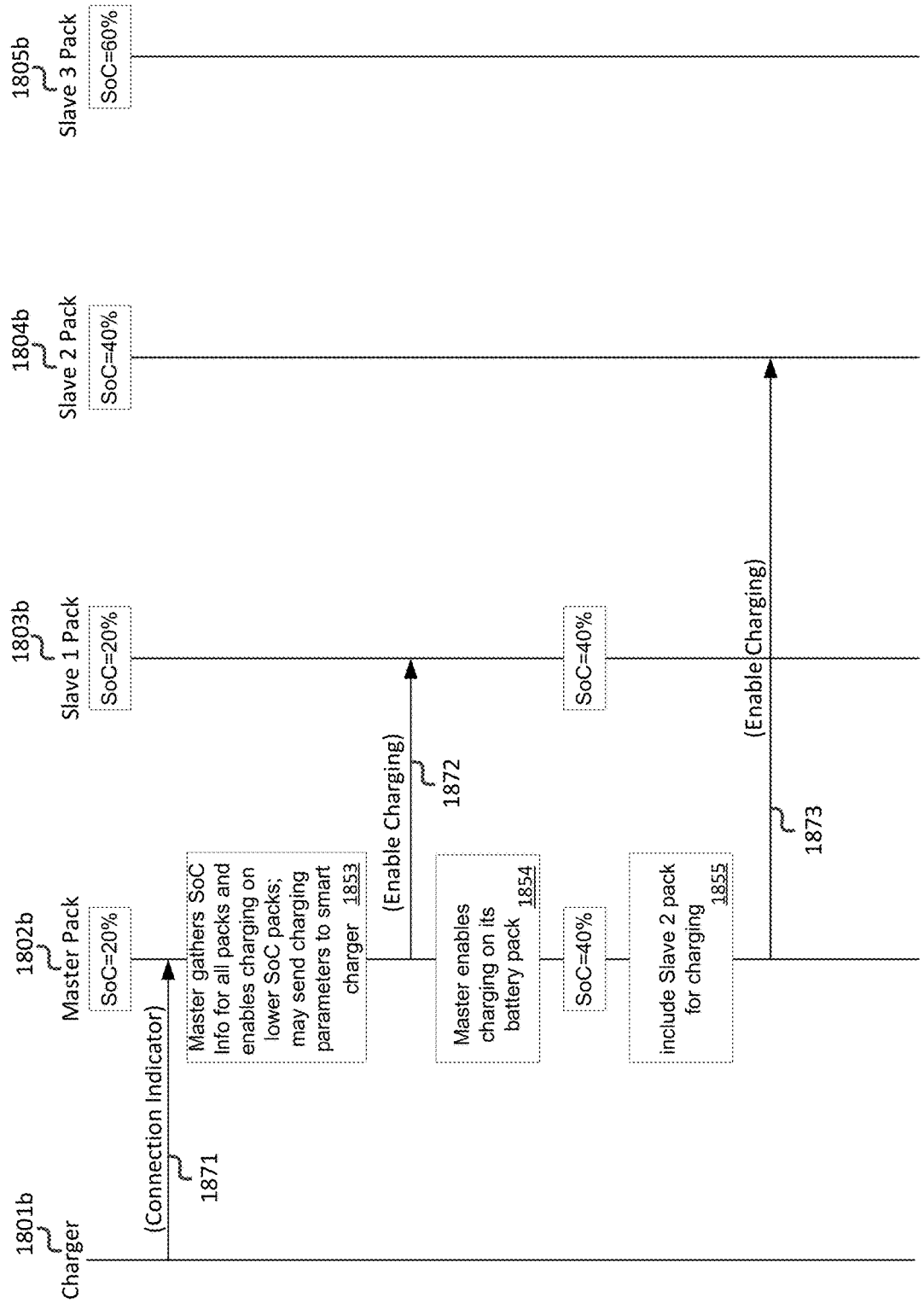
FIG. 18B shows a message flow scenario for charging a plurality of battery packs in accordance with an embodiment.

FIG. 18B shows an example message flow scenario for charging a plurality of battery packs for the example shown in FIG. 16. However, rather than charger 1801*b* gathering SoC data and enabling the battery packs, master battery pack 1802*b* does so when charger 1801*b* is detected via connection indicator 1871. Connection indicator 1871 may be obtained by different approaches, including messaging over a communication channel, a pin, and so forth.

Figure 18C:
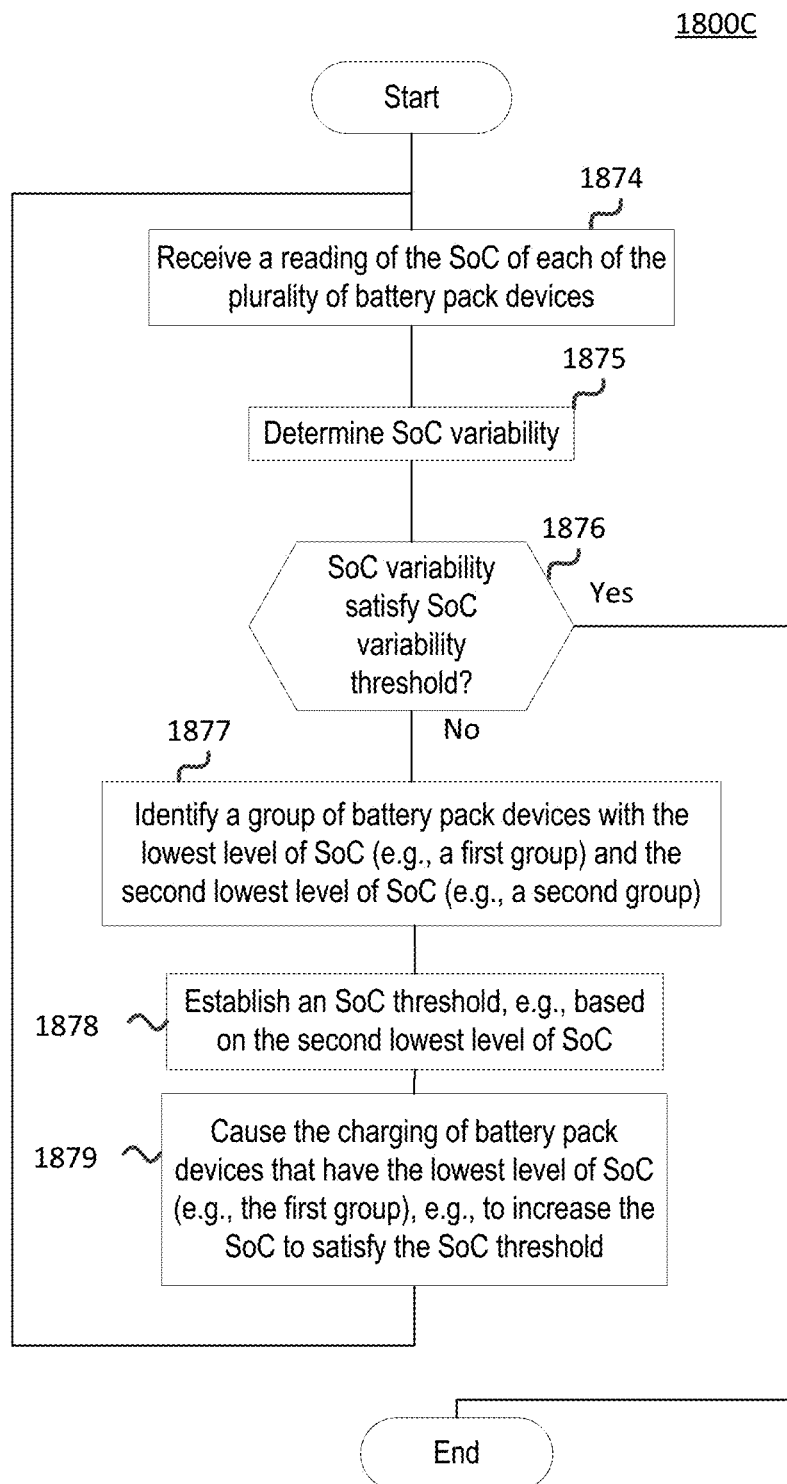
FIG. 18C shows a flowchart of a method for intelligently charging a plurality of battery packs in accordance with an embodiment.

FIG. 18C shows an example flowchart of a method 1800C for intelligently charging a plurality of battery packs, in accordance with a non-limiting embodiment. Method 1800C may be performed by a computing device having one or more processors. The computing device may be a standalone device communicatively linked to one or more of the battery packs and/or to the charger. Also or alternatively, the computing device may comprise one of the battery packs (e.g., a master battery pack) that has the capability of managing one or more functions of the other battery packs of the plurality of battery packs. Also or alternatively, the computing device may comprise the charger.

As discussed previously, each battery pack may have a state of charge (SoC) indicating, e.g., a degree or level of charge relative to its capacity. At step 1874, the computing device may receive a reading (e.g., first reading) of the SoC of each of the plurality of battery packs. The reading may be obtained via a sensor or a monitor at each battery pack. As discussed previously, the SoC's may vary among a plurality of battery packs or may remain relatively constant. An SoC variability (e.g., a first SoC variability) may be computed to indicate a degree of variability of the SoC of the plurality of battery packs (e.g., as in step 1875).

The SoC variability may be based on the SoC's of each of the respective battery packs obtained in step 1874. For example, an SoC variability may be based on one or more of a variance, a standard deviation, a range (e.g., an interquartile range), a mean absolute difference, a median absolute deviation, an average absolute deviation, a distance standard deviation, or a like metric based on the SoC values of each of the plurality of battery packs. For example, in Table 1 discussed above, which comprises a plurality of battery packs (e.g., Pack 1, Pack 2, Pack 3, and Pack 4), there is greater SoC variability at time T0 than there is at time T6. In one aspect, where SoC variability is determined on the basis of a computed range of SoC values, the SoC variability of the battery packs at T0 is 85 (i.e., 100%-15%), whereas the SoC variability at T6 is only 4 (e.g., 45%-41%). If "5" is set as an SoC variability threshold, then the SoC variability at T6 may be said to have satisfied (e.g., fall below) the threshold.

In some aspects, before the computing device can receive the SoC readings, an interlock safety pin may need to allow interaction with the battery packs to occur. For example, the computing device may initially determine that the interlock safety pin allows the receiving the SoC readings from the plurality of battery packs.

The computing device may store, e.g., in memory device 202, a metric indicating an SoC's variability threshold, e.g., to indicate whether variability of the SoC's is insignificant. For example, if an SoC of a battery pack (e.g., first battery pack) is significantly lower than an SoC of another battery pack (e.g., a second battery pack), it is likely that the SoC variability will be significant and therefore not satisfy the SoC variability threshold. At step 1876, the computing device may thus determine whether the SoC variability (e.g., as computed in step 1875) satisfies the SoC variability threshold.

If the SoC variability does not satisfy the SoC variability threshold (e.g., the variation in SoC's among the plurality of battery packs is significant) the computing device may establish an SoC threshold (e.g., as in step 1878) The SoC threshold may be based on the SoC reading of battery pack having the next higher SoC reading (e.g., the second battery pack) after the battery pack with the lowest SoC (e.g., the first battery pack). Thus, the computing device may identify the lowest SoC readings in order to determine the next higher SoC reading (e.g., as in 1877). For example, as discussed in relation to FIG. 16, battery pack 1604*a* had an SoC of 40%, which is the next higher SoC after the lowest SoC of the battery packs of 20% belonging to battery packs 1602*a* and 1603*a*. Thus, based on the example show in relation to FIG. 16, an SoC threshold may be set to 40%.

Furthermore, at step 1879, the computing device may cause the charging of battery packs that have lower SoC's than the established SoC threshold, e.g., by enabling electric charge arrays from the charger to the battery packs. The charging may cause the SoC's of the battery packs to increase, e.g., so that it approaches, matches, and/or satisfies the SoC threshold.

In some aspects, before the computing device can cause the charging of any battery packs, a wake pin, as discussed previously, may need to allow for the charging to occur. For example, the wake pin may need to be set to "on" before a charging can occur. The computing device may initially determine that the wake pin is set to "on" before causing the charging of the battery packs.

This can be detected by the computing device via an additional reading (e.g., a second reading) of the SoC's of each of the plurality of battery packs. Furthermore, the computing device may determine or compute, based on the additional reading, a second SoC variability of the plurality of battery packs. The second SoC variability may be found to satisfy the SoC variability threshold.

If the second SoC variability is not found to satisfy the SoC variability threshold, one or more steps of method 1800C may be repeated until the SoC variability threshold is satisfied. For example, a new SoC threshold may be set based on the next higher SoC after the lowest SoC, and causing the charging of the battery packs with the lowest SoC's.

Thus, one or more iterations of the following can be performed after an updated SoC variability of the plurality of battery packs satisfies the SoC variability threshold: The computing device may identify an Nth group of one or more battery packs within the plurality of battery back devices, wherein the Nth group may have the lowest level of a previous reading of the SoC of the plurality of battery packs; the computing device may also identify an (N+1) group of one or more battery packs of the plurality of battery back devices, wherein the (N+1) group can have the second lowest level of the previous reading of the SoC of the plurality of battery packs; and the computing device may generate a list comprising the n group and the N+1 group. In each iteration, the computing device may determine that the SoC variability of the list in the current iteration does not satisfy the SoC variability threshold. If the SoC variability does satisfy the SoC threshold, the computing device may exit the iterations loop. However, assuming the SoC variability at each iteration does not satisfy the SoC variation threshold, the computing device may an SoC threshold using the previous reading of the SoC of the N+1 group. Subsequently, the computing device may cause, via electric charge arrays, the charging of the N group of battery packs to cause the SoC of the N group to increase and satisfy the SoC threshold. The computing device may receive a subsequent reading of an SoC of each of the plurality of battery packs. An updated SoC variability of the plurality of battery packs may thus be determined based on the subsequent reading of the SoC of each of the plurality of battery packs. As discussed, the above steps may be repeated until the SoC variability (updated at each iteration) satisfies the SoC variability threshold (e.g., the SoCs of the battery packs vary less than a specified range).

Figure 19A:
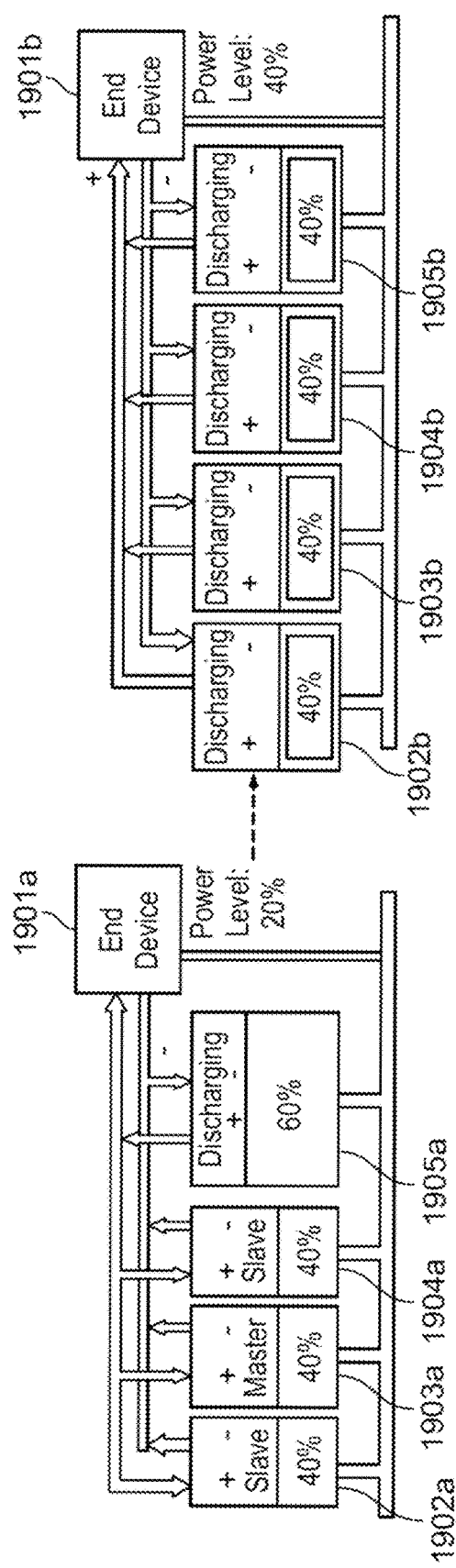
FIG. 19A shows an example of a plurality of battery packs discharging in order to electrically power an end device in accordance with an embodiment.
Figure 19B:
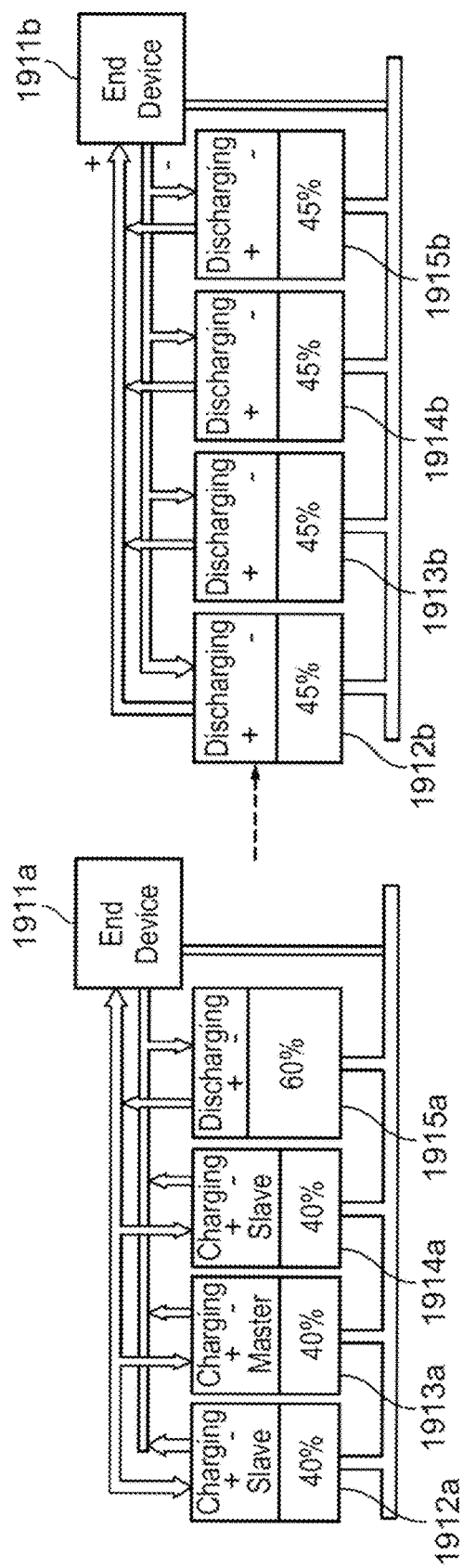
FIG. 19B shows an example of a plurality of battery packs discharging in order to electrically power an end device in accordance with an embodiment.

The following FIG. 19A and FIG. 19B show two examples of a battery system powering an end device based on power requirements of the end device. In FIG. 19A, only one battery pack is needed to power end device 1901*a, b* while in FIG. 19B, more than one battery pack is needed to power end device 1911*a, b*.

FIG. 19A shows an example of a plurality of battery packs discharging in order to electrically power an end device in accordance with an embodiment. The initial SoC values of battery packs 1902*a*-1905*a* are 40%, 40%, 40%, and 60%, respectively. As shown in FIG. 19A, a single battery pack (e.g., battery pack 1905*a* having an SoC of 60%) may initially be used to power end device 1901*a* until the SoC value of the single battery pack reaches 40% (the same SoC values as the other battery packs) (e.g., as in battery pack 1905*b*). Using only a group of one or more battery packs having the highest or higher SoC level (in this case the single battery pack 1905*a*) to initially power an end device, until the SoC values of the group reaches those of the rest of the pack, may be a more efficient and/or safe method of utilizing battery packs to power an end device. As shown in FIG. 19A, after the single battery pack with the initially higher SoC value has been used to initially power the end device, and its SoC readings reach those of the other battery packs (e.g., battery packs 1902*b*-1905*b*), the other battery packs may join in powering the end device 1901*b*.

FIG. 19B shows another example of a plurality of battery packs discharging in order to electrically power an end device in accordance with an embodiment. As shown in FIG. 19B, the initial SoC values of battery packs 1912*a*-1915*a* are 40%, 40%, 40%, and 60%, respectively. In some aspects, more than one battery pack may be needed to power end device 1911*a*-*b*. In such aspects, various systems and methods presented herein may be used to balance the battery packs before powering end device 1911*a*-*b*. The balancing of battery packs 1912*a*-1914*a* may be performed, e.g., to safeguard against the risk of an undesired electrical current in-rush from battery pack 1915*a*, which may occur in the absence of the balancing. When balancing is achieved, battery packs 1912*b*-1915*b* can then power end device 1911*b*.

When powering an end device (for example, a machine), connecting battery packs with varying SoC's may be problematic. Consequently, to prevent such problematic situations, a process (often implementing an intelligent method) may be needed to ensure that a required number of battery packs are connected for system discharge and enabled when appropriate.

Typically, when multiple battery packs are needed to power an end device, it may be advisable for battery packs with large SoC variations to not be connected at the same time. Rather, balancing of the battery packs may be performed initially.

Discharging may use one or more battery packs with higher SoC values first until passing a set threshold for lower SoC battery packs, at which point the lower SoC battery packs may be enabled.

Figure 20A:
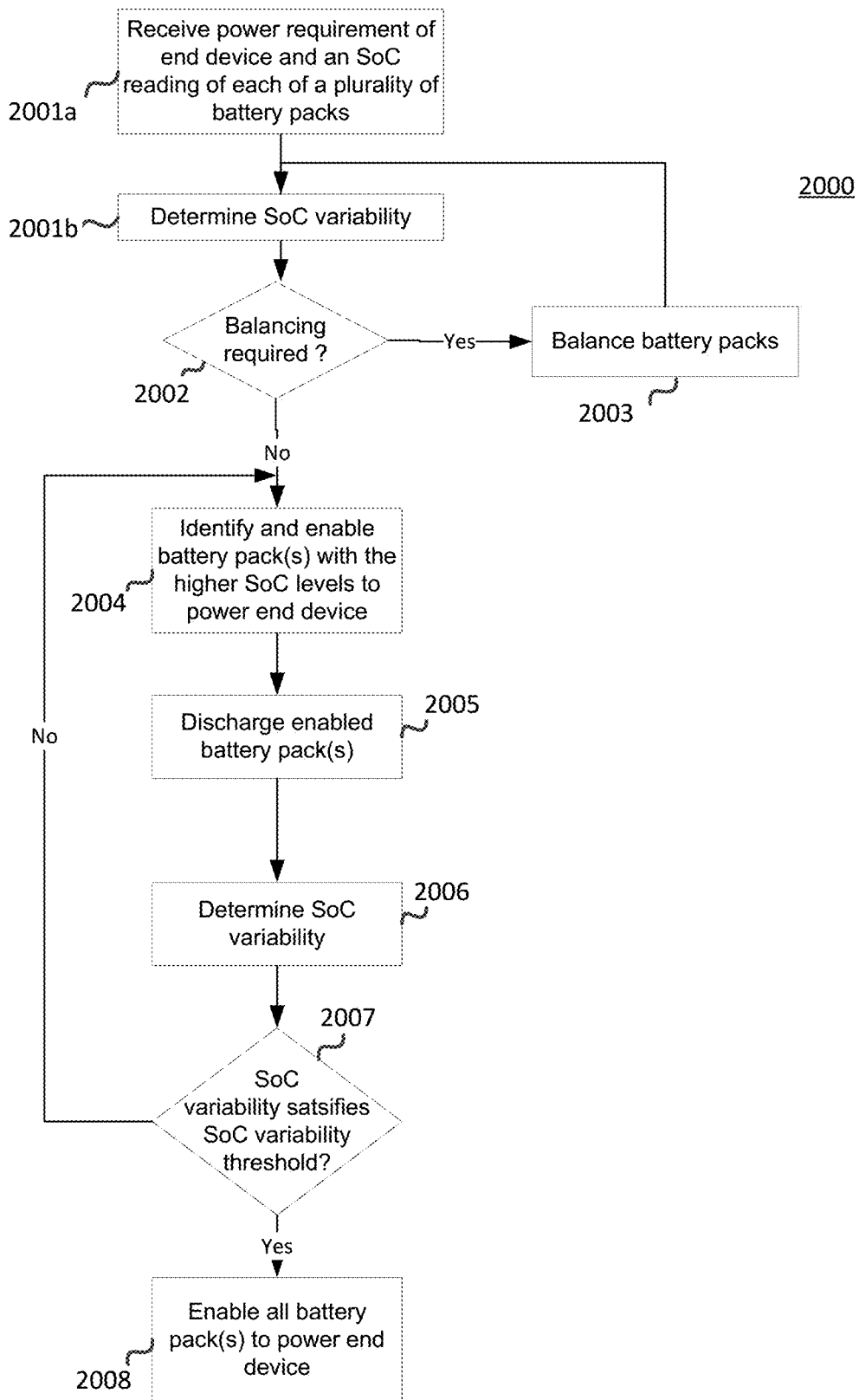
FIG. 20A shows a flowchart for discharging a plurality of battery packs in accordance with an embodiment.
Figure 20B:
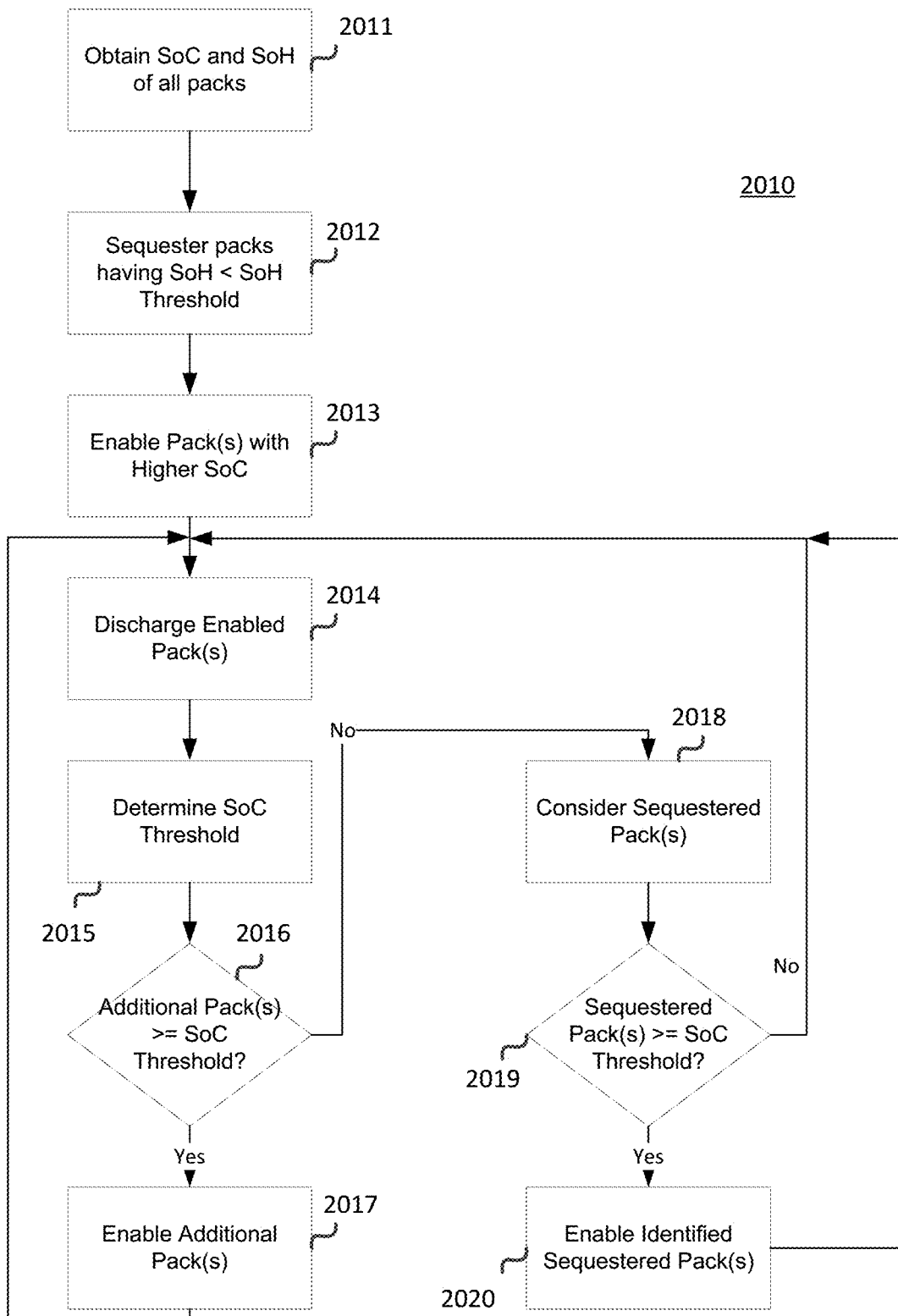
FIG. 20B shows a flowchart for discharging a plurality of battery packs in accordance with an embodiment.

Processes 2000 and 2010 shown in FIGS. 20A and 20B, respectively, are based on the above guidelines.

FIG. 20A shows process 2000 for discharging a plurality of battery packs in order to power an end device. At blocks 2001-2003, initial SoC values of the battery packs are gathered and balancing may be performed based on the SoC variation and the power requirements of the end device. FIG. 19B, as discussed previously, is an example illustration of the process of balancing the battery packs, as described in blocks 2001-2003. However, as will be described in blocks 2004-2008, some aspects of the present disclosure may involve the initial powering of an end device by a single or limited number of battery packs having a higher SoC level, before other battery packs can join in the powering of the end device. FIG. 19*a*, as discussed previously, is an example illustration of the process of powering an end device by a limited number of battery packs initially and expanding the list of battery backs that can power the end device.

Referring now to block 2001*a*, a power requirement of the end device may be obtained, and a first reading of a SoC of each of the plurality of battery packs may be obtained. The plurality of battery packs may include various battery packs or groups of battery packs with varying SoC values. At block 2001*b*, an SoC variability may be calculated to determine a degree to which the SoC values vary among the plurality of battery packs. Also or alternatively, the highest SoC level may be identified, and the computing device may determine that not all of the battery packs have SoC values the highest SoC level.

Depending on the SoC variability, the plurality of battery packs may pose a risk if they are used to concurrently power the end device. As discussed previously in relation to FIG. 19*a*, if a group of one or more of the plurality of battery packs has SoC values at a level that is significantly greater than the SoC's of the rest of the plurality of battery packs, it may be advisable to initially power the end device only using the group with the significantly greater SoC values (e.g., without the concurrent powering by the other battery packs of the plurality of battery packs). The computing device may allow a group of a single or a restricted number of battery packs to power an end device by only enabling the corresponding discharge arrays of the group. The pathway of allowing the group to power the end device is shown in blocks 2004-2008.

Another way to address the above-described and similar risks may be to balance the battery packs, and thereby reduce the SoC variability of the plurality of battery packs, as discussed previously in relation to FIG. 19*b*. For example, one group of battery packs (e.g., a first group) may have SoC values that are at a level lower than another group of battery packs (e.g., a second group). An SoC variability of the plurality of devices may be calculated and found to not satisfy an SoC variability threshold (e.g., the range between the highest and lowest SoC values is too high) based on the variation in SoC between the first group and second group. The computing device may thus determine that a balancing is required (e.g., "Yes" at block 2002) based on the SoC variability not satisfying (e.g., falling within) the SoC variability threshold. The battery packs may thus be balanced according to previously discussed methods as shown in FIG. 19B.

The computing device may consequently determine whether or not a balancing is not required (e.g., "No" at block 2002). The decision may be a preference provided (e.g., configured) to the computing device by an operator of the computing device. Also or alternatively, the decision may be based on two or more SoC variability thresholds. For example, if the SoC variability of the plurality of battery packs is higher than a higher SoC variability threshold (e.g., a first SoC variability threshold), the pathway of balancing the battery packs may be triggered. If the SoC variability is not higher than the first SoC variability threshold but is still higher than a second SoC variability threshold (which is not as high as the first SoC variability threshold), the pathway depicted in bocks 2004-2008 may be triggered (e.g., causing battery pack(s) with higher SoCs to initially power the end device).

Referring now to blocks 2004-2005, a group of one or more battery packs may be identified and enabled (e.g., by enabling the corresponding discharge arrays) to power the end device. The group may be identified by identifying the battery packs with SoCs at the highest level, or at least at a higher level than other battery packs. The computing device may thus cause the group to power the end device, thereby beginning the discharging of the group of battery packs (e.g., as in block 2005). The group of discharging battery packs may reach a lower SoC level. The resulting lower SoC level of the group, which initially had a higher SoC level, may result in a lower SoC variability for the plurality of battery packs. The computing device may thus determine the updated SoC variability at block 2006. If the updated SoC variability fails to satisfy the SoC variability threshold (e.g., there are still battery packs with higher SoC levels), the additional battery packs may be similarly identified and enabled to power the end device at blocks 2004-2005. After the SoC variability of the plurality of battery packs satisfies the SoC variability threshold (e.g., there is not much variation in the SoC levels of the plurality of battery packs), the computing device may allow all battery packs to power the end device.

Also or alternatively, both of the above-described pathways (e.g., blocks 2002-2003 and blocks 2004-2008, respectively) may be combined. For example, after balancing has been performed at block 2003, a second reading of the SoC's of each of the plurality of battery packs may be obtained, and a second SoC variability may be calculated. The SoC variability may satisfy the SoC variability threshold, e.g., the SoC's of the plurality of battery packs may vary less and/or have a reduced range. Subsequently, the plurality of battery packs may concurrently power the end device.

FIG. 20B shows process 2010 for discharging a plurality of battery packs in accordance with an exemplary embodiment. Process 2010 is similar to process 2000; however, some of the battery packs may be sequestered based on a state of health (SoH) of the battery packs. Battery packs with a low SoH may be sequestered and used only when needed.

At blocks 2011-2013, the SoC and SoH values of the battery packs may be gathered. The battery packs with SoH values that do not satisfy a predetermined SoH threshold may be sequestered, and in order to enabled after non-sequestered battery packs have been used. Non-sequestered battery packs (e.g., battery packs with SoH levels that satisfy the SoH threshold) may be used to initially power the end device based on the end device requirements and SoC values of the battery packs, as explained herein.

For example, at block 2013, the battery packs with SoC values that satisfy an SoC threshold (e.g., the SoC values are above the next highest level of SoC among the plurality of battery packs) may be enabled to power an end device, thereby resulting in the discharging of these battery packs at block 2014. As shown in blocks 2014-2016, the enabled battery packs can be discharged until a lower SoC value is reached (e.g., the SoC fail to satisfy the SoC threshold). At that time, additional non-sequestered battery packs may be enabled at block 2017. However, when no non-sequestered battery packs are available, the sequestered battery packs may be considered at 2018-2020.

Sequestering low SoH battery packs may be beneficial since usage of older battery packs (often associated with a low SoH value) may be reduced, thus extending the life of those battery packs.

Figure 21:
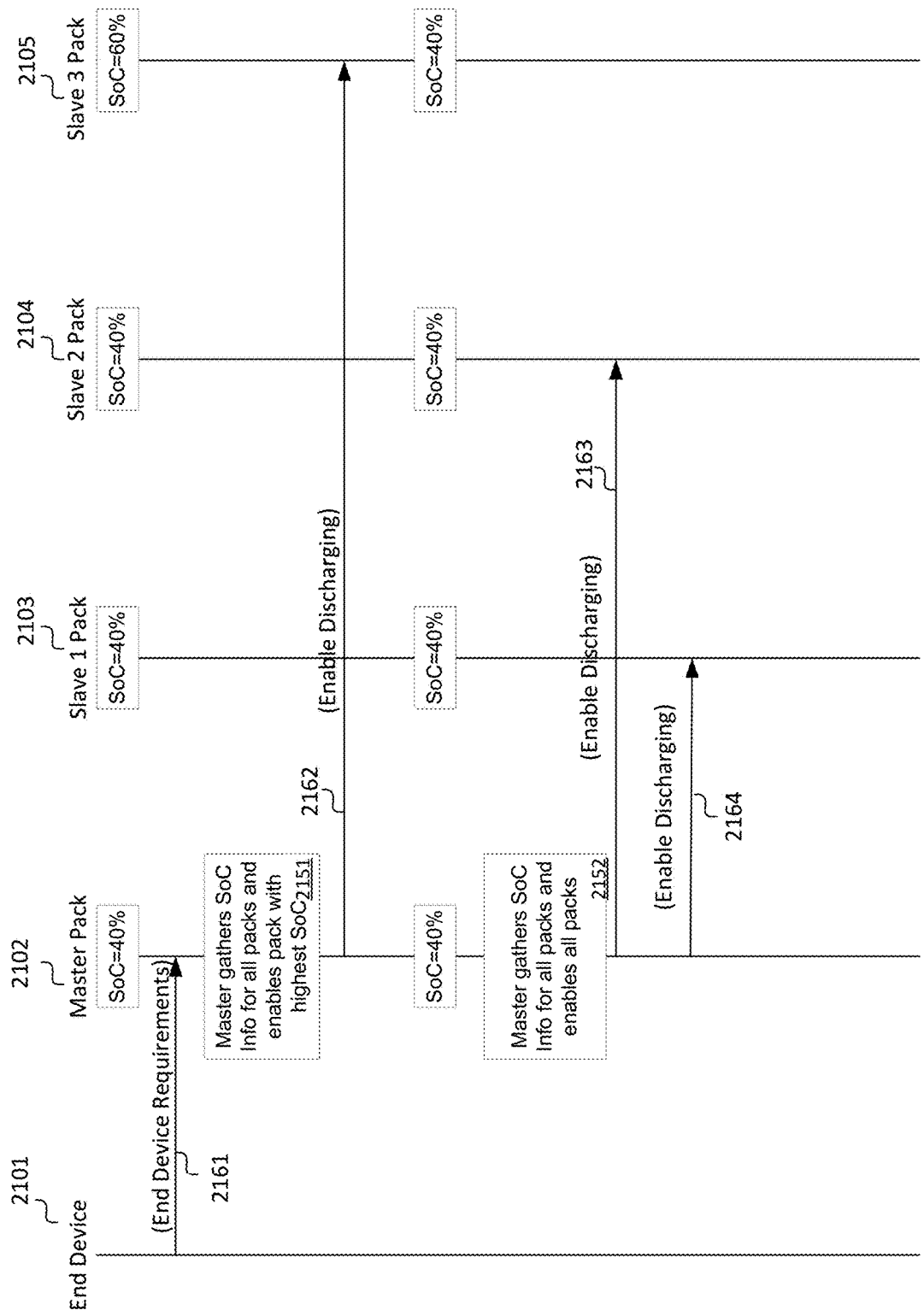
FIG. 21 shows a message flow scenario for discharging a plurality of battery packs in accordance with an embodiment.

FIG. 21 shows a message flow scenario for discharging a plurality of battery packs for the example shown in FIG. 19A. Battery packs 2002-2005 initially have SoC values of 40%, 40%, 40%, and 60%, respectively. Power requirements of end device 2101 may be obtained from master battery pack 2102 via message 2161 over the communication channel (for example, a CAN bus), where only one battery pack is needed to power end device 2101. Consequently, in accordance with process 2100, master battery pack 2102 may enable battery pack 2105 for discharging via message 2162.

When battery pack 2105 reaches the SoC value of the other battery packs, master battery pack 2102 enables battery packs 2103 and 2104 via messages 2163 and 2164 and may enable itself via internal messaging.

In some aspects, a process (for example, process 2200 as will be discussed) may be directed to a "limp home mode" operation for a failed Li-ion battery cell in a large-format battery pack system. A "Limp home mode" operation can safely mitigate a catastrophic failure in a system. For example, the voltage of a battery cell may become very low (e.g., below a predetermined voltage threshold), indicative of a failing battery cell. With a medium-large battery pack implementation, the internal battery management system may preemptively diagnose a failure and consequently may mitigate the failure by initiating a partial shutdown of the battery pack such that the equipment (end device) being powered by the battery system does not require a total shutdown and can still "limp home."

Figure 22:
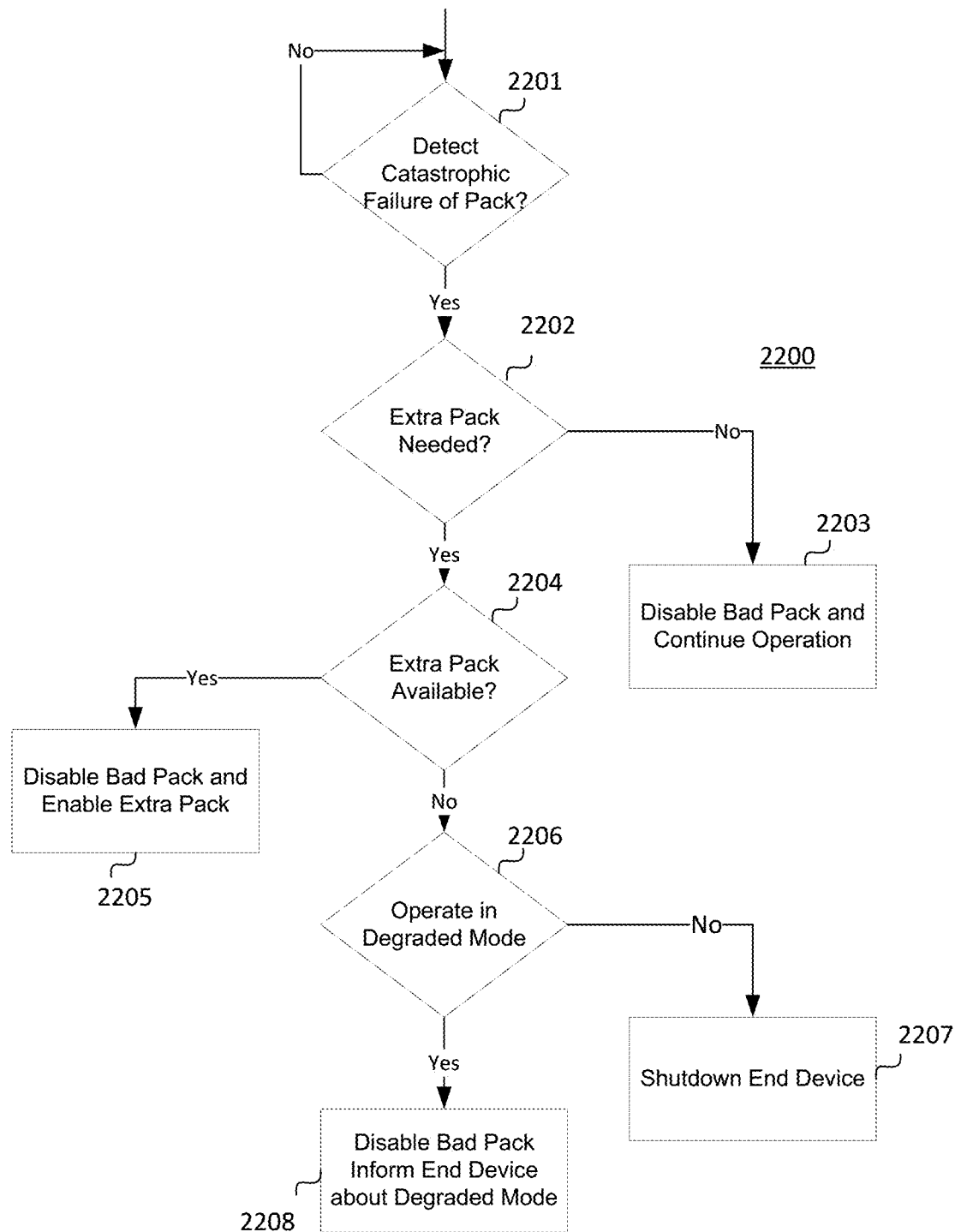
FIG. 22 a flowchart for limp home mode operation in accordance with an embodiment.

FIG. 22 a flowchart for limp home mode operation in accordance with an embodiment. At block 2201, the master battery pack detects a catastrophic failure of one or more of the battery cells of one of the battery packs powering the end device. For example, a cell voltage in the battery pack may drop below an acceptable minimum threshold, a maximum current is exceeded, and/or a battery cell temperature is above an allowable range.

When the master battery pack detects the catastrophic failure, the master battery pack determines whether an extra battery pack is needed at block 2202. For example, a battery system may have activated four battery packs when an end device needs only three battery packs with a given SoC level. If so, process 2200 disables the bad battery pack and continues operation at block 2203.

However, if the extra battery pack is needed, the master battery pack determines whether an unused battery pack (which may be the master battery pack itself) in the battery system is available at block 2204. If so, the master battery pack disables the bad battery pack (for example, disabling the discharging array) and enables the extra battery pack (for example, enabling the discharging array) at block 2205. If more than one extra battery pack is available, the master battery pack may select the extra battery pack having the largest SoC value in order to continue service for the largest possible time. However, when no extra battery packs are available and degraded operation of the end device is permitted, as determined at block 2206, the master battery pack disables the bad battery pack and sends a failure alert message to the end device about degraded operation at block 2208. However, if degraded operation is not acceptable for the end device, power is removed from the end device at block 2207 to shut down the end device.

When a fault occurs at a slave battery pack, it is possible that the slave battery pack does not send a message to the master battery pack under various failure modes. However, the master battery pack may determine that there is no longer communication from the slave battery pack and adjust a power level (derate) to the end device.

While the bad battery pack may be a slave battery pack, the master battery pack itself may be the bad battery pack. For example, a fault may occur with one of its battery cells while the processing capabilities of the master battery pack is not compromised. If so, the master battery pack may internally disable its own discharging array, attempt to enable the discharging array of a spare battery pack, and continue operating as the master battery pack.

With some embodiments, when the master battery pack has faulted, a new master battery pack may be assigned even if the faulty master battery pack is still operational. This approach ensures that the faulty master battery pack does not compromise the integrity of the overall handling of the other battery packs.

With some embodiments, when the master battery pack has faulted, a new master battery pack may be assigned to allow continued derated performance when communication to the faulty master battery is lost.

Figure 23A:
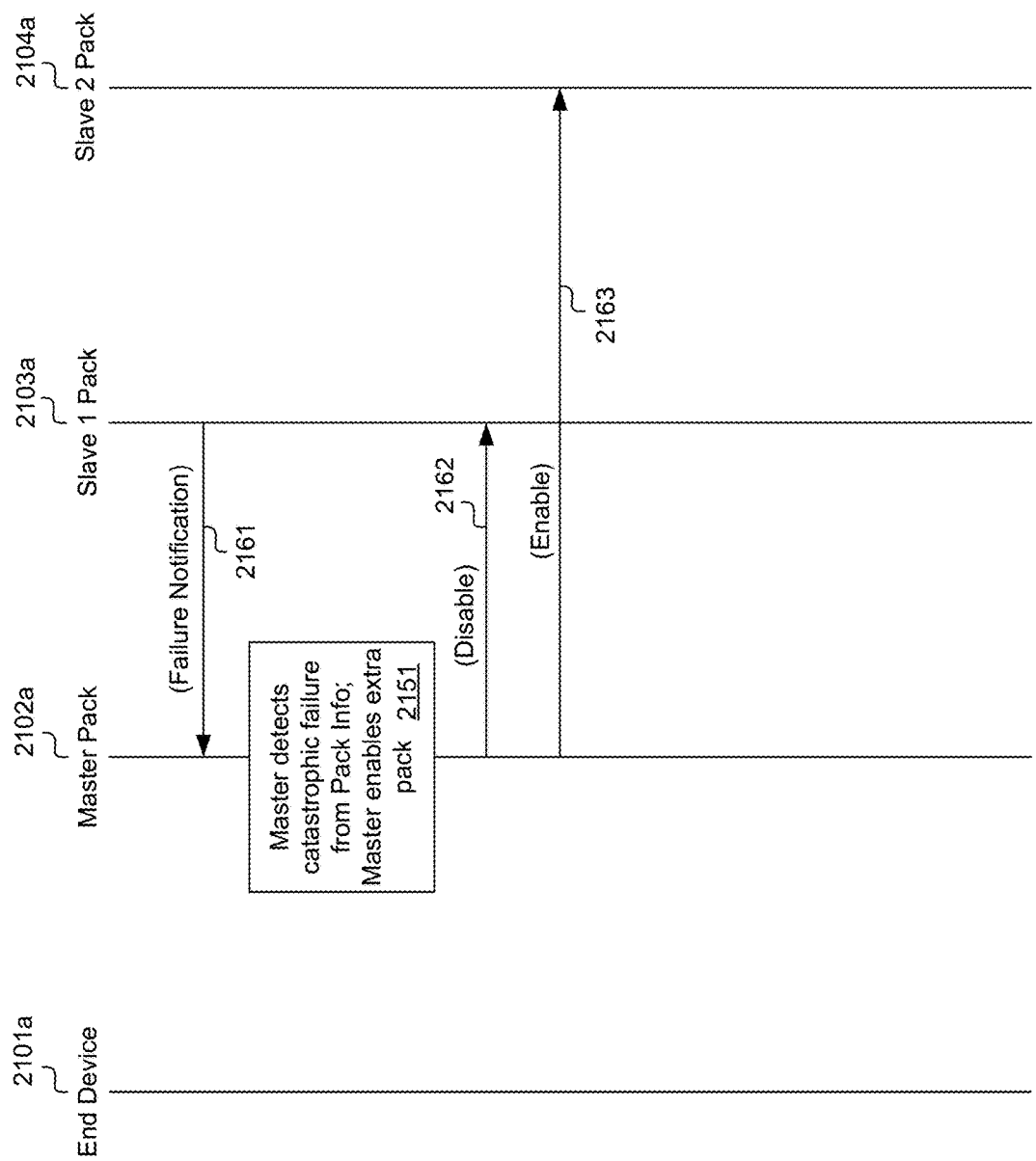
FIG. 23A shows a message flow scenario for limp home mode operation in accordance with an embodiment.

FIG. 23A shows a message flow scenario for limp home mode operation in accordance with an embodiment. With this scenario, a spare battery pack (pack 2104a) is available when a catastrophic failure is detected at battery pack 2103a.

At event 2151, master battery pack 2102a detects a catastrophic failure at battery pack 2103a in response to failure notification message 2161. For example, battery pack 2103a may provide battery status information indicative of a low battery cell voltage. The status information may be in response to a query from master battery pack 2102a or may be autonomously sent when a catastrophic event occurs. Consequently, master battery pack 2102a enables spare battery pack 2104a and disables bad battery pack 2103a via messages 2163 and 2162, respectively.

Figure 23B:
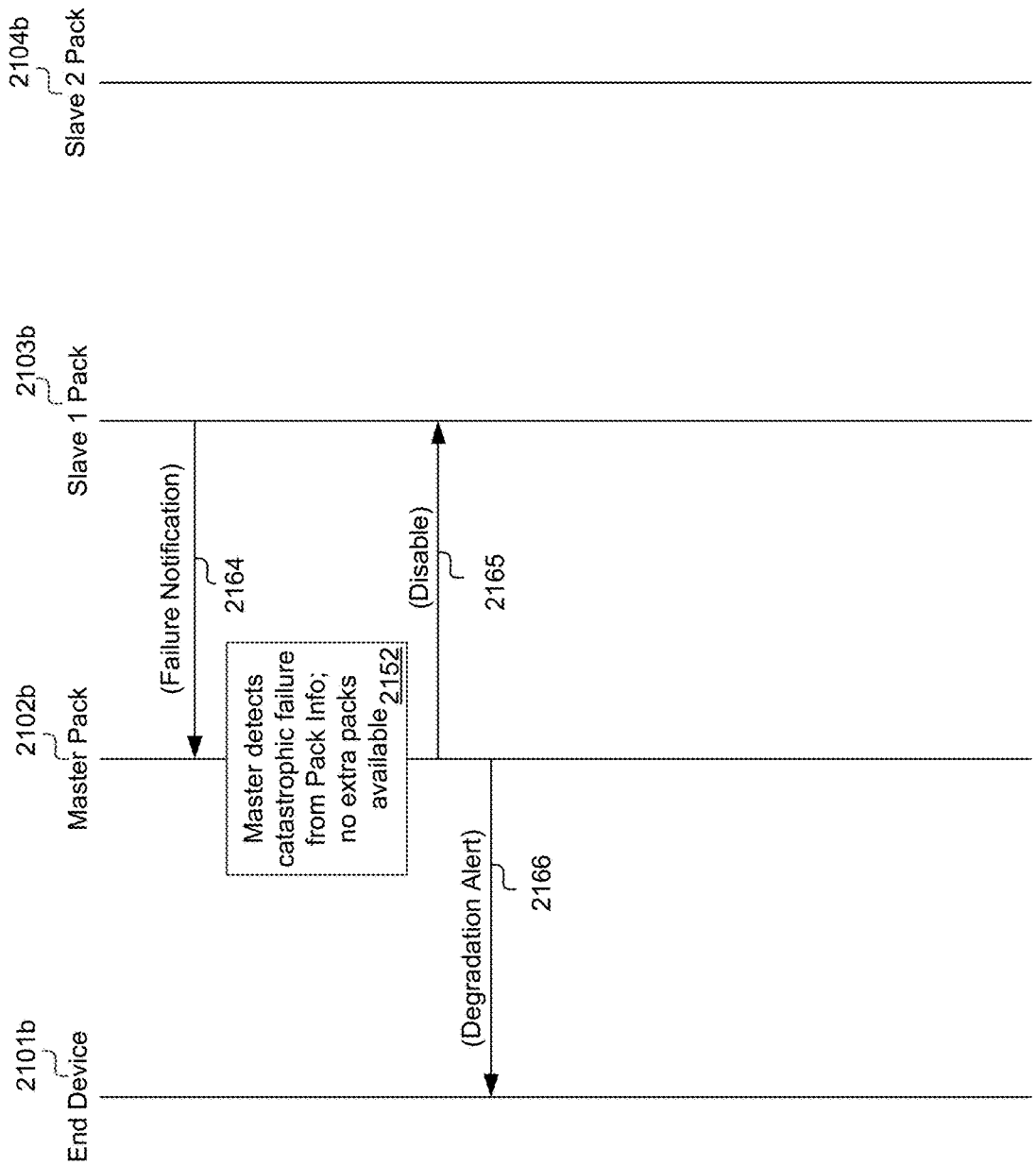
FIG. 23B shows a message flow scenario for limp home mode operation in accordance with an embodiment.

FIG. 23B shows a message flow scenario for limp home mode operation in accordance with an embodiment. With this scenario, a spare battery pack is not available.

At event 2152, similar to the message scenario in FIG. 23A, master battery pack 2102b detects a catastrophic failure at battery pack 2103b when receiving failure notification message 2164 from 2103b. Because master battery pack 2102b determines that no spare battery pack is available, master battery pack 2102b disables battery pack 2103b via message 2165 and sends degradation message 2166 to end device 2101b, where end device 2101b is able to operate in a degradation mode.

Referring to FIGS. 23A-B. failure notification messages 2161 and 2164 may be autonomously sent from the battery pack incurring the catastrophic failure or may be sent in response to a request for battery status information from master battery pack 2102a,b. When sent autonomously, the battery pack may detect when a battery parameter (for example, SoH or cell voltage) drops to a predetermined threshold and then sends the failure notification message to master battery pack 2102a,b. When sent in response to a status request, master battery pack 2102a,b may send the status request repetitively (for example, periodically). The battery pack receives the status requests and, in response, provides current battery status information. When one or more of the returned battery parameters drops below a predetermined threshold, master battery pack 2102a,b detects a catastrophic failure at the battery pack.

With some embodiments, master battery pack 2102a,b may receive periodic battery status information from the other battery packs. When master battery pack 2102a,b detects a sudden drop (for example, more than a predetermined difference with respect to the previous value) in one of the battery parameters (for example, cell voltage), master battery pack 2102a,b may determine that a catastrophic failure at the corresponding battery pack is predicted or imminent and take preemptive action and/or generate a warning notification.

With some embodiments, battery cells 203 and 210 (shown in FIGS. 2A and 2B, respectively) may have a cell structure (for example, a parallel structure) so that the battery pack may deactivate the failing battery cells while the other battery cells remain enabled. In such a situation, the battery pack may operate in a degraded mode and report that the battery pack is operating in the degraded mode to master battery pack 2102a,b.

Figure 24:
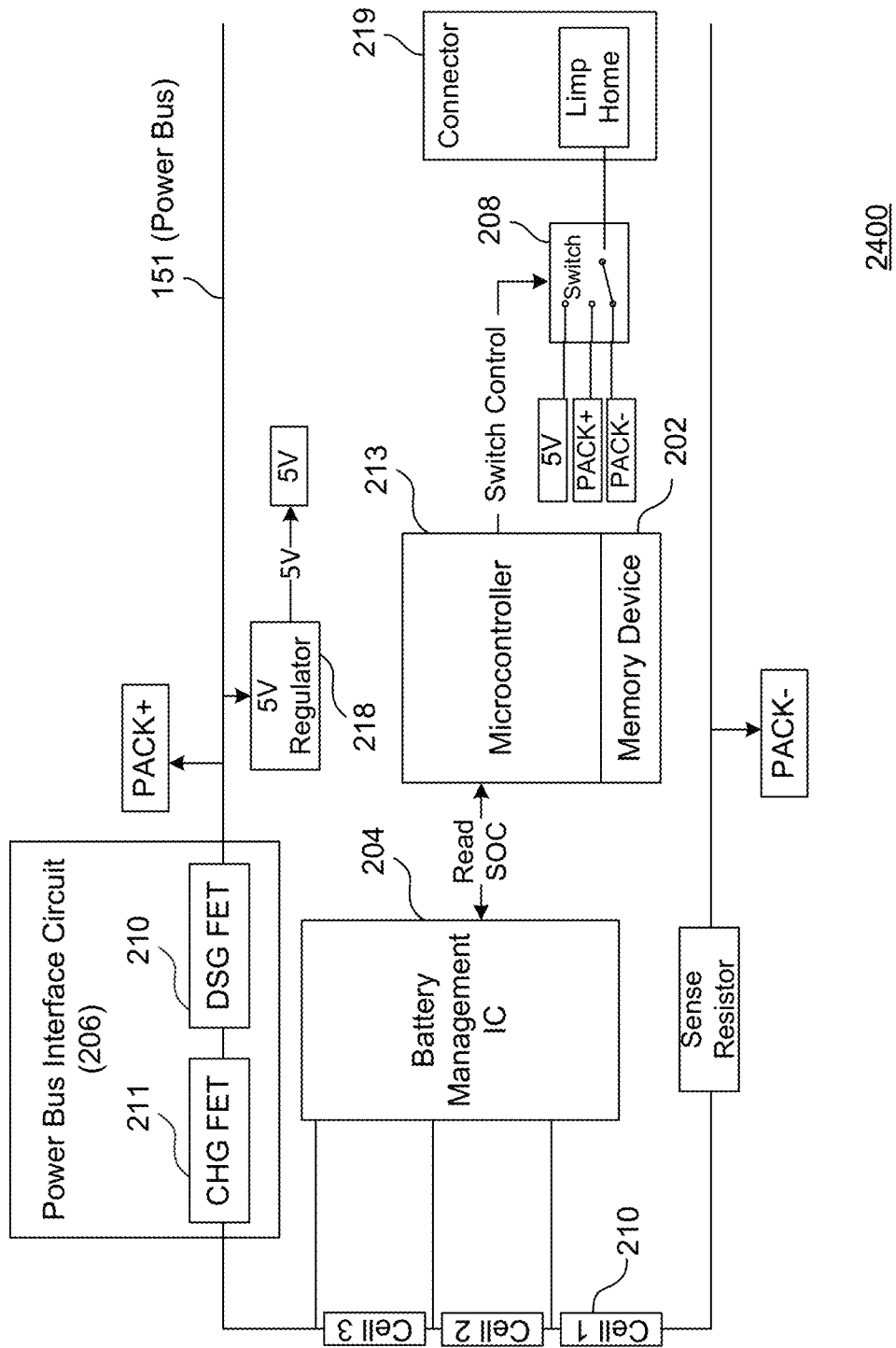
FIG. 24 shows a battery pack with a connector having a limp home mode signal outputted to an external device in accordance with an embodiment.

FIG. 24 shows a battery pack system 2400 with a connector having a limp home mode signal outputted to an external device in accordance with an embodiment disclosed herein. While the banal technique of measuring voltage might have been sufficient for a lead acid battery, with a Li-ion battery pack as illustrated throughout the disclosure herein, the system is far more complex and requires significant enhancements and techniques. Moreover, some end devices traditionally powered by a lead acid battery or other traditional battery pack might not be equipped with a CAN communication bus communicatively coupled with the battery system. As such, these end devices may have relied upon other metrics and/or components to determine and trigger a limp home mode for the application of the end device. As a result, disclosed in FIG. 24 is a battery pack system with a connector 219 configured to output a signal (e.g., analog signal) to an input line of the end device corresponding to a limp home mode.

One or more of the components in FIG. 24 enable operation of the limp home mode signal to drive a controller or other hardware/software/firmware on the end device. An input connector is illustrated in FIG. 24 to connect to a battery pack and provides power for a gateway printed circuit board assembly (PCBA) and also the relevant data over CAN communication bus from the pack. A gateway connector 219 is configured to be communicatively coupled with an interface to the end device to provide a limp home mode signal. The connector 219 may be connected to a switch 208 that provides one of several possible signal levels to the connector 219: a ground signal (GND) as "PACK-", a five volt signal to activate/trigger a limp home mode, a "PACK+" signal that could be five volts or more based on the requirements of the end device and its circuitry, and/or other signal level and types. A microcontroller 213 provides, inter alia, a switch control input to the switch 208 as illustrated in FIG. 24, to read messages from the battery pack over CAN communication, process the data, and execute the logic to decide when to activate and deactivate the signal being outputted by the connector. While FIG. 24 illustrates a switch and connector for limp home mode, other outputted signals are contemplated by this disclosure.

FIG. 24 also illustrated a 5V buck regulator 218 that may be used to convert the battery pack voltage and provide regulated 5V voltage to connect to the switch 208 input signals when they are to be activated. Although FIG. 24 illustrates a 5V regulated voltage, the disclosure contemplates the voltage input into the switch 208 to be one of several voltage values and/or types, depending on the requirements of the end device system. Furthermore, a current limiter (e.g., a 200 mA current limiter) may be included to limit the current on the input signals into the switch 208 so that even if a user creates a short to GND on these signals, the circuitry is protected. In addition, a current limiter (e.g., 1A current limiter) may be included for the PACK+ signal line for illustrative embodiments where the battery pack voltage is connected to the signals when the condition to activate them is satisfied. In such examples, the signals are protected from short to GND by the aforementioned current limiter.

The smart battery pack in FIG. 24 includes a battery management system (BMS) or battery management integrated circuit (IC) 204 that computes the battery pack SoC using one or more algorithms. In some examples, the computing of the SoC may be performed continuously, periodically on one or more intervals, and/or upon request. For example, a microcontroller 213 may request a SoC value from the battery management integrated circuit (IC) 204 and the value may be then provided to the microcontroller 213. The microcontroller may operate based on programming logic, hardwired logic, and/or computer-readable code stored in the memory device 202 coupled to the microcontroller 213. This code programs/controls the microcontroller 23 to switch between a plurality of signals available to it via a switch 208. For example, the switch 208 may output a default 0V when no limp home mode is desired. But the switch 208 may be pulled high to the battery pack voltage or regulated 5V voltage depending on the end device's application needs when the conditions to enter the Limp Home mode is satisfied. Some illustrative conditions include: (i) the SoC is below a threshold value; (ii) one or more batteries in a multi-battery pack system goes faulty; and/or (iii) any other condition that make it necessary to make the end device/application operate with reduced performance so that the end device can safely end the current task.

In one example, when the SoC value provided by the battery management IC 204 is below a safe threshold, the microcontroller 213 may control the switch 208 to output a 5V or PACK+ input signal instead of a default PACK- or 0V. In some examples, the safe threshold value may be adjusted/varied based on one or more criteria. For example, the value may be adjusted with respect to temperature measurements provided by the battery management IC 204 to the microcontroller 213. Because the remaining capacity reduces at cold temperatures, the memory device 202 connected to the microcontroller 213 may store a lookup table (or equivalent data structure) that provides different safe threshold values corresponding to different temperature readings. In one example, the threshold may be 10% SoC at 25 degrees Celsius, 15% SoC at 0 deg C. and 20% SoC at −15 deg C., in one example. Although temperature is used as one example of a criterion in the aforementioned lookup table, the disclosure is not so limited. Other criteria such as the number of battery packs in a multi-pack system may be different or additional criteria for the lookup table storing different threshold values.

If the battery pack does not have a free pin that can be allotted for outputting a limp home signal, a gateway PCBA that communicates with the battery pack over electronic communication protocols such as a controller area network (CAN) bus, may be interfaced to the battery pack. Such a gateway (e.g., gateway PCBA) provides the 'limp home' signal over a connector 219 that may be wired into an interface of the end device/application device. The gateway may monitor the communication messages from the battery pack and drives the outputted pin high when the conditions for limp home, as defined by the microcontroller 213 and memory device 202, are satisfied. In some examples, the connector 219 may interface with an existing electronic chip or electronic interface on the powered end device to throw an interrupt on the end device. The interrupt may trigger the end device to enter a limp home mode.

Figure 25A:
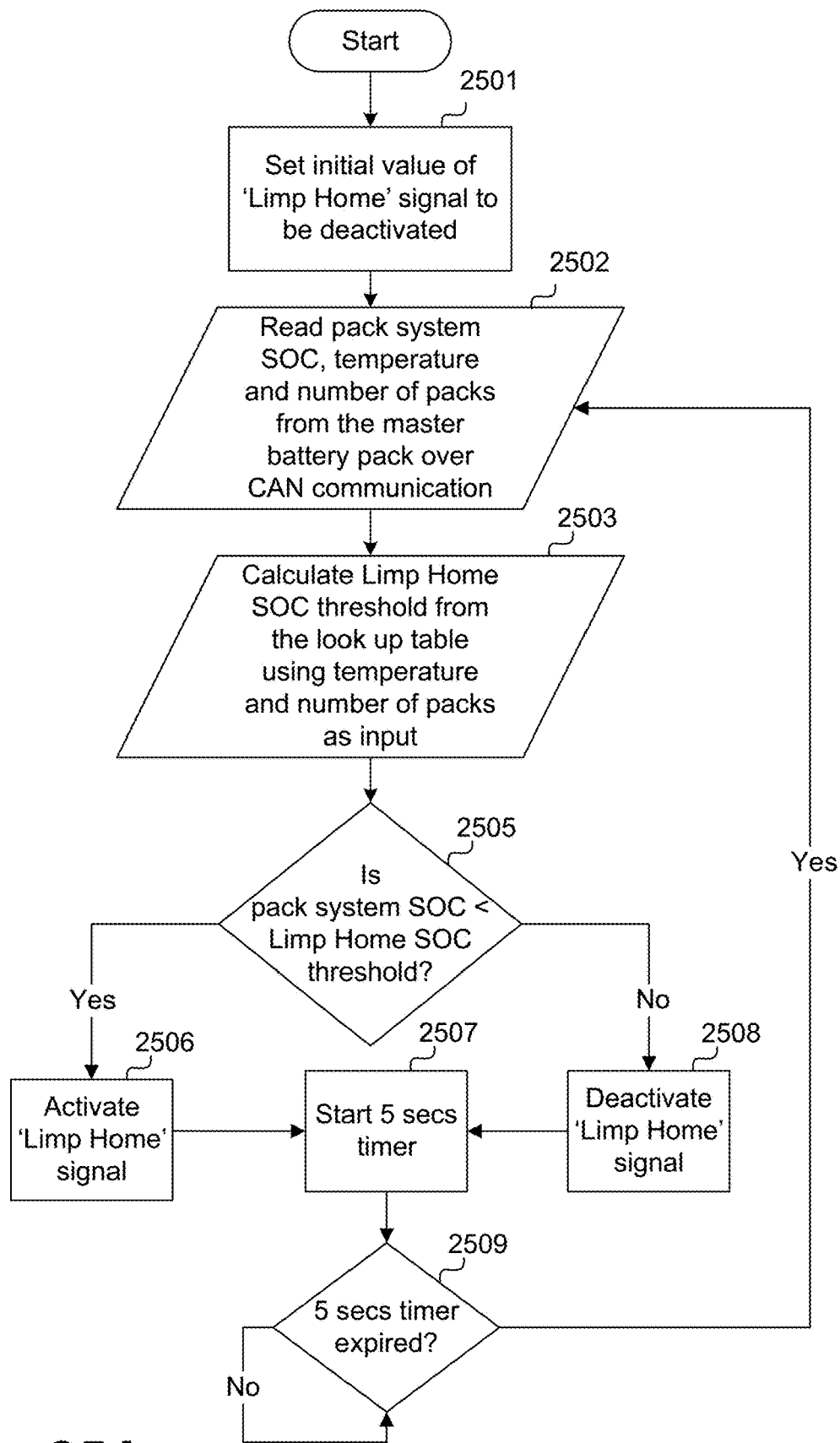
FIG. 25A, FIG. 25B, and FIG. 25C (collectively "FIG. 25") are flowcharts for a connector to output a limp home mode signal to an external device in accordance with one or more embodiments.
Figure 25B:
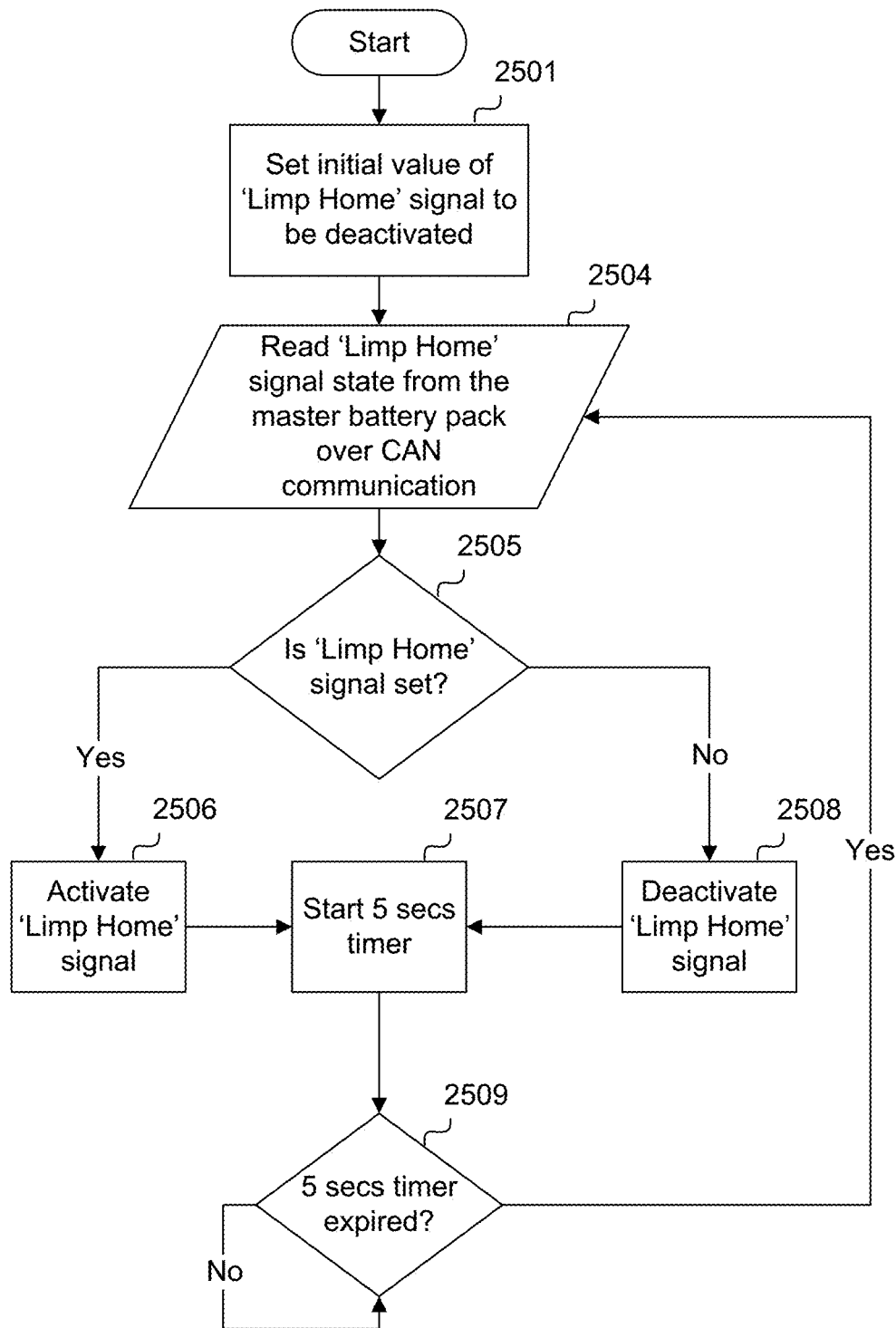
Figure 25C:
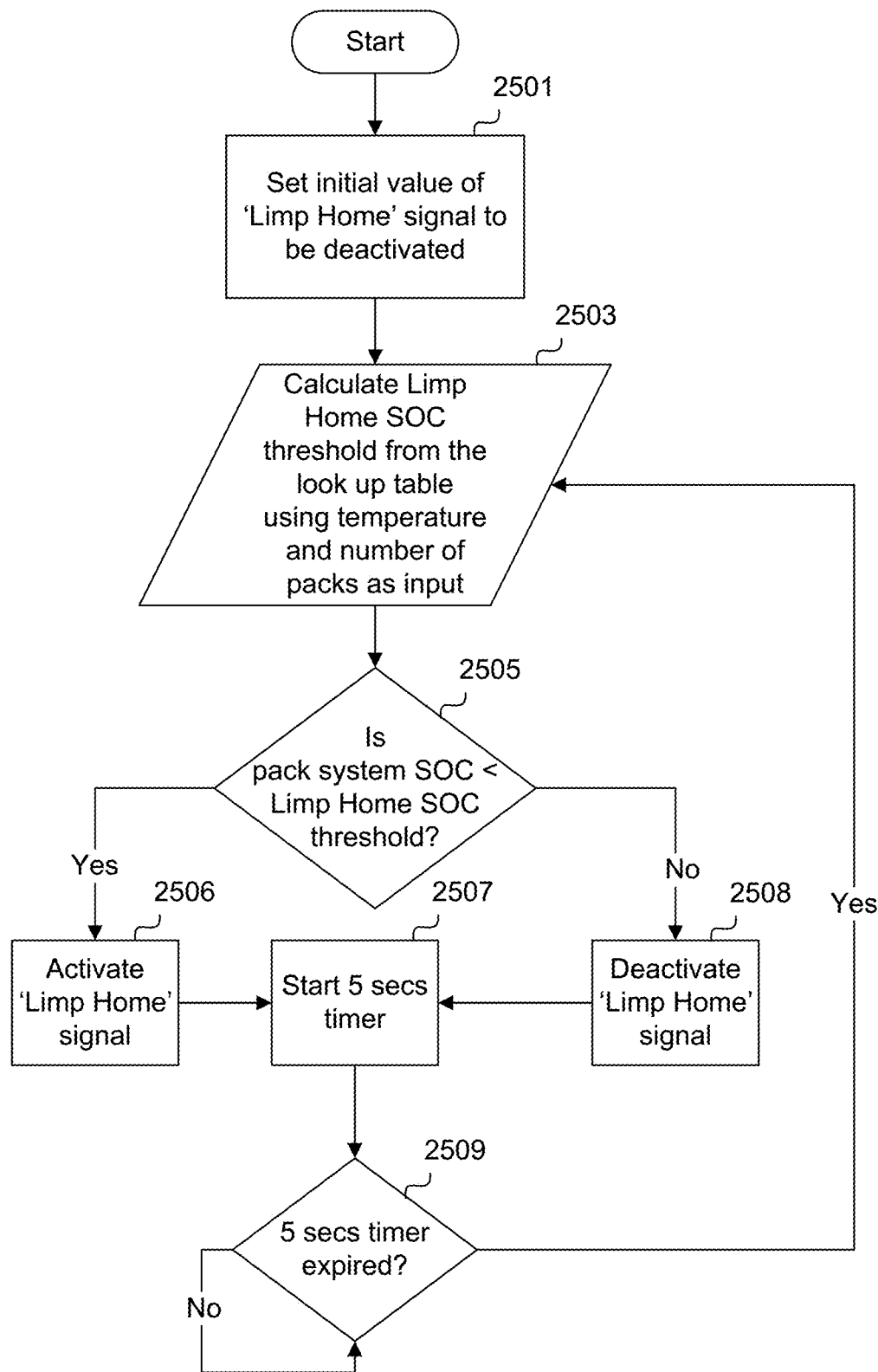
Figure 26A:
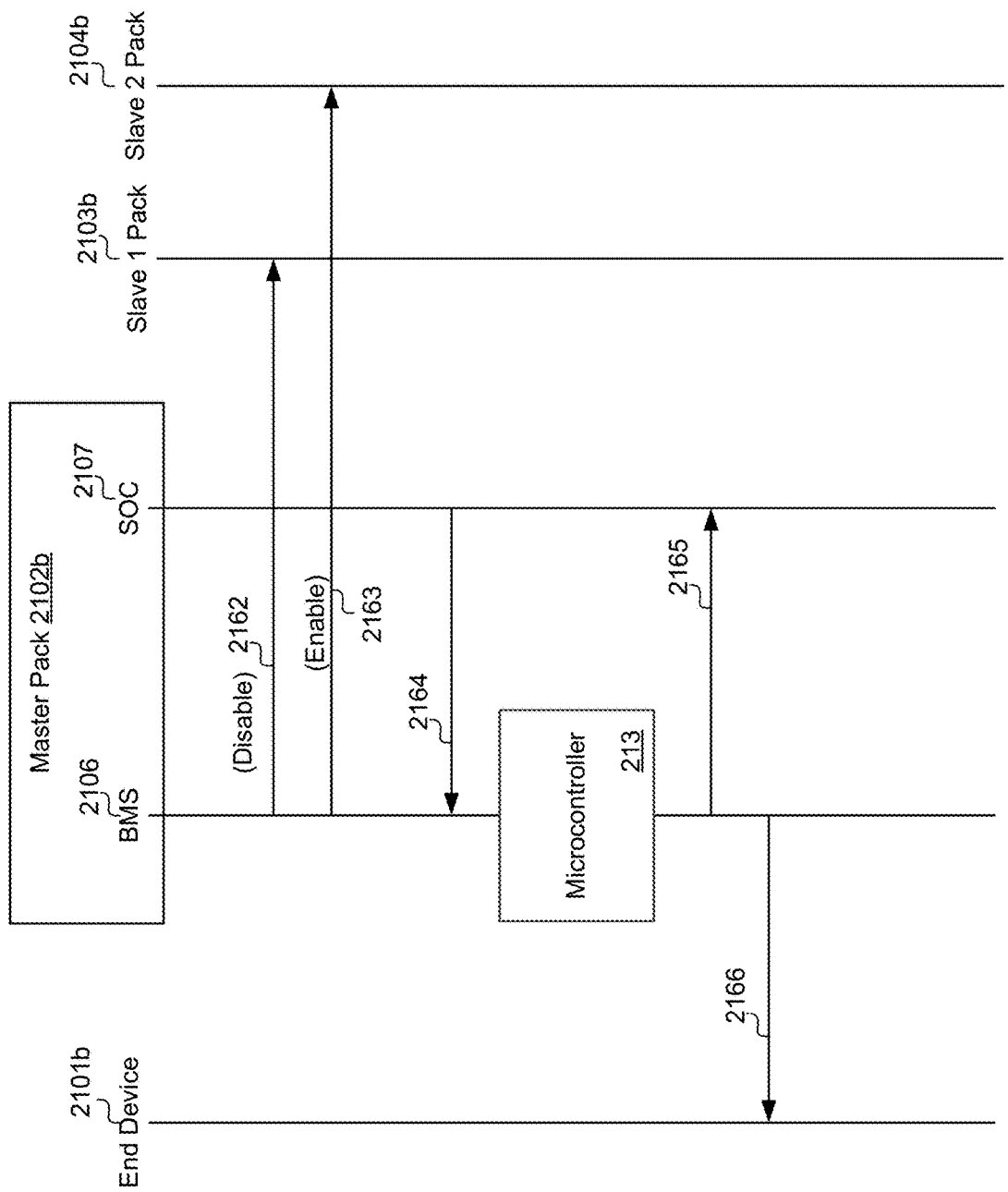
FIG. 26A shows a message flow scenario for a connector to output a limp home mode signal to an external device in accordance with an embodiment.

FIG. 25A, FIG. 25B, and FIG. 25C (collectively "FIG. 25") are flowcharts for a connector to output a limp home mode signal to an external device in accordance with one or more embodiments. FIG. 26A is similar to the message scenario in FIG. 23B, where master battery pack 2102*b* detects a catastrophic failure at battery pack 2103*b* after receiving failure notification message 2164. Because master battery pack 2102*b* determines that no spare battery pack is available, master battery pack 2102*b* disables battery pack 2103*b* via message 2165 and sends degradation message 2166 to end device 2101*b*, where end device 2101*b* is able to operate in a degradation mode. Referring to FIG. 23A and FIG. 23B, failure notification messages 2161 and 2164 may be autonomously sent from the battery pack incurring the catastrophic failure or may be sent in response to a request for battery status information from master battery pack 2102*a,b*. When sent autonomously, the battery pack may detect when a battery parameter (for example, SOH or SoC) drops to a predetermined threshold and then sends the failure notification message to master battery pack 2102*a,b*. When sent in response to a status request, master battery pack 2102*a,b* may send the status request repetitively (for example, periodically). The battery pack receives the status requests and, in response, provides current battery status information. When one or more of the returned battery parameters drops below a predetermined threshold, master battery pack 2102*a,b* detects a catastrophic failure at the battery pack. With some embodiments, master battery pack 2102*a,b* may receive periodic battery status information from the other battery packs. When master battery pack 2102*a,b* detects a sudden drop (for example, more than a predetermined difference with respect to the previous value) in one of the battery parameters (for example, cell voltage, SoC), master battery pack 2102*a,b* may determine that a catastrophic failure at the corresponding battery pack is predicted or imminent and take preemptive action and/or generate a warning notification. In such examples, the lookup table stored in the memory device 202 may include a change in SoC over time as the criterion that determines whether the microcontroller 213 triggers the connector 219 to output a limp home mode signal to an end device.

FIG. 25A is a flowchart involving a system where the logic to decide when to activate the signal resides in a gateway PCBA. As explained throughout herein, a battery system may support a "limp home mode" when a battery pack in a battery system experiences a catastrophic failure, for example, when its battery cells are characterized by a very low voltage output (e.g., a state of charge (SoC) reading below 10%, 5%, or other amount). An internal battery management system may diagnose the failure and may mitigate the failure in any of several ways, including but not limited to, enabling operation of the end device/equipment to "limp home" under at least partial power. For example, an initial value of a limp home signal to be deactivated may be set at block 2501. A pack system SoC, temperature, and/or number of battery packs may be read from the master battery pack over CAN communication at block 2502. A limp home mode state of charge (SoC) threshold may be calculated from the lookup table at block 2503, using temperature and/or number of battery packs as input. At blocks 2505-2509, a limp home mode signal is activated or deactivated based on the pack system SoC and a SoC threshold.

FIG. 25B is a flowchart involving a system that includes a power source with a plurality of battery packs, similar to the system illustrated in the flowchart of FIG. 22. After a master battery pack in the system detects a catastrophic failure of one or more of the battery cells of one of the battery packs powering the end device, then the master battery pack determines whether an extra battery pack is needed. For example, if a state of charge (SoC) level in a single battery pack of the system drops below an acceptable minimum threshold (or a maximum current is exceeded and/or a battery cell temperature is above an allowable range), then the battery system may determine whether the end device needs only a particular quantity of battery packs that is less than the quantity that are currently active and operating at or above the aforementioned acceptable minimum threshold. In one example, assuming options illustrated in FIG. 22 are unavailable, the master battery pack may proceed to disable the bad battery pack (e.g., disabling the discharging array) and generate an alert message over a communication bus (e.g., a CAN communication bus) to inform the end device that the battery pack is operating in a degraded mode (e.g., a limp home mode). In FIG. 25B, the computing logic resides in a battery pack system and a gateway PCBA reads/receives this signal from a master battery pack in the battery pack system and sets a hardware pin accordingly. Such an arrangement delegates the computing logic to various components in the system, thus better assisting with retrofitting aspects of the disclosure into legacy systems. In some examples illustrated herein, the computing logic may reside in a microcontroller 213 in the battery pack; while in other examples, the computing logic (as well as the switch 208 and connector 219) may reside in a gateway PCBA coupled to a smart battery pack via a CAN communication bus. Therefore, even if the end device is not communicatively coupled to the CAN communication bus, the gateway PCBA (with the aforementioned components, like switch 208 and connector 219) may activate a signal to cause a hardware pin corresponding to a limp home mode on the end device to be triggered. The triggering of the hardware pin causes the end device to react and respond to the generated alert. For example, an initial value of a limp home signal to be deactivated may be set at block 2501. A limp home signal state may be read from the master battery pack over CAN communication at block 2504. At blocks 2505-2509, a limp home mode signal is activated or deactivated based on whether the limp home signal is set.

FIG. 25C is a flowchart involving a system where the hardware signal resides in the battery pack system and no gateway PCBA is used. Instead, the outputted signal from the battery pack may directly drive the limp home mode input signal on the end device. In some illustrative circuitry including a relay, the system 2400 output may be the PACK+ voltage to drive the relay when a 5V (or other pre-set voltage) might not be sufficient. For example, an initial value of a limp home signal to be deactivated may be set at block 2501. A limp home mode state of charge (SoC) threshold may be calculated from the lookup table at block 2503, using temperature and/or number of battery packs as input. At blocks 2505-2509, a limp home mode signal is activated or deactivated based on the pack system SoC and a SoC threshold.

FIG. 26A is similar to FIG. 23A and FIG. 23B in that it shows a message flow scenario for a connector to output a limp home mode signal to an external device in accordance with an embodiment. In addition, FIG. 26A shows an illustrative communication inside a master pack 2102b in a multi-battery pack system, where the battery management system 2106 and a state of charge (SoC) measurement device 2107 interact to provide an input to a microcontroller 213 controlling a switch 208. In some examples, the BMS 2105 may read/receive the SoC value by sending a request for a value. In other examples, the read/receive may take the form of a push model where the SoC measurement device may be registered with the BMS 2105 and send values when a delta change in the measured value is above a certain threshold deviation. In some examples, instead of a push model, the two components may automatically communicate values on a periodical time interval (e.g., a polling model). In another example, a pull model may be used to provide values only when the BMS 2105 requests them.

Figure 26B:
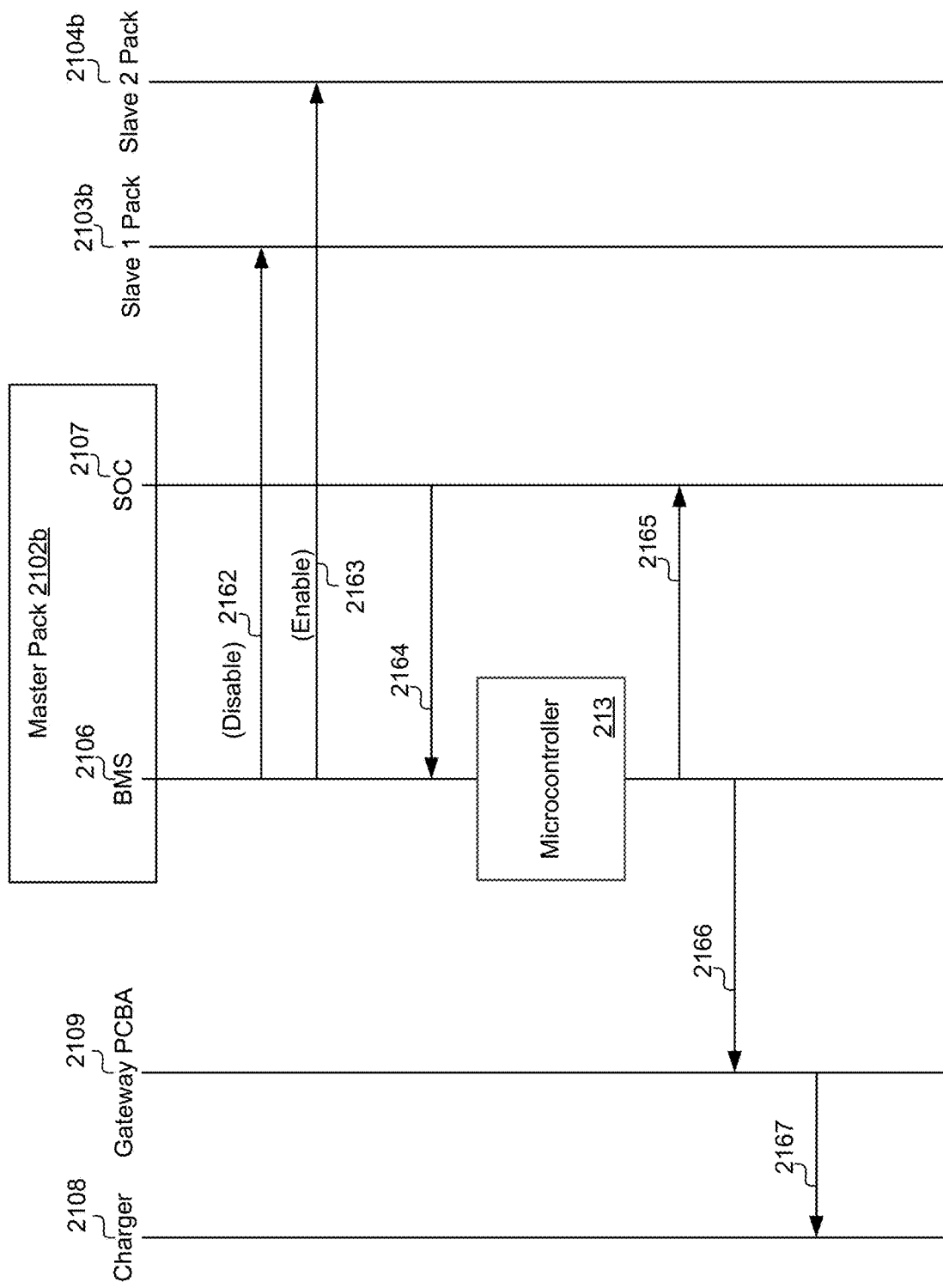
FIG. 26B shows a message flow scenario for a connector to output a limp home mode signal to a charger in accordance with an embodiment.
Figure 30:
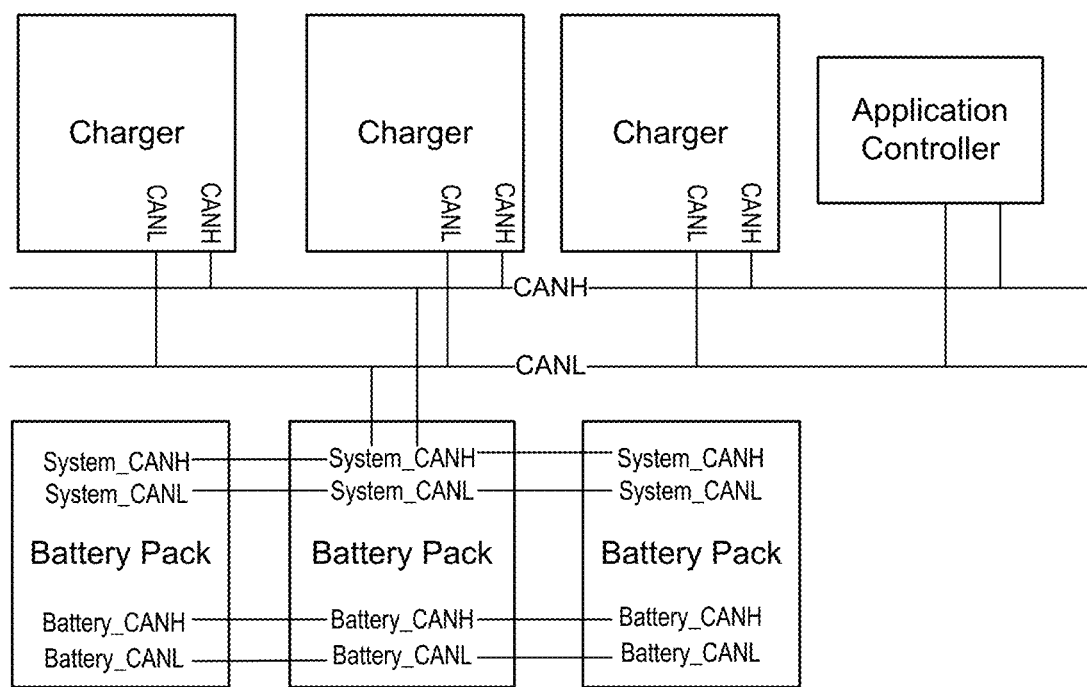
FIG. 30 shows an example of a stackable charging configuration when multiple chargers are connected in parallel to charge battery packs.

FIG. 26B to the message scenario in FIG. 26A, where master battery pack 2102b detects a catastrophic failure at battery pack 2103b after receiving failure notification message 2164. Because master battery pack 2102b determines that no spare battery pack is available, master battery pack 2102b disables battery pack 2103b via message 2165 and sends degradation message 2166 to external gateway PCBA 2109 interfaced with a legacy end device, where the end device is able to operate in a degradation mode. In some examples, external gateway PCBA 2109 is able to communicate with a charger 2108 via message 2167. In some embodiments, charger 2108 is a master charger in a stackable charging system, as depicted in FIG. 30.

Figure 27:
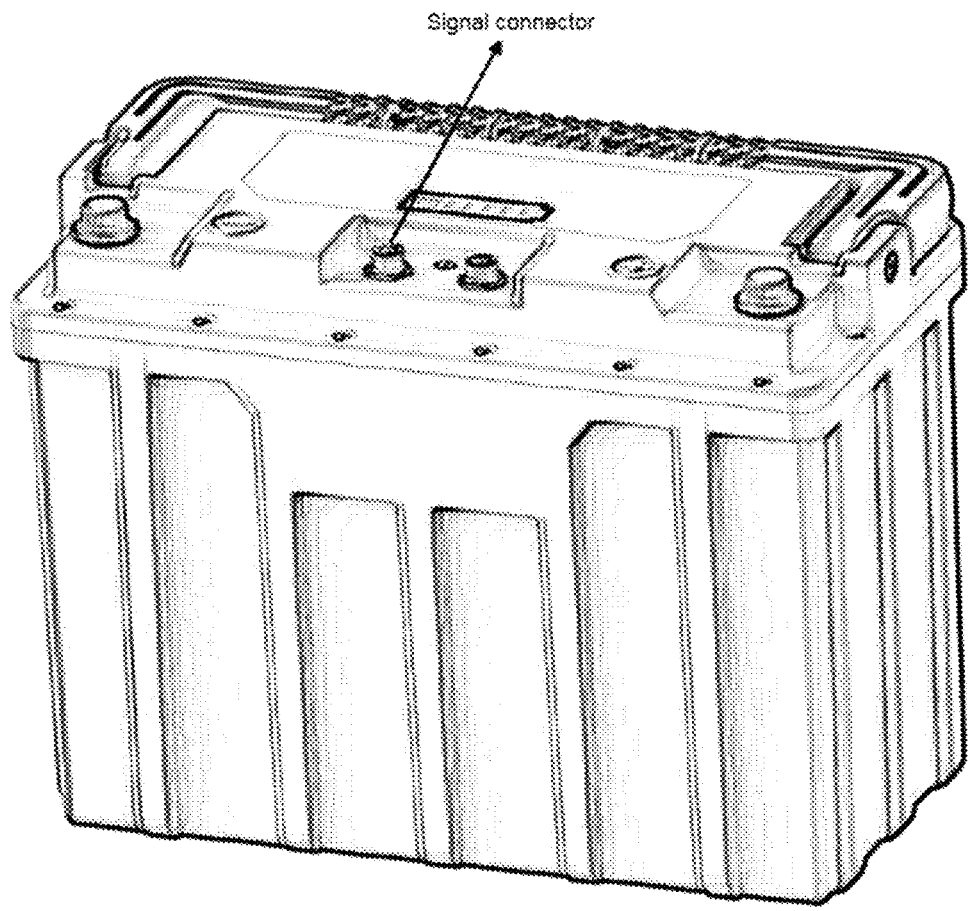
FIG. 27 shows an illustrative battery pack with signal connectors.

FIG. 27 shows an illustrative battery pack with signal connectors. The illustrative battery pack shows an example where both signals are integrated to the pack and are part of the signal connector. In such an example, the limp home mode signal outputted by the connector 219 would be read through the signal connector on the battery pack. In another example, an external gateway PCBA may be used to pull the limp home mode signal from the CAN communication bus in the battery pack and interface it with a legacy end device that does not have a CAN communication network bus.

Figure 28:
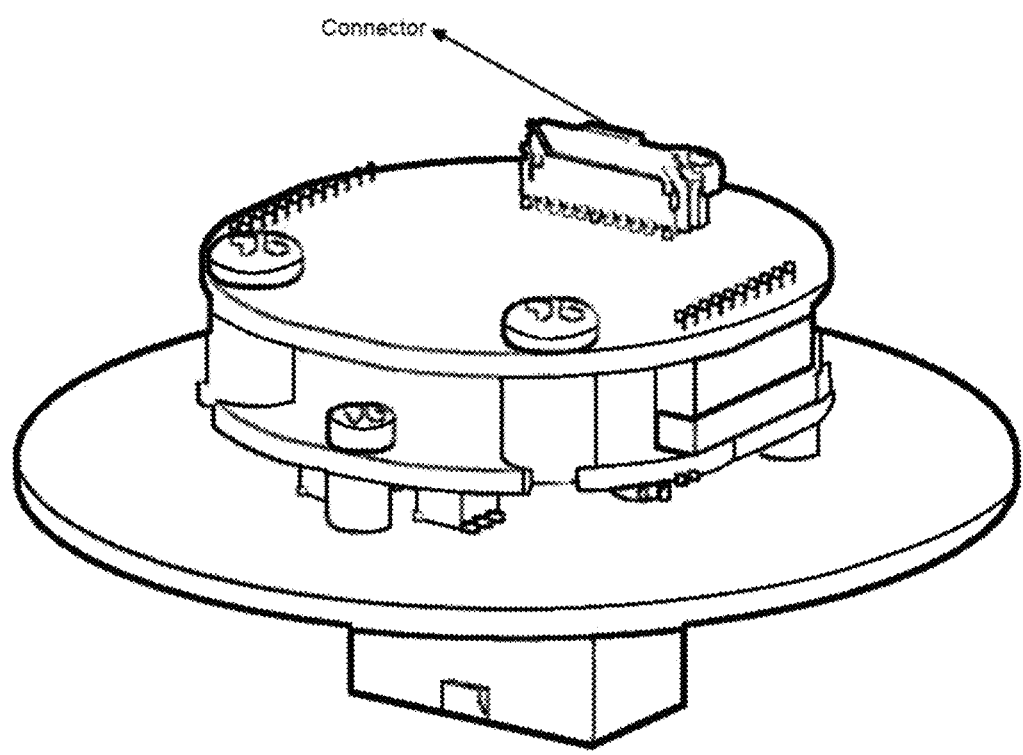
FIG. 28 shows an illustrative gateway PCBA showing a connector.

Continuing with the preceding example, FIG. 28 shows an illustrative external gateway PCBA with a connector that may be used in the preceding example to provide an interface to a legacy end device.

Figure 29A:
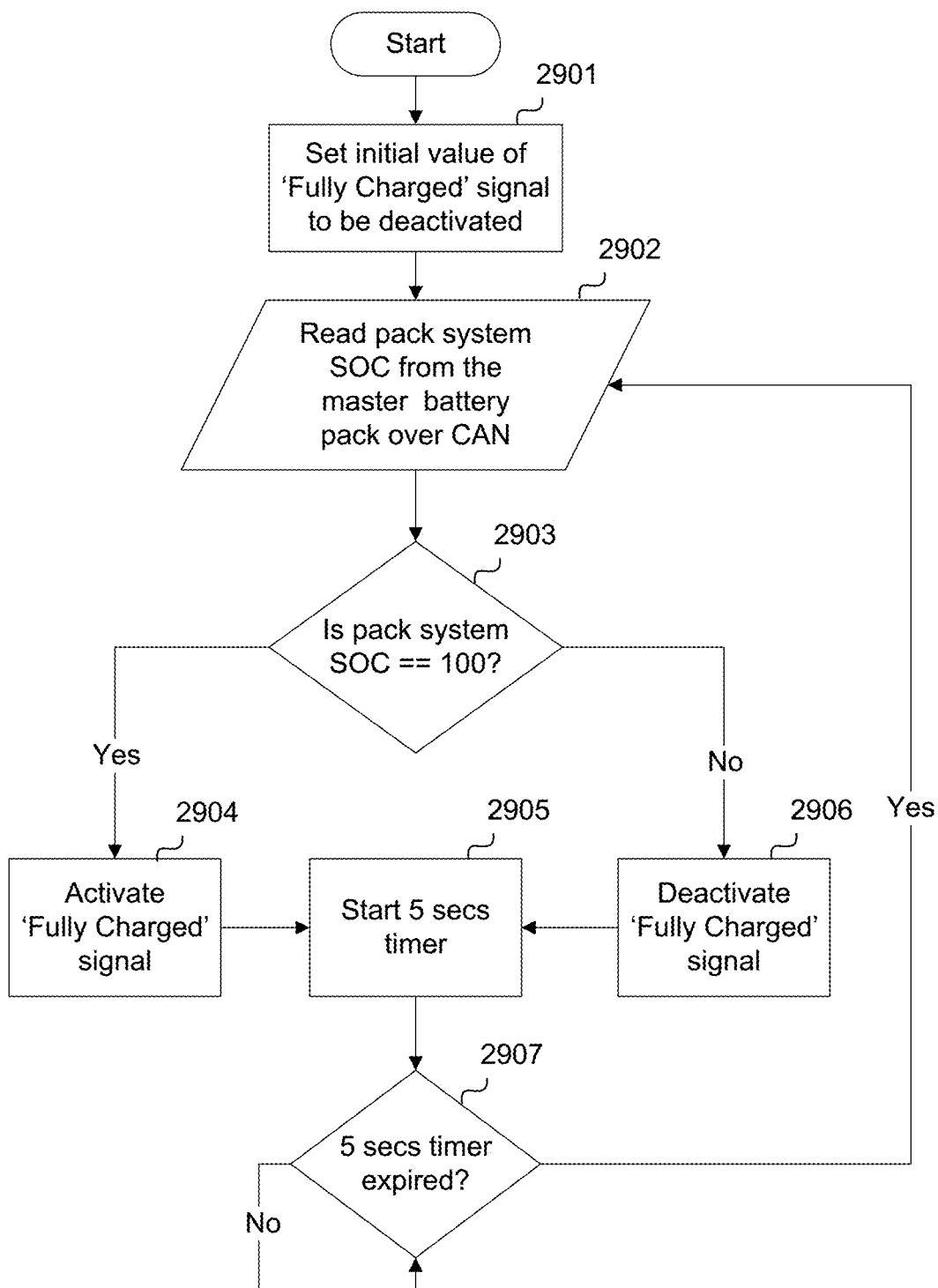
FIG. 29A and FIG. 29B (collectively "FIG. 29") are flowcharts for a connector to output a "fully charged" notification signal.
Figure 29B:
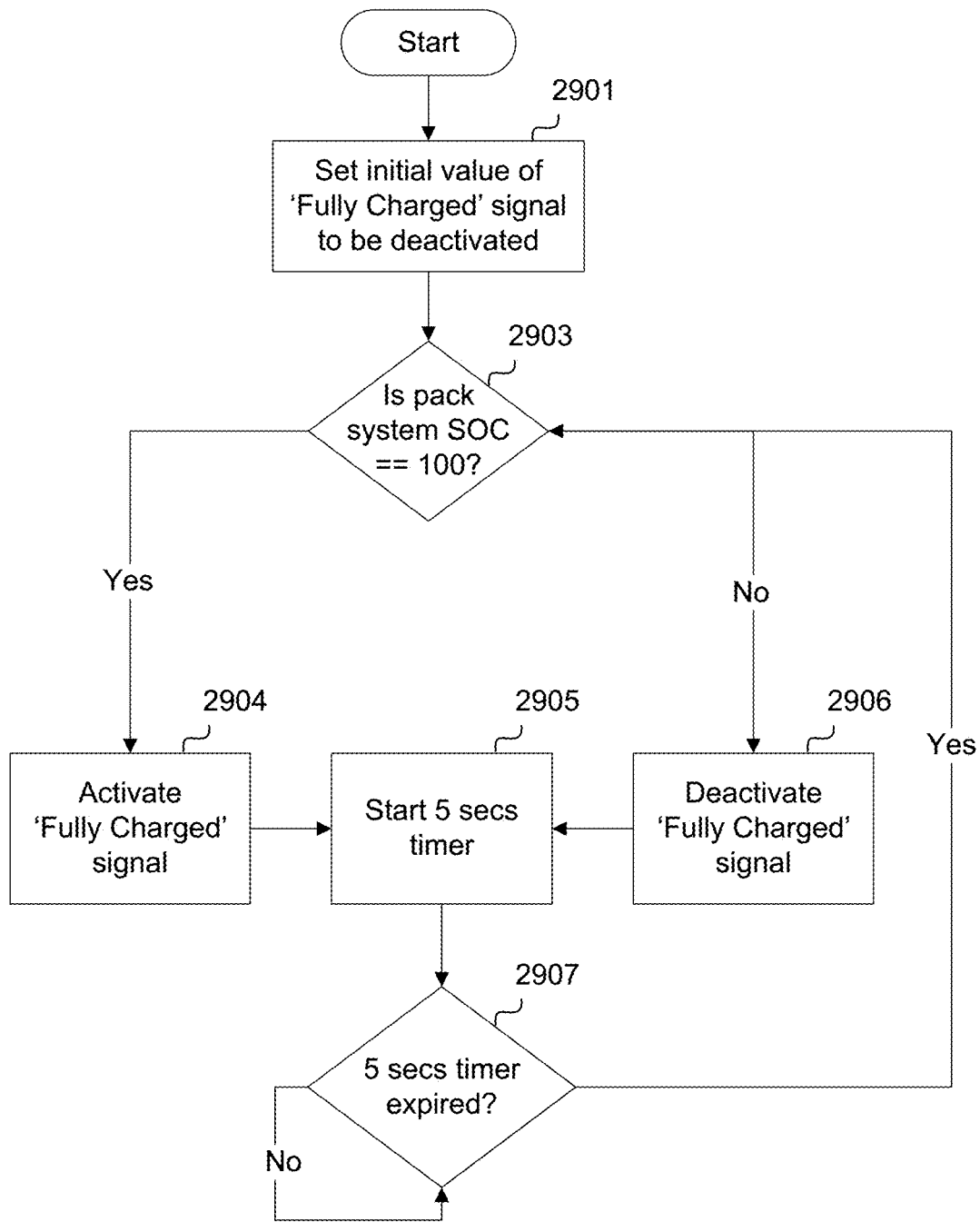

FIG. 29A and FIG. 29B (collectively "FIG. 29") are flowcharts for a connector to output a "fully charged" notification signal. While there exist third-party gauges that measure the pack voltage across a positive terminal and negative terminal of a battery (e.g., a lead acid battery) and then display an apparent SoC depending on the pack voltage, such a technique had several drawbacks, as explained below with FIG. 29B. In one example, a smart Lithium-ion battery pack system uses complex algorithms to measure a SoC inside the battery pack and provides the SoC value over electronic communication lines (e.g., a CAN communication bus), that can be read by an application device/end device or charger to determine if the pack is fully charged. However, some end devices/applications are not equipped to read messages over a CAN communication network bus—for example, traditional application devices using lead acid batteries typically do not have this capability.

Therefore, FIG. 29A shows a flowchart embodying a battery pack system where an outputted hardware signal notifying of a "fully charged" state resides in a gateway PCBA external to the battery pack and interfacing with an end device. Similar to the flowchart in FIG. 25A, the fully charged signal in FIG. 29A is outputted with the use of a microcontroller 213, switch 208, and connector 219. The microcontroller 213 may receive SoC readings from the battery management system of the master battery pack in a multi-pack system, and control the switch 208 accordingly. In a multi-pack parallel configuration, there are often imbalances between battery packs, and the voltage measured from the system positive and negative terminals is an average of the pack terminal voltages—this can lead to inaccuracy while using gauges to identify if the packs are fully charged. However, the system performing the steps of FIG. 29A overcomes these flaws because the microcontroller 213 reads the SoC from the master pack, which combines the SoCs from all packs. Meanwhile, in a multi-pack series configuration, the voltage measured from the system terminal is the sum of the pack terminal voltages. One of the packs may be at higher voltage than others, which gets fully charged and stops charging all the packs. For example, assume two packs are connected in series and the max charge voltage of the packs is 10V, thus the max charge voltage of the system would be 20V. Due to imbalances, assume pack 1 voltage is 9V and pack 2 voltage is 8V. While charging, pack 1 voltage gets to 10V first, while pack 2 voltage is at 9V. When this happens, pack 1 terminates charging, which then terminates charging of the whole system. The system voltage then is 19V. The user could be confused that the charging has stopped, but the gauge shows only 90% (lower than 100%), which is the value corresponding to 19V of system voltage. However, the system performing the steps of FIG. 29A overcomes these flaws because the microcontroller 213 reads the SoC from the master pack, which is the higher of the SoC reported by both packs. In this case, it will provide a value of 100% when pack 1 terminated charging. For example, an initial value of a fully charged signal to be deactivated may be set at block 2901. A pack system SoC may be read from the master battery pack over CAN communication at block 2902. At blocks 2903-2907, a fully charged signal is activated or deactivated based on whether the pack system SoC is at one hundred percent capacity.

FIG. 29B is an embodiment where the hardware signal resides in a battery pack system and no gateway PCBA is used. While there exist third-party gauges that measure the pack voltage at a battery terminal to determine a fully charged state, they are inaccurate because pack terminal voltage does not provide an accurate measurement of SoC for Li-ion packs, especially during charging or discharging. This is due, inter alia, to the impedance of the wires used to connect to the pack and the internal impedance of the power traces in battery management system (BMS) printed circuit boards (PCBs). During charge, the terminal voltage reads a value higher than the cell stack voltage and during discharge, it reads lower than the cell stack voltage. Thus, if a mere voltage gauge is used to find out if the pack is fully charged, the system will identify the pack charged fully much ahead of when it actually is fully charged. Thus, the end device may disconnect a charger even when the pack is not fully charged. This may lead to a lower discharge capacity from the pack. The system and process disclosed herein overcomes this technological drawback. The system 2400 disclosed herein relies on the SoC calculated by the BMS, which is calculated using complex algorithms. Moreover, the outputted fully charged notification signal provides a better, more accurate indication of the full state of charge of the battery pack system attached to a powered end device. For example, an initial value of a fully charged signal to be deactivated may be set at block 2901. At blocks 2903-2907, a fully charged signal is activated or deactivated based on whether the pack system SoC is at one hundred percent capacity.

A smart battery pack has a battery management system (BMS) that computes the pack state of charge (SoC). In some embodiments, a battery management system (BMS) is disclosed that enables a smart lithium-ion battery pack to notify one or more application devices, which lack electronic communication means, the need for the application devices to enter limp home mode when certain conditions are satisfied. The conditions include but are not limited to: state of charge (SoC) falling below a safe threshold, one of more battery packs in a multi-battery system becoming faulty, and/or any other condition that require the application device to operate at a low power mode. In some embodiments, the SoC is continuously computed using one or more complex algorithms. The battery pack may have added to it a new analog signal, "limp home," that is by default 0V and is pulled high to the pack voltage or regulated 5V voltage depending on end device/application needs when the conditions to enter the limp home mode is satisfied. The conditions may include: (1) SoC is below a safe threshold, where this threshold may be varied with respect to temperature since the remaining capacity reduces at cold temperatures. E.g., the threshold could be 10% SoC at 25 degrees Celsius, 15% SoC at 0 degrees Celsius, and 20% SoC at −15 degrees Celsius; (2) one or more battery packs in a multi-battery system goes faulty; and/or (3) any other conditions that make it necessary to make the application device operate with reduced performance so that the user can safely end the current task.

If the battery pack does not have a free/available/unused pin that can be allotted for a limp home signal, a gateway printed circuit board assembly (PCBA) that communicates with the battery pack over electronic communication protocols such as controller area network (CAN) may be interfaced to the battery pack. This gateway PCBA may provide the "limp home" signal over a connector that may be wired to an end device/application. The gateway PCBA may monitor the communication messages from the battery pack and drive the pin high when the conditions for limp home are satisfied. In some examples, the reference voltage for the 'Limp Home' signal is the PACK. Application devices that use traditional lead acid battery packs and/or the ones with no electronic communication capabilities are a primary focus of the features disclosed herein. In particular, any smart battery pack that internally calculates SoC is the primary focus of the features disclosed herein. With the addition of limp home signal, these devices can upgrade to Li-ion battery packs and monitor the limp home signal.

Many illustrative embodiments are listed below in accordance with one or more aspects disclosed herein. Although many of the embodiments listed below are described as depending from other embodiments, the dependencies are not so limited. For example, embodiment #5 (below) is expressly described as incorporating the features of embodiment #1 (below), however, the disclosure is not so limited. For example, embodiment #5 may depend any one or more of the preceding embodiments (i.e., embodiment #1, embodiment #2, embodiment #3, and/or embodiment #4). Moreover, that any one or more of embodiments #2-#12 may be incorporated into embodiment #1 is contemplated by this disclosure. Likewise, any of embodiments #1, 14, 17, 22 may be combined with one or more of the features recited in embodiments #2-13, 15-16, 18-21, and/or 23-26. Further likewise, any of embodiments #27, 39, 43 may be combined with one or more of the features recited in embodiments #28-38, 40-42, 44-46. Further likewise, any of embodiments #47, 59, 64 may be combined with one or more of the features recited in embodiments #48-58, 60-63, 65-69. Further likewise, any of embodiments #70, 87, 92 may be combined with one or more of the features recited in embodiments #71-86, 88-91, 93-94. Further likewise, any of embodiments #95, 105, 109 may be combined with one or more of the features recited in embodiments #96-104, 106-108, 110-114. In addition, that any one or more of the features in embodiments #1, 14, 17, 22, 27, 39, 43, 47, 59, 64, 70, 87, 92, 95, 105, and 109 may be combined is contemplated by this disclosure. Moreover, that any one or more of the features in embodiments #1-114 can be combined is contemplated by this disclosure.

Embodiment #1. A first battery pack configured for installation in a battery system for electrically powering an end device, wherein all installed battery packs installed in the battery system have substantially identical electrical and electronic components, the first battery pack comprising:

a communication interface circuit configured to interface to a communication channel;

a power bus interface circuit configured to interface with a power bus and to provide electrical power to the end device;

a controller comprising at least one processor; and a memory storing controller instructions that, when executed by the at least one processor, cause the controller to:

obtain a configuration list of installed battery packs in the battery system, wherein a first entry corresponds to the first battery pack;

when the first entry of the configuration list has a top priority position in the configuration list, configure the first battery pack to serve as a master battery pack of the battery system, wherein the top priority position is indicative that the first battery pack was installed before any other active battery packs in the battery system;

revise the configuration list when a second battery pack is installed or removed from the battery system; and repetitively broadcast the configuration list to all said installed battery packs over the communication channel via the communication interface circuit.

Embodiment #2. The first battery pack of Embodiment #1, wherein the controller instructions, when executed by the at least one processor, further cause the controller to:

when a third battery pack is added to the battery system, detect an insertion of the third battery pack; and create a third entry for the third battery pack in the configuration list, wherein the third entry is at a bottom position of the configuration list.

Embodiment #3. The first battery pack of Embodiment #2, wherein the controller instructions, when executed by the at least one processor, further cause the controller to:

when the second battery pack is removed from the battery system, detect removal of the second battery pack; and delete a second entry for the second battery pack in the configuration list.

Embodiment #4. The first battery pack of Embodiment #3, wherein the controller instructions, when executed by the at least one processor, further cause the controller to:

advance a list position of the third entry for the third battery pack in the configuration list.

Embodiment #5. The first battery pack of Embodiment #1, wherein the controller instructions, when executed by the at least one processor, further cause the controller to:

when the first entry for the first battery pack is not at the top priority position in the configuration list, configure the first battery pack to serve as a first slave battery pack.

Embodiment #6. The first battery pack of Embodiment #5, wherein the controller instructions, when executed by the at least one processor, further cause the controller to:

when another battery pack is removed from the battery system and the first entry moves to the top priority position of the configuration list, configure the first battery pack to serve as the master battery pack.

Embodiment #7. The first battery pack of Embodiment #1, wherein the communication channel comprises a controller area network (CAN) bus and wherein the controller instructions, when executed by the at least one processor, further cause the controller to:

utilize a SAE J1939 Address Claim Procedure to obtain an identification (ID) for the first battery pack, wherein the ID is included in the first entry.

Embodiment #8. The first battery pack of Embodiment #5, wherein the controller instructions, when executed by the at least one processor, further cause the controller to:

when the first battery pack serves as the first slave battery pack:

receive a first request from the master battery pack; and in response to the receiving the first request, respond to the first request from the master battery pack.

Embodiment #9. The first battery pack of Embodiment #1, wherein the controller instructions, when executed by the at least one processor, further cause the controller to:

when the first battery pack serves as the master battery pack:

send a second request to a second slave battery pack; and in response to the sending, receive a response message from the second slave battery pack.

Embodiment #10. The first battery pack of Embodiment #1, wherein the controller instructions, when executed by the at least one processor, further cause the controller to:

when the first battery pack is removed from the battery system and reinserted into the battery system, send a join request over the communication channel; and receive the configuration list with a fourth entry at a bottom position in the configuration list, wherein the fourth entry is associated with the first battery pack.

Embodiment #11. The first battery pack of Embodiment #1, the first battery pack comprising non-volatile memory and wherein the controller instructions, when executed by the at least one processor, further cause the controller to:

store battery pack information in the non-volatile memory; and when the first battery pack is removed from the battery system and reinserted tin to the battery system, retain the battery pack information.

Embodiment #12. The first battery pack of Embodiment #2, wherein the controller instructions, when executed by the at least one processor, further cause the controller to:

when the first battery pack serves as the master battery pack:

send a repetitive broadcast message to all said installed battery packs over the communication channel via the communication interface circuit; and when a repetitive broadcast message is not received from the third battery pack, remove the third entry from the configuration list.

Embodiment #13. The first battery pack of Embodiment #12, wherein the repetitive broadcast message is sent periodically and wherein the controller instructions, when executed by the at least one processor, further cause the controller to:

when a timer set to a predetermined time expires without receiving the repetitive broadcast message, remove the third entry from the configuration list.

Embodiment #14. A battery system configured for electrically powering an end device and comprising a plurality of battery packs, the battery system comprising:

a first battery pack including:

a first communication interface circuit configured to interface to a controller area network (CAN) bus;

a first controller comprising at least one processor; and a first memory storing controller instructions that, when executed by the at least one processor, cause the first controller to:

obtain a configuration list of installed battery packs in the battery system, wherein a first entry corresponds to the first battery pack;

when the first entry of the configuration list has a top priority position in the configuration list, configure first battery pack to serve as a master battery pack of the battery system, wherein the top priority position is indicative that the first battery pack was installed before any other active battery packs in the battery system;

when the first battery pack serves as the master battery pack, revise the configuration list when a third battery pack is installed or removed from the battery system; and repetitively broadcast the configuration list to all installed battery packs over the CAN bus via the first communication interface circuit; and a second battery pack, wherein the second battery pack has electrical and electronics components identical to the first battery pack.

Embodiment #15. The battery system of Embodiment #14, wherein the second battery pack comprises:

a second communication interface circuit configured to interface to the controller area network (CAN) bus;

a second controller comprising one or more processors; and a second memory storing controller instructions that, when executed by the one or more processors, cause the second controller to:

obtain the configuration list of the installed battery packs in the battery system, wherein a second entry corresponds to the second battery pack;

when the second entry of the configuration list has the top priority position in the configuration list, configure the second battery pack to serve as the master battery pack of the battery system, wherein the top priority position is indicative that the second battery pack was installed before said any other active battery packs in the battery system;

revise the configuration list when the third battery pack is installed or removed from the battery system; and repetitively broadcast the configuration list to all said installed battery packs over the CAN bus via the second communication interface circuit.

Embodiment #16. The battery system of Embodiment #15, wherein the first controller instructions, when executed by the one or more processors, further cause the first controller to:

when the second battery pack previously served as the master battery pack when the first entry is in a second position from the top priority position in the configuration list, configure the first battery pack to serve as the master battery pack.

Embodiment #17. A method of powering an end device by a battery system, the method comprising:

obtaining a configuration list of installed battery packs in the battery system, wherein a first entry corresponds to a first battery pack;

when the first entry of the configuration list has a top priority position in the configuration list, configuring the first battery pack to serve as a master battery pack of the battery system, wherein the top priority position is indicative that the first battery pack was installed before any other active battery packs in the battery system;

revising the configuration list when a second battery pack is installed or removed from the battery system; and repetitively broadcasting the configuration list to all installed battery packs over a communication channel via a communication interface circuit.

Embodiment #18. The method of Embodiment #17 further comprising:

when a third battery pack is added to the battery system, detecting an insertion of the third battery pack;

creating a third entry for the third battery pack in the configuration list, wherein the third entry is at a bottom position of the configuration list; and in response to the creating, broadcasting the configuration list to said all installed battery packs configured in the battery system via the communication channel.

Embodiment #19. The method of Embodiment #18 further comprising:

when the second battery pack is removed from the battery system, detecting removal of the second battery pack; and deleting a second entry for the second battery pack in the configuration list.

Embodiment #20. The method of Embodiment #17 further comprising:

when the first entry for the first battery pack is not at the top priority position in the configuration list, configure the first battery pack to serve as a slave battery pack.

Embodiment #21. The method of Embodiment #20 further comprising:

when another battery pack is removed from the battery system and the first entry moves to the top priority position of the configuration list, configuring the first battery pack to serve as the master battery pack.

Embodiment #22. A battery system configured for electrically powering an end device and comprising a plurality of battery packs, the battery system comprising:

a power bus coupled to the end device to provide electrical power to the end device;

a communication channel coupled to the plurality of battery packs;

a first battery pack including:

a first communication interface circuit configured to interface to the communication channel;

a first discharging array;

a first processor; and a first memory storing computer-executable instructions that, when executed by the first processor, cause the first battery pack to:

disable the first discharging array to prevent discharging onto the power bus from the first battery pack;

obtain a first open circuit voltage measurement of the first battery pack; and share the first open circuit voltage measurement with the plurality of battery packs via the communication channel;

maintain a first copy of a configuration list based on the first open circuit voltage measurement and shared open circuit voltage measurements from the plurality of battery packs; and enable the first discharging array to allow discharging onto the power bus; and a second battery pack including:

a second communication interface circuit configured to interface to the communication channel;

a second discharging array electrically connected to the power bus of the battery system;

a second processor; and a second memory storing computer-executable instructions that, when executed by the second processor, cause the second battery pack to:

disable the second discharging array to prevent discharging onto the power bus from the second battery pack;

obtain a second open circuit voltage measurement of the second battery pack; and share the second open circuit voltage measurement with the plurality of battery packs via the communication channel;

maintain a second copy of the configuration list based the second open circuit voltage measurement and the shared open circuit voltage measurements from the plurality of battery packs, wherein the configuration list is ordered based on decreasing open circuit voltage measurements and wherein a top member of the configuration list is designated as a master battery pack of the battery system; and enable the second discharging array to allow discharging onto the power bus.

Embodiment #23. The battery system of Embodiment #22 comprising:

a third battery pack, wherein the third battery pack is installed in the battery system when the first and second battery packs are discharging onto the power bus, the third battery pack including:

a third communication interface circuit configured to interface to the communication channel;

a third discharging array;

a third processor; and a third memory storing computer-executable instructions that, when executed by the third processor, cause the third battery pack to:

disable the third discharging array to prevent discharging onto the power bus from the third battery pack;

obtain a third open circuit voltage measurement of the third battery pack; and share the third open circuit voltage measurement with the plurality of battery packs via the communication channel.

Embodiment #24. The battery system of Embodiment #23, wherein the third memory storing computer-executable instructions that, when executed by the third processor, cause the third battery pack to:

update a third copy of the configuration list based the third open circuit voltage measurement and the shared open circuit voltage measurements from the plurality of battery packs.

Embodiment #25. The battery system of Embodiment #24, wherein the updating occurs after the first and second battery packs are disconnected from the battery system.

Embodiment #26. The battery system of Embodiment #24, wherein the updating occurs while the first and second battery packs are discharging onto the power bus.

Embodiment #27. A method of powering an end device by a battery system, the battery system comprising a plurality of previously installed battery packs, wherein the plurality of previously installed battery packs include a master battery pack, the method comprising:

inserting an additional battery pack into the battery system establishing a first connection to a power bus and a second connection to a communication bus;

interacting, by the additional battery pack, with the master battery pack; and in response to the interacting, preventing an in-rush current from the additional battery pack to one of the plurality of previously installed battery packs.

Embodiment #28. The method of Embodiment #27, wherein the preventing comprises:

receiving, by the additional battery pack from the master battery pack, a first disable message via the communication bus, wherein the first disable message instructs the additional battery pack to disable charging and discharging through the power bus.

Embodiment #29. The method of Embodiment #27, further comprising:

in response to the inserting, providing an insertion indication by the additional battery pack via the communication bus, wherein the insertion indication includes an identification (ID) of the additional battery pack.

Embodiment #30. The method of Embodiment #29, further comprising:

in response to the providing, receiving a configuration message, wherein the configuration message includes a configuration list indicative of a battery system configuration, wherein an entry in the configuration list for the additional battery pack is located at a bottom position of the configuration list, and wherein the additional battery pack serves as a slave battery pack in the battery system.

Embodiment #31. The method of Embodiment #30, further comprising:

obtaining, by the additional battery pack, first battery status information about battery cells located at the additional battery pack, wherein the first battery status information includes a first state of charge (SoC) value for the battery cells;

receiving, by the additional battery pack from the master battery pack over the communication bus, a first status request for the first battery status information; and in response to the receiving the first status request, sending the first SoC value to the master battery pack over the communication bus.

Embodiment #32. The method of Embodiment #31, further comprising:

receiving, from the additional battery pack, the first SoC value;

determining, by the master battery pack, whether to initiate charge balancing that includes the additional battery pack based on the first SoC value; and in response to the determining, sending, by the master battery pack to the additional battery pack an enable message to configure the additional battery pack with the power bus.

Embodiment #33. The method of Embodiment #32, further comprising:

receiving, by the additional battery pack from the master battery pack, the enable message via the communication bus; and configuring the additional battery pack to interact with the power bus in accordance with the enable message.

Embodiment #34. The method of Embodiment #32, wherein the determining whether to initiate charge balancing comprises:

when the first SoC value is a high SoC value relative to the plurality of previously installed battery packs, sending, by the master battery pack, the enable message instructing the additional battery pack to enable discharging of the battery cells onto the power bus; and when the first SoC value is a low SoC value relative to the plurality of previously installed battery packs, sending, by the master battery pack, the enable message instructing the additional battery pack to enable charging of the battery cells from the power bus.

Embodiment #35. The method of Embodiment #34, wherein the determining whether to initiate charge balancing further comprises:

when the first SoC value equals the low SoC value and a difference between the high SoC value and the low SoC value is greater than a predetermined amount, sending the enable message instructing the additional battery pack to enable the charging of the battery cells from the power bus through a converter located at the additional battery pack.

Embodiment #36. The method of Embodiment #34, further comprising:

after receiving the enable message by the additional battery pack from the master battery pack, obtaining a second SoC value of the battery cells;

receiving, by the additional battery pack from the master battery pack over the communication bus, a second status request for second battery status information; and in response to the receiving the second status request, sending the second SoC value to the master battery pack over the communication bus.

Embodiment #37. The method of Embodiment #36, further comprising:

receiving, from the additional battery pack, the second SoC value;

when the first SoC value equals the high SoC value and the second SoC value is below a first threshold, sending, by the master battery pack, a second disable message instructing the additional battery pack to terminate discharging of the battery cells onto the power bus; and when the first SoC value equals the low SoC value and the second SoC value is greater than a second threshold, sending, by the master battery pack, the second disable message instructing the additional battery pack to terminate charging of the battery cells from the power bus.

Embodiment #38. The method of Embodiment #27, wherein the communication bus comprises a controller area network (CAN) bus.

Embodiment #39. A first battery pack configured for installation in a battery system for electrically powering an end device, wherein all installed battery packs installed in the battery system have identical electrical and electronic components, the first battery pack comprising:

a communication interface circuit configured to interface to a communication channel;

a power bus interface circuit configured to interface with a power bus and to provide electrical power to the end device;

a controller comprising at least one processor; and a memory storing controller instructions that, when executed by the at least one processor, cause the controller to:

when the first battery pack is inserted into the battery system, generate an insertion indication via the communication channel, wherein the insertion indication includes an identification (ID) of the first battery pack.

in response to the generating the insertion indication, receive from a master battery pack of the battery system, a disable message over the communication channel via the communication interface circuit; and in response to the receiving the disable message, disable charging and discharging through the power bus.

Embodiment #40. The first battery pack of Embodiment #39, wherein the controller instructions, when executed by the at least one processor, further cause the controller to:

in response to the generating the insertion indication, receive a configuration message, wherein the configuration message includes a configuration list indicative of a battery system configuration, wherein an entry in the configuration list for the first battery pack is located at a bottom position of the configuration list, and wherein the first battery pack serves as a slave battery pack in the battery system.

Embodiment #41. The first battery pack of Embodiment #40, wherein the controller instructions, when executed by the at least one processor, further cause the controller to:

obtain battery status information about battery cells located at the first battery pack, wherein the battery status information includes a state of charge (SoC) value for the battery cells;

receive, from the master battery pack over the communication channel, a status request for the battery status information; and in response to the receiving the status request, send the SoC value to the master battery pack over the communication channel.

Embodiment #42. The first battery pack of Embodiment #41, wherein the controller instructions, when executed by the at least one processor, further cause the controller to:

in response to the sending the SoC value, receive, from the master battery pack, an enable message via the communication channel; and configure the power bus interface circuit to interact with the power bus in accordance with the enable message.

Embodiment #43. A battery system configured for electrically powering an end device and comprising a plurality of battery packs, the battery system comprising:

a first battery pack including:

a power bus interface circuit configured to interface with a power bus and to provide electrical power to the end device;

a first communication interface circuit configured to interface to a controller area network (CAN) bus;

a first controller comprising at least one processor; and a first memory storing controller instructions that, when executed by the at least one processor, cause the first controller to:

when the first battery pack is inserted into the battery system, provide an insertion indication via the CAN bus, wherein the insertion indication includes an identification (ID) of the first battery pack;

in response to the providing, receive from a master battery pack of the battery system a first disable message over the CAN bus via the first communication interface circuit; and in response to the receiving, disable charging and discharging through the power bus; and a second battery pack serving as the master battery pack of the battery system.

Embodiment #44. The battery system of Embodiment #43, wherein the first memory storing controller instructions that, when executed by the at least one processor, cause the first controller to:

obtain battery status information about battery cells located at the first battery pack, wherein the battery status information includes a state of charge (SoC) value for the battery cells;

receive, from the master battery pack over the CAN bus, a status request for the battery status information; and in response to the receiving the status request, send the SoC value to the master battery pack over the CAN bus.

Embodiment #45. The battery system of Embodiment #44, wherein the second battery pack includes:

a second communication interface circuit configured to interface to the CAN bus;

a second controller comprising one or more processors; and a second memory storing controller instructions that, when executed by the one or more processors, cause the second controller to:

receive, from the first battery pack, the SoC value;

determine, by the master battery pack, whether to initiate charge balancing that includes the first battery pack based on the SoC value; and in response to the determining whether to initiate charge balancing, send, by the master battery to the first battery pack an enable message to configure the first battery pack with the power bus.

Embodiment #46. The battery system of Embodiment #45, wherein the second memory storing controller instructions that, when executed by the one or more processors, further cause the second controller to:
when the SoC value is a high SoC value relative to a plurality of previously installed battery packs, send, by the master battery pack, the enable message instructing the first battery pack to enable discharging of the battery cells onto the power bus; and
when the SoC value is a low SoC value relative to the plurality of previously installed battery packs, send, by the master battery pack, the enable message instructing the first battery pack to enable charging of the battery cells from the power bus.

Embodiment #47. A first battery pack configured for installation in a battery system for electrically powering an end device, wherein all installed battery packs installed in the battery system have identical electrical and electronic components, the first battery pack comprising:
one or more battery cells;
a communication interface circuit configured to interface to a communication channel;
a power bus interface circuit configured to interface with a power bus and to provide electrical power to the end device;
a controller comprising at least one processor; and
a memory storing controller instructions that, when executed by the at least one processor, cause the controller to:
determining that the first battery pack is a master battery pack of the battery system;
when the first battery pack receives a first failure notification message from a second battery pack over the communication channel via the communication interface circuit and when an extra battery pack is needed, determine whether a first spare battery pack is available, wherein the first failure notification message is indicative of a first catastrophic failure at the second battery pack;
when the first spare battery pack is an only spare battery pack and when the extra battery pack is needed, send a first enable message to the first spare battery pack over the communication channel, wherein the first enable message instructs the first spare battery pack to discharge onto the power bus; and
when the first battery pack receives the first failure notification message from the second battery pack, send a first disable message to the second battery pack over the communication channel, wherein the first disable message instructs the second battery pack to terminate discharging onto the power bus.

Embodiment #48. The first battery pack of Embodiment #47, wherein the controller instructions, when executed by the at least one processor, further cause the controller to:
when the first battery pack is the master battery pack of the battery system:
when no spare battery packs are available, send a degradation alert message to the end device.

Embodiment #49. The first battery pack of Embodiment #48, wherein the controller instructions, when executed by the at least one processor, further cause the controller to:
when the first battery pack is the master battery pack of the battery system:
when degraded operation is not acceptable to the end device, initiate shutdown of the battery system.

Embodiment #50. The first battery pack of Embodiment #49, wherein the controller instructions, when executed by the at least one processor, further cause the controller to:
when the first battery pack is the master battery pack of the battery system:
instructing all battery packs of the battery system from discharging onto the power bus.

Embodiment #51. The first battery pack of Embodiment #47, wherein the controller instructions, when executed by the at least one processor, further cause the controller to:
when the first battery pack is the master battery pack of the battery system:
when a plurality of spare battery packs are available, select a highest SoC spare battery pack from the plurality of spare battery packs, wherein the highest SoC spare battery pack is characterized by a highest state of charge (SoC) value of all of the plurality of spare battery packs; and
send a second enable message to the highest SoC spare battery pack, wherein the second enable message instructs the highest SoC spare battery pack to discharge onto the power bus.

Embodiment #52. The first battery pack of Embodiment #47, wherein the communication channel comprises a controller area network (CAN) bus.

Embodiment #53. The first battery pack of Embodiment #47, wherein the controller instructions, when executed by the at least one processor, further cause the controller to:
when the first battery pack is the master battery pack of the battery system:
monitor the one or more battery cells;
based on the monitoring, determine whether a second catastrophic failure has occurred;
when the second catastrophic failure has occurred, determine whether the first spare battery pack is available;
when the first battery pack is available, send the first enable message to the first spare battery pack, wherein the first enable message instructs the first spare battery pack to discharge onto the power bus; and
disable itself from discharging onto the power bus.

Embodiment #54. The first battery pack of Embodiment #47, wherein the controller instructions, when executed by the at least one processor, further cause the controller to:
when the first battery pack is a slave battery pack of the battery system:
monitor the one or more battery cells;
based on the monitoring, determine whether a third catastrophic failure has occurred; and
when the third catastrophic failure has occurred, send a second failure notification message to the master battery pack of the battery system.

Embodiment #55. The first battery pack of Embodiment #54, wherein the controller instructions, when executed by the at least one processor, further cause the controller to:
in response to the sending, receive a second disable message from the master battery pack; and
in response to the receiving, terminate discharging onto the power bus.

Embodiment #56. The first battery pack of Embodiment #47, wherein the controller instructions, when executed by the at least one processor, further cause the controller to:
when the first battery pack detects an internal catastrophic failure, internally terminate discharging onto the power bus;
when at least one spare battery pack is available, enable one of the at least one spare battery packs;
when no spare battery packs is available, send a degradation alert message to the end device; and
continue to operate as the master battery pack of the battery system.

Embodiment #57. The first battery pack of Embodiment #47, wherein the controller instructions, when executed by the at least one processor, further cause the controller to:
when the first battery pack detects an internal catastrophic failure, internally terminate discharging onto the power bus; and
reassign one of the slave battery packs as a new master battery pack.

Embodiment #58. The first battery pack of Embodiment #47, wherein the controller instructions, when executed by the at least one processor, further cause the controller to:
when the first battery pack fails to receive any messages from the second battery pack over the communications channel, attempt to disable the second battery pack from discharging onto the power bus; and
adjust a power level over the power bus to the end device.

Embodiment #59. A method of powering an end device by a battery system, the method comprising:
when a master battery pack receives a failure notification message from a slave battery pack over a communication channel and when an extra battery pack is needed, determining whether a first spare battery pack is available, wherein the failure notification message is indicative of a catastrophic failure at the slave battery pack;
when the first spare battery pack is an only spare battery pack and when the extra battery pack is needed, sending, by the master battery pack, an enable message to the first spare battery pack, wherein the enable message instructs the first spare battery pack to discharge onto a power bus; and
when the master battery pack receives the failure notification message from the slave battery pack, sending, by the master battery pack, a disable message to the slave battery pack, wherein the disable message instructs the slave battery pack to terminate discharging onto the power bus.

Embodiment #60. The method of Embodiment #59, comprising:
when degraded operation is not acceptable to the end device, initiating shutdown of the battery system.

Embodiment #61. The method of Embodiment #59, comprising:
when a plurality of spare battery packs are available, selecting a highest SoC spare battery pack from the plurality of spare battery packs, wherein the highest SoC spare battery pack is characterized by a highest state of charge (SoC) value of all of the plurality of spare battery packs; and
sending the enable message to the highest SoC spare battery pack, wherein the enable message instructs the highest SoC spare battery pack to discharge onto the power bus.

Embodiment #62. The method of Embodiment #59, comprising:
monitoring, by the slave battery pack, one or more battery cells;
based on the monitoring, determining whether the catastrophic failure has occurred; and
when the catastrophic failure has occurred, sending the failure notification message to the master battery pack of the battery system.

Embodiment #63. The method of Embodiment #62, comprising:
in response to the sending, receiving, by the slave battery pack, the disable message from the master battery pack; and
in response to the receiving the disable message, terminating discharging onto the power bus.

Embodiment #64. A battery system configured for electrically powering an end device and comprising a plurality of battery packs, the battery system comprising:
a slave battery pack; and
a master battery pack including:
a first communication interface circuit configured to interface to a controller area network (CAN) bus;
a first controller comprising at least one processor; and
a first memory storing controller instructions that, when executed by the at least one processor, cause the first controller to:
when the master battery pack receives a failure notification message from the slave battery pack over the CAN bus via the first communication interface circuit and when an extra battery pack is needed, determine whether a first spare battery pack is available, wherein the failure notification message is indicative of a catastrophic failure at the slave battery pack;
when the first spare battery pack is an only spare battery pack and when the extra battery pack is needed, send an enable message to the first spare battery pack, wherein the enable message instructs the first spare battery pack to discharge onto a power bus; and
when the master battery pack receives the failure notification message from the slave battery pack, send a disable message to the slave battery pack, wherein the disable message instructs the slave battery pack to terminate discharging onto the power bus.

Embodiment #65. The battery system of Embodiment #64, wherein the first memory storing controller instructions that, when executed by the at least one processor, cause the first controller to:
when degraded operation is not acceptable to the end device, initiate shutdown of the battery system.

Embodiment #66. The battery system of Embodiment #65, wherein the first memory storing controller instructions that, when executed by the at least one processor, cause the first controller to:
instruct all battery packs of the battery system from discharging onto the power bus.

Embodiment #67. The battery system of Embodiment #64, wherein the first memory storing controller instructions that, when executed by the at least one processor, cause the first controller to:
when a plurality of spare battery packs is available, select a highest SoC spare battery pack from the plurality of spare battery packs, wherein the highest SoC spare battery pack is characterized by a highest state of charge (SoC) value of all of the plurality of spare battery packs; and
send the enable message to the highest SoC spare battery pack, wherein the enable message instructs the highest SoC spare battery pack to discharge onto the power bus.

Embodiment #68. The battery system of Embodiment #64, wherein the slave battery pack includes:
a second communication interface circuit configured to interface to a controller area network (CAN) bus;
a second controller comprising one or more processors;
one or more battery cells; and
a second memory storing controller instructions that, when executed by the one or more processors, cause the first controller to:

monitor the one or more battery cells;
based on the monitoring, determine whether the catastrophic failure has occurred; and
when the catastrophic failure has occurred, send the failure notification message to the master battery pack of the battery system.

Embodiment #69. The battery system of Embodiment #68, wherein the second memory storing controller instructions that, when executed by the one or more processors, cause the second controller to
in response to the sending the failure notification message, receive the disable message from the master battery pack; and
in response to the receiving the disable message, terminate discharging onto the power bus.

Embodiment #70. A method of powering an end device by a battery system, the battery system comprising a plurality of battery packs, the method comprising:
gathering, by a master battery pack of the battery system, battery status information from the plurality of battery packs, wherein the plurality of battery pack comprises the master battery packs and all slave battery packs and wherein the battery status information includes a state of charge (SoC) data;
determining, by the master battery pack and based on the battery status information, whether a first subset of the plurality of battery packs needs to be balanced in charge;
selecting, by the master battery pack, a first type of balancing from a plurality of balancing types appropriate for the first subset of the plurality of battery packs; and
applying, by the master battery pack, the selected first type of balancing via a power bus until desired SoC values are obtained for the first subset of the plurality of battery packs.

Embodiment #71. The method of Embodiment #70, wherein the plurality of balancing types comprise a converter balancing technique, a direct balancing technique, and a staggered balancing technique.

Embodiment #72. The method of Embodiment #71, comprising:
identifying, by the master battery pack, a first battery pack having a high SoC value from the gathered battery status information; and
comparing, by the master battery pack, the high SoC value with SoC values of all remaining battery packs.

Embodiment #73. The method of Embodiment #72, comprising:
in response to the comparing, when a first SoC difference between the first battery pack and a second battery pack is greater than a first predetermined amount, initiating, by the master battery pack, the converter balancing technique for the first and second battery packs.

Embodiment #74. The method of Embodiment #73, comprising:
sending, by the master battery pack, to the first battery pack a first enable message over a communication channel, wherein the first enable message instructs the first battery pack to discharge over the power bus; and
sending, by the master battery pack, to the second battery pack a second enable message over the communication channel, wherein the second enable message instructs the second battery pack to enable its converter and to charge from the power bus.

Embodiment #75. The method of Embodiment #73, comprising:
in response to the comparing, when a second SoC difference between the first battery pack and a third battery pack is greater than the first predetermined amount, initiating, by the master battery pack, the converter balancing technique for the first, second, and third battery packs.

Embodiment #76. The method of Embodiment #75, wherein one of the first, second, and third battery packs serves as the master battery pack of the battery system.

Embodiment #77. The method of Embodiment #72, comprising:
in response to the comparing, when a third SoC difference between the first battery pack and a fourth battery pack is less than a second predetermined amount, initiating, by the master battery pack, the direct balancing technique for the first battery pack and the fourth battery pack.

Embodiment #78. The method of Embodiment #77, comprising:
sending, by the master battery pack, to the first battery pack a third enable message over a communication channel, wherein the third enable message instructs the first battery pack to discharge over the power bus; and
sending, by the master battery pack, to the fourth battery pack a fourth enable message over the communication channel, wherein the fourth enable message instructs the fourth battery pack to charge from the power bus.

Embodiment #79. The method of Embodiment #77, wherein one of the first and fourth battery packs serves as the master battery pack.

Embodiment #80. The method of Embodiment #72, comprising:
in response to the comparing, when a fourth SoC difference between the first battery pack and a fifth battery pack is less than a third predetermined amount, a fifth SoC difference between the first battery pack and a sixth battery pack is greater than a fourth predetermined amount, and a sixth SoC difference between the first battery pack and a seventh battery pack is greater than the fourth predetermined amount, initiating the staggered balancing technique to the first battery pack, the fifth battery pack, and the sixth battery pack.

Embodiment #81. The method of Embodiment #80, comprising:
sending, by the master battery pack, to the first battery pack a fifth enable message over a communication channel, wherein the fifth enable message instructs the first battery pack to discharge over the power bus;
sending, by the master battery pack, to the fifth battery pack a sixth enable message over the communication channel, wherein the sixth enable message instructs the fifth battery pack to charge from the power bus, wherein the direct balancing technique is applied for the first battery pack and the fifth battery pack; and
sending, by the master battery pack, to the sixth battery pack a seventh enable message over the communication channel, wherein the seventh enable message instructs the sixth battery pack to enable its converter and to charge from the power bus, wherein the converter balancing technique is applied for the first battery pack and the sixth battery pack.

Embodiment #82. The method of Embodiment #81, comprising:
obtaining current SoC values for the fifth and sixth battery packs; and
in response to the obtaining, when an eighth difference between a first current SoC value of the fifth battery pack and a second current SoC value of the sixth battery pack is greater than a fifth predetermined value, switching the direct balancing technique to the first battery pack and the seventh battery pack from the first battery pack and the sixth battery pack.

Embodiment #83. The method of Embodiment #82, comprising:
sending, by the master battery pack, to the fifth battery pack an eighth enable message over the communication channel, wherein the eighth enable message instructs the fifth battery pack to enable its converter and charge from the power bus, wherein the converter balancing technique is applied for the first battery pack and the fifth battery pack; and
sending, by the master battery pack, to the sixth battery pack a ninth enable message over the communication channel, wherein the ninth enable message instructs the sixth battery pack to disable its converter and to charge from the power bus, wherein the direct balancing technique is applied for the first battery pack and the sixth battery pack.

Embodiment #84. The method of Embodiment #75, wherein one of the first, fifth, and sixth battery packs serves as the master battery pack of the battery system.

Embodiment #85. The method Embodiment #70, further comprising:
obtaining, by the master battery pack, current SoC values from the plurality of battery packs;
determining, by the master battery pack and based the current SoC values, whether a second subset of the plurality of battery packs needs to be balanced in charge;
selecting, by the master battery pack, a second type of balancing from the plurality of balancing types appropriate for the second subset of the plurality of battery packs, wherein the first type and second type of balancing are different; and
applying, by the master battery pack, the selected second type of balancing for the second subset of the plurality of battery packs.

Embodiment #86. The method Embodiment #70, wherein the applying comprises:
obtaining a safety interlock indicator and a wake indicator; and
only when the safety interlock indicator is indicative of being on and the wake indicator is indicative of being off, enabling the applying.

Embodiment #87. A first battery pack configured for installation in a battery system for electrically powering an end device, wherein all installed battery packs installed in the battery system have identical electrical and electronic components, the first battery pack comprising:
a communication interface circuit configured to interface to a communication channel;
a power bus interface circuit configured to interface with a power bus and to provide electrical power to the end device;
a controller comprising at least one processor; and
a memory storing controller instructions that, when executed by the at least one processor, cause the controller to:
when the first battery pack serves as a master battery pack of the battery system:
gather battery status information from a plurality of battery packs, wherein the plurality of battery pack comprises the master battery packs and all slave battery packs and wherein the battery status information includes a state of charge (SoC) data;
determine, based the battery status information, whether a first subset of the plurality of battery packs needs to be balanced in charge;
select a first type of balancing from a plurality of balancing types appropriate for the first subset of the plurality of battery packs; and
apply the selected first type of balancing until desired SoC values are obtained for the first subset of the plurality of battery packs.

Embodiment #88. The first battery pack of Embodiment #87, wherein the memory storing controller instructions that, when executed by the at least one processor, cause the controller to:
identify a first battery pack having a high SoC value from the gathered battery status information; and
compare the high SoC value with SoC values of all remaining battery packs.

Embodiment #89. The first battery pack of Embodiment #88, wherein the memory storing controller instructions that, when executed by the at least one processor, cause the controller to:
in response to the comparing, when a first SoC difference between the first battery pack and a second battery pack is greater than a first predetermined amount, initiate, by the master battery pack, a converter balancing technique for the first and second battery packs.

Embodiment #90. The first battery pack of Embodiment #88, wherein the memory storing controller instructions that, when executed by the at least one processor, cause the controller to:
in response to the comparing, when a third SoC difference between the first battery pack and a fourth battery pack is less than a second predetermined amount, initiate, by the master battery pack, a direct balancing technique for the first battery pack and the fourth battery pack.

Embodiment #91. The first battery pack of Embodiment #88, wherein the memory storing controller instructions that, when executed by the at least one processor, cause the controller to:
in response to the comparing, when a fourth SoC difference between the first battery pack and a fifth battery pack is less than a third predetermined amount, a fifth SoC difference between the first battery pack and a sixth battery pack is greater than a fourth predetermined amount, and a sixth SoC difference between the first battery pack and a seventh battery pack is greater than the fourth predetermined amount, initiate a staggered balancing technique to the first battery pack, the fifth battery pack, and the sixth battery pack.

Embodiment #92. A battery system configured for electrically powering an end device and comprising a plurality of battery packs, the battery system comprising:
a plurality of slave battery packs; and
a master battery pack including:
a first communication interface circuit configured to interface to a controller area network (CAN) bus;
a controller comprising at least one processor; and
a memory storing controller instructions that, when executed by the at least one processor, cause the controller to:
gather battery status information from all battery packs of the battery system, wherein said all battery packs comprises the master battery packs and the plurality of slave battery packs and wherein the battery status information includes a state of charge (SoC) data;
determine, based on the battery status information, whether a first subset of said all battery packs needs to be balanced in charge;
select a first type of balancing from a plurality of balancing types appropriate for the first subset of said all battery packs; and apply the selected first type of balancing until desired SoC values are obtained for the first subset of said all battery packs.

Embodiment #93. The battery system of Embodiment #92, wherein the memory storing controller instructions that, when executed by the at least one processor, cause the controller to:
  identify a first battery pack having a high SoC value from the gathered battery status information, wherein the plurality of; and
  compare the high SoC value with SoC values of all remaining battery packs.

Embodiment #94. The battery system of Embodiment #93, wherein the memory storing controller instructions that, when executed by the at least one processor, cause the controller to:
  in response to the comparing:
    when a first SoC difference between the first battery pack and a second battery pack is greater than a first predetermined amount, initiate a converter balancing technique for the first and second battery packs;
    when the first SoC difference between the first battery pack and the second battery pack is less than a second predetermined amount, initiate a direct balancing technique for the first battery pack and the second battery pack; and
    when the first SoC difference between the first battery pack and the second battery pack is less than the second predetermined amount, a second SoC difference between the first battery pack and a third battery pack is greater than the first predetermined amount, and a third SoC difference between the first battery pack and a fourth battery pack is greater than the first predetermined amount, initiate a staggered balancing technique to the first, second, third, and fourth battery packs.

Embodiment #95. A method comprising:
  receiving, by a computing device having one or more processors, a first reading of a state of charge (SoC) of each of a plurality of battery packs, wherein the plurality of battery packs comprises at least a first group of one or more battery packs and a second group of one or more battery packs;
  identifying, by the computing device, based on the received first reading of the SoC of each of the plurality of battery packs, and based on an identification of a lowest level for a first reading of an SoC and a second lowest level for a first reading of an SoC,
    the first group as having the lowest level for the first reading of the SoC, and
    the second group as having the second lowest level for the first reading of the SoC;
  generating, by the computing device and based on the identification of the lowest level and the second lowest level, a first list comprising of the first group and the second group;
  determining, by the computing device, based on the first reading of the SoC of the first group, and based on the first reading of the SoC of the second group, a first SoC variability of the first list;
  determining, by the computing device and based on the first SoC variability, that the first SoC variability does not satisfy a SoC variability threshold;
  establishing, by the computing device, a first SoC threshold using the first reading of the SoC of the second group;
  causing, by the computing device and via electric charge arrays, the charging of the first group to cause the SoC of the first group to increase;
  receiving, by the computing device, a second reading of the SoC of each of the plurality of battery packs;
  determining, by the computing device and based on a second reading of the SoC of the first group, that the second reading of the SoC of the first group satisfies the first SoC threshold.

Embodiment #96. The method of Embodiment #95, further comprising:
  determining, by the computing device and based on the received second reading of the SoC of each of the plurality of battery packs, an updated first SoC variability of the first list;
  determining, by the computing device, that the updated first SoC variability satisfies the SoC variability threshold.

Embodiment #97. The method of Embodiment #95, wherein the receiving the first reading of the SoC of each of the plurality of battery packs further comprises:
  identifying, by the computing device, a master battery pack as one of the plurality of battery packs; and
  receiving, by the computing device and from the master battery pack, the first reading of the SoC of each of the plurality of battery packs.

Embodiment #98. The method of Embodiment #95, wherein the causing the charging further comprises enabling an electric discharge array from a charger to the one or more battery packs of the first group of one or more battery packs via a converter.

Embodiment #99. The method of Embodiment #95, wherein the plurality of battery packs further comprises at least a third group of one or more battery packs, and wherein the method further comprises:
  identifying, by the computing device, based on the received second reading of the SoC of each of the plurality of battery packs, and based on an identification of a lowest level for a second reading of an SoC and a second lowest level for a second reading of an SoC,
    the first group and the second group as having the lowest level for the second reading of the SoC, and
    the third group as having the second lowest level for the second reading of the SoC;
  generating, by the computing device and based on the lowest level for the second reading of the SoC and the second lowest level for the second reading of the SoC, a second list comprising the first group, the second group, and the third group;
  determining, by the computing device, based on the second reading of the SoC of the first group, based on the second reading of the SoC of the second group, and based on the second reading of the SoC of the third group, a second SoC variability of the second list.

Embodiment #100. The method of Embodiment #99, wherein the generating the second list comprises expanding the first list to include battery packs having the second lowest level for the second reading of the SoC.

Embodiment #101. The method of Embodiment #99, further comprising:
  determining, by the computing device, that the second SoC variability does not satisfy the SoC variability threshold;
  establishing, by the computing device, a second SoC threshold based on a second reading of the SoC of the third group;
  causing, by the computing device and via electric charge arrays,
    the charging of the first group to cause the SoC of the first group to increase, and the charging of the second group to cause the SoC of the second group to increase;
receiving, by the computing device, a third reading of the SoC of each of the plurality of battery packs;
determining, by the computing device, that a third reading of the SoC of the first group and a third reading of the SoC of the second group each satisfy the second SoC threshold.

Embodiment #102. The method of Embodiment #101, further comprising:
performing one or more iterations of the following until a determined updated SoC variability of the plurality of battery packs satisfies the SoC variability threshold:
identifying, by the computing device,
an Nth group of one or more battery packs of the plurality of battery back devices, wherein the nth group has a lowest level of a previous reading of the SoC of the plurality of battery packs, and
an (N+1) group of one or more battery packs of the plurality of battery back devices, wherein the (N+1) group has the second lowest level of the previous reading of the SoC of the plurality of battery packs, and
generating, by the computing device, a list comprising the n group and the N+1 group;
determining, by the computing device, that an SoC variability of the list does not satisfy the SoC variability threshold;
establishing, by the computing device, an SoC threshold using the previous reading of the SoC of the N+1 group;
causing, by the computing device and via electric charge arrays, the charging of the n group to cause the SoC of the n group to increase and satisfy the SoC threshold;
receiving, by the computing device, a subsequent reading of an SoC of each of the plurality of battery packs; and
determining, by the computing device and based on the subsequent reading of the SoC of each of the plurality of battery packs, the updated SoC variability of the plurality of battery packs.

Embodiment #103. The method of Embodiment #95, further comprising:
prior to the receiving the first reading of the SoC of each of the plurality of battery packs, determining that an interlock safety pin associated with the plurality of battery packs is set to on, wherein the interlock safety pin allows the receiving the first reading of the SoC of each of the plurality of battery pack to occur.

Embodiment #104. The method of Embodiment #95, further comprising:
prior to the causing the charging, determining that a wake pin associated with the plurality of battery packs is set to on, wherein the wake pin allows the charging to occur.

Embodiment #105. A method comprising:
receiving, by a computing device having one or more processors and communicatively linked to an end device, a power requirement of the end device;
receiving, by the computing device, a first reading of a state of charge (SoC) of each of a plurality of battery packs,
wherein the plurality of battery packs comprises at least a first group of one or more battery packs and a second group of one or more battery packs, and
wherein a first reading of an SoC of the second group is greater than a first reading of an SoC of the first group;
determining, by the computing device and based on the received first reading of the SoC of each of the plurality of battery packs, a first SoC variability of the plurality of battery packs;
determining, by the computing device and based on the first SoC variability not satisfying an SoC variability threshold, to enable the second group to initially power the end device without a concurrent powering of the end device by other battery packs of the plurality of battery packs; and
causing, by the computing device and via an electric charge array, the second group to power the end device to a first power level, wherein the powering the end device causes the SoC of the second group to decrease.

Embodiment #106. The method of Embodiment #105, further comprising:
receiving, by the computing device, a second reading of an SoC of each of the plurality of battery packs; and
determining, by the computing device and based on the received second reading of the SoC of each of the plurality of battery packs, a second SoC variability of the plurality of battery packs;
determining, by the computing device, that the second SoC variability satisfies the SoC variability threshold; and
causing, by the computing device and via one or more electric charge arrays, the first group and the second group to power the end device to a second power level, wherein the powering the end device causes the second reading of the SoC of the first group and the second reading of the SoC of the second group to decrease.

Embodiment #107. The method of Embodiment #105, further comprising:
receiving, by the computing device, a second reading of the SoC of each of the plurality of battery packs,
wherein the plurality of battery packs further comprises a third group of one or more battery packs,
wherein the second reading of the SoC of the second group and the second reading of the SoC of the third group are within a predetermined reading of each other, and
wherein the second reading of the SoC of the second group and the second reading of the SoC of the third group are each greater than the second reading of the SoC of the first group,
determining, by the computing device and based on the received second reading of the SoC of each of the plurality of battery packs, a second SoC variability of the plurality of battery packs;
determining, by the computing device, that the second SoC variability does not satisfy the SoC variability threshold; and
causing, by the computing device and via one or more electric charge arrays, the second group and the third group to concurrently power the end device to a second power level, wherein the powering the end device causes the SoC of the second group and the SoC of the third group to decrease.

Embodiment #108. The method of Embodiment #105, wherein the receiving the first reading of the SoC of each of the plurality of battery packs further comprises:
identifying, by the computing device, a master battery pack as one of the plurality of battery packs; and
receiving, by the computing device and from the master battery pack, the first reading of the SoC of each of the plurality of battery packs.

Embodiment #109. A method comprising:
receiving, by a computing device having one or more processors and communicatively linked to an end device, a power requirement of the end device;
receiving, by the computing device, a first reading of a state of charge (SoC) of each of a plurality of battery packs, wherein the plurality of battery packs comprises at least a first group of one or more battery packs and a second group of one or more battery packs, wherein a first reading of an SoC of the second group is greater than a first reading of an SoC of the first group, and determining, by the computing device and based on the received first reading of the SoC of each of the plurality of battery packs, a first SoC variability of the plurality of battery packs;

determining, by the computing device, that the first SoC variability does not satisfy an SoC variability threshold; and causing, by the computing device, and via one or more electric charge arrays, the second group to charge the first group, wherein the charging the first group decreases the SoC of the second group and increases the SoC of the first group.

Embodiment #110. The method of Embodiment #109, further comprising:

receiving, by the computing device, a second reading of the SoC of each of the plurality of battery packs;

determining, by the computing device and based on the received second reading of the SoC of each of the plurality of battery packs, a second SoC variability of the plurality of battery packs; and determining, by the computing device, that the second SoC variability satisfies the SoC variability threshold.

Embodiment #111. The method of Embodiment #110, further comprising:

causing, by the computing device and via one or more electric charge arrays, the plurality of battery packs to power the end device, wherein the powering causes the SoC of the plurality of battery packs to decrease.

Embodiment #112. The method of Embodiment #109, further comprising:

receiving, by the computing device, a first reading of a state of health (SOH) of each of the plurality of battery packs, wherein the plurality of battery packs further comprises a third group of one or more battery packs;

determining, by the computing device, that the first reading of the SOH of the third group does not satisfy a SOH threshold; and sequestering, by the computing device, the third group from powering the end device until a subsequent reading of an SoC of each of the plurality of battery packs other than the one or more battery packs of the third group do not satisfy an SoC threshold.

Embodiment #113. The method of Embodiment #109, wherein the receiving the first reading of the SoC of each of the plurality of battery packs further comprises:

identifying, by the computing device, a master battery pack as one of the plurality of battery packs; and receiving, by the computing device and from the master battery pack, the first reading of the SoC of each of the plurality of battery packs.

Embodiment #114. The method of Embodiment #109, wherein the causing the second group to charge the first battery pack occurs via one or more of a converter balancing, a direct connect balancing, or a staggered balancing.

With some embodiments, the term "large-format" encompasses medium-format battery embodiments and use cases. For example, medium-scale and large-scale applications are embodied by the numerous descriptions herein.

Although many of the systems and methods described herein reference Lithium ion battery storage chemistry, the disclosure is not so limited. In many instances, a person of ordinary skill in the art will appreciate that other major chemistries for rechargeable batteries may be appropriated substituted without substantially departing from the spirit of the solution: Lithium-ion (Li-ion), Nickel Cadmium (Ni—Cd), Nickel-Metal Hydride (Ni-MH), Lead-Acid, and other chemistries. With some embodiments, the battery management system disclosed herein may be included with these technology batteries to provide battery protection, provide improved efficiency, and provide a better user experience than previous battery technologies. Variants of the lithium cobalt cathode, such as nickel cobalt aluminum (NCA) and nickel manganese cobalt (NMC), may be desirable in electric vehicles and other applications. Other new cathode chemistries, such as lithium manganese spinel (LMO) and lithium iron phosphate (LFP), may be used where appropriate. Moreover, large-format battery packs offer lower system integration costs because, inter alia, it enables a reduced number of battery interconnections, further improving the reliability of the battery pack and providing for a much higher value proposition.

Further, combinations of battery packs may comprise battery packs sharing a common battery chemistry (e.g., all Li-ion or all Ni—Cd or the like). Alternatively, combinations of battery packs may comprise different battery chemistries. The battery packs of different battery chemistries may be selected at random or may be selected to provide a collective functionality based on the combination of functions of battery chemistries of the disparate battery packs. For example, a first battery pack having a first type of battery chemistry (e.g., a chemistry that is able to provide a high instantaneous current but cannot store significant energy) may be combined with a second battery pack having a second type of battery chemistry (e.g., a chemistry that stores significant energy but cannot provide high peak current) such that the combination of battery packs may provide a high initial current from the first battery pack and then a sustained, albeit lower, current from the second battery pack. Other combinations of aspects of different battery chemistries are possible and considered within the scope of this disclosure.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. A first battery pack configured for installation in a battery system of a plurality of battery packs for electrically powering an end device not equipped with electronic communication means, wherein installed battery packs in the battery system have identical electrical and electronic components, the first battery pack comprising:

one or more battery cells;

a power bus interface circuit configured to interface with a power bus and to provide electrical power to the end device;

a switch;

a gateway connector, connected to the switch and communicatively coupled with an interface to the end device, configured to provide a signal to an input line of the end device;

a controller comprising at least one processor; and a memory storing controller instructions that, when executed by the at least one processor, cause the controller to:

determine that the first battery pack is a master battery pack of the battery system;

when the first battery pack receives a failure notification message indicative of a catastrophic failure at a second battery pack and when an extra battery pack is needed, determine whether a first spare battery pack is available;

when no spare battery pack is available, disable the second battery pack from discharging onto the power bus and send a degradation alert message to the end device identifying a degradation of power available from the plurality of battery packs in the battery system; and based on sending the degradation alert message to the end device, triggering the gateway connector to output a limp home mode signal to the end device using the interface to the end device, and causing the end device to operate in a degraded mode.

2. The first battery pack of claim 1, wherein the interface to the end device comprises a gateway printed circuit board assembly (PCBA).

3. The first battery pack of claim 1, wherein the end device is powered by a non-smart battery.

4. The first battery pack of claim 1, wherein triggering the gateway connector to output the limp home mode signal to the end device using the interface to the end device comprises causing a hardware pin corresponding to a limp home mode on the end device to be set.

5. The first battery pack of claim 1, wherein the controller instructions, when executed by the at least one processor, further cause the controller to:

store a lookup table comprising different state of charge threshold values corresponding to different temperature readings.

6. The first battery pack of claim 1, wherein the controller instructions, when executed by the at least one processor, further cause the controller to:

store a lookup table comprising different state of charge threshold values corresponding to different numbers of battery packs installed in the battery system.

7. The first battery pack of claim 1, wherein the first battery pack receiving the failure notification message indicative of the catastrophic failure at the second battery pack is based on one or more criteria in a lookup table storing different state of charge threshold values.

8. The first battery pack of claim 1, wherein the first battery pack receiving the failure notification message indicative of the catastrophic failure at the second battery pack is based on one or more battery cells of the second battery pack having a state of charge value below a predetermined threshold.

9. The first battery pack of claim 1, wherein triggering the gateway connector to output the limp home mode signal to the end device using the interface to the end device comprises controlling the switch to output a preset regulated voltage.

10. The first battery pack of claim 1, wherein the controller instructions, when executed by the at least one processor, further cause the controller to:

when the end device does not comply with the degraded alert message, initiate shutdown of the battery system.

11. The first battery pack of claim 1, wherein the controller instructions, when executed by the at least one processor, further cause the controller to:

when at least one spare battery pack is available and an additional battery pack is needed to power the end device, send an enable message to the at least one spare battery pack, wherein the enable message instructs the at least one spare battery pack to discharge onto the power bus; and trigger the gateway connector to deactivate the limp home mode signal using the interface to the end device.

12. The first battery pack of claim 2, wherein the gateway printed circuit board assembly (PCBA) is configured to read state of charge (SoC) data over an electronic communication protocol.

13. A method comprising:

after receiving a failure notification message indicative of a catastrophic failure at a second battery pack, determining, by a master battery pack, whether a first spare battery pack is available;

when no spare battery pack is available and an additional battery pack is needed, sending, by the master battery pack, a disable message to the second battery pack and a degradation alert message to an end device, wherein the disable message instructs the second battery pack to terminate discharging onto a power bus, and sending, by the master battery pack, and wherein the degradation alert message identifies a degradation of power available from a plurality of battery packs in a battery system;

triggering, by the master battery pack, a gateway connector to output a limp home mode signal to the end device using an interface to the end device; and causing the end device to operate in a degraded mode.

14. The method of claim 13, wherein the interface to the end device comprises a gateway printed circuit board assembly (PCBA).

15. The method of claim 13, further comprising powering the end device by a non-smart battery.

16. The method of claim 13, wherein triggering the gateway connector to output the limp home mode signal to the end device using the interface to the end device comprises setting a hardware pin corresponding to a limp home mode on the end device.

17. The method of claim 13, wherein receiving the failure notification message indicative of the catastrophic failure at the second battery pack is based on one or more criteria in a lookup table storing different state of charge threshold values.

18. The method of claim 13, wherein receiving the failure notification message indicative of the catastrophic failure at the second battery pack is based on one or more battery cells of the second battery pack having a state of charge value below a predetermined threshold.

19. The method of claim 13, wherein triggering the gateway connector to output the limp home mode signal to the end device using the interface to the end device comprises controlling a switch to output a preset regulated voltage.

20. A battery system configured for electrically powering an end device and comprising a plurality of battery packs, the battery system comprising:

a slave battery pack; and a master battery pack including:

a switch;

a gateway connector, connected to the switch and communicatively coupled with an interface to the end device, configured to provide a signal to an input line of the end device;

a controller comprising at least one processor; and a memory storing controller instructions that, when executed by the at least one processor, cause the controller to:

when the master battery pack receives a failure notification message indicative of a catastrophic failure at a second battery pack and when an extra battery pack is needed, determine whether a first spare battery pack is available;

when no spare battery pack is available, disable the second battery pack from discharging onto a power bus and send a degradation alert message to the end device identifying a degradation of power available from the plurality of battery packs in the battery system; and based on sending the degradation alert message to the end device, triggering the gateway connector to output a limp home mode signal to the end device using the interface to the end device, and causing the end device to operate in a degraded mode.

\* \* \* \* \*